(12) United States Patent
Strohmenger et al.

(10) Patent No.: US 11,513,477 B2
(45) Date of Patent: Nov. 29, 2022

(54) CLOUD-BASED INDUSTRIAL CONTROLLER

(71) Applicant: Rockwell Automation Technologies, Inc., Mayfield Heights, OH (US)

(72) Inventors: John Strohmenger, Strongsville, OH (US); Jessica L. Korpela, Milwaukee, WI (US); Matthew W. Fordenwalt, Hudson, OH (US); Jan Pingel, Weddington, NC (US); Stephen L. Hickox, Middlefield, OH (US); Douglas B. Weber, Glendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/658,365

(22) Filed: Mar. 16, 2015

(65) Prior Publication Data

US 2016/0274552 A1 Sep. 22, 2016

(51) Int. Cl.
*G05B 11/01* (2006.01)
*G05B 15/02* (2006.01)
(Continued)

(52) U.S. Cl.
CPC .............. *G05B 11/01* (2013.01); *G05B 15/02* (2013.01); *G06Q 10/06* (2013.01);
(Continued)

(58) Field of Classification Search
CPC . G05B 19/0428; G05B 23/0237; G06Q 10/06
(Continued)

(56) References Cited

U.S. PATENT DOCUMENTS

| 5,014,317 A | 5/1991 | Kita et al. |
| 5,112,948 A | 6/1992 | Zapolin |

(Continued)

FOREIGN PATENT DOCUMENTS

| CN | 1232553 A | 10/1999 |
| CN | 1529837 A | 9/2004 |

(Continued)

OTHER PUBLICATIONS

Notice of Allowance for U.S. Appl. No. 13/725,619 dated Mar. 31, 2016, 26 pages.

(Continued)

*Primary Examiner* — Santosh R Poudel
(74) *Attorney, Agent, or Firm* — Amin, Turocy & Watson, LLP

(57) ABSTRACT

A cloud-based industrial controller that controls devices, processes, and other assets of an industrial automation system via control algorithms that execute on a cloud platform is presented. A cloud-based collection component collects information from the industrial automation system via cloud gateways associated with the industrial automation system or extrinsic data sources. The cloud-based industrial controller can monitor and analyze the information, generate control instructions based on the analysis results, and communicate the control instructions to the devices, processes, and/or other assets of the industrial automation system to control operation of the industrial automation system. The cloud-based industrial controller also can interface with a industrial plant-based industrial controller, wherein the cloud-based industrial controller can determine supplemental control instructions to the industrial plant-based industrial controller, based on the information, including extrinsic information, to assist in controlling the industrial automation system and control decision-making.

27 Claims, 19 Drawing Sheets

(51) Int. Cl.
  *G06Q 10/06* (2012.01)
  *G05B 23/02* (2006.01)

(52) U.S. Cl.
  CPC .......... *G05B 23/0237* (2013.01); *G05B 2219/23026* (2013.01); *G05B 2219/31457* (2013.01); *G05B 2219/32007* (2013.01); *Y02P 90/80* (2015.11)

(58) Field of Classification Search
  USPC .......................................................... 700/9
  See application file for complete search history.

(56) References Cited

U.S. PATENT DOCUMENTS

| | | | |
|---|---|---|---|
| 5,199,009 A | 3/1993 | Svast | |
| 5,598,572 A | 1/1997 | Tanikoshi et al. | |
| 5,611,059 A | 3/1997 | Benton et al. | |
| 5,612,869 A | 3/1997 | Letzt et al. | |
| 5,682,460 A | 10/1997 | Hyziak et al. | |
| 5,710,885 A | 1/1998 | Bondi | |
| 5,844,794 A | 12/1998 | Keeley | |
| 5,845,149 A | 12/1998 | Husted et al. | |
| 5,856,931 A | 1/1999 | McCasland | |
| 5,957,985 A * | 9/1999 | Wong | G06F 11/2035 701/29.2 |
| 5,966,301 A * | 10/1999 | Cook | G05B 9/03 700/3 |
| 5,970,430 A | 10/1999 | Burns et al. | |
| 5,978,568 A | 11/1999 | Abraham et al. | |
| 6,167,337 A | 12/2000 | Haack | |
| 6,175,770 B1 | 1/2001 | Bladow | |
| 6,175,801 B1 | 1/2001 | Millington | |
| 6,199,068 B1 | 3/2001 | Carpenter | |
| 6,279,113 B1 | 8/2001 | Vaidya | |
| 6,282,455 B1 | 8/2001 | Engdahl | |
| 6,324,607 B1 | 11/2001 | Korowitz et al. | |
| 6,381,502 B1 | 4/2002 | Rudder et al. | |
| 6,400,996 B1 | 6/2002 | Hoffberg et al. | |
| 6,412,032 B1 | 6/2002 | Neet et al. | |
| 6,437,692 B1 | 8/2002 | Petite et al. | |
| 6,457,024 B1 | 9/2002 | Felsentein et al. | |
| 6,463,338 B1 | 10/2002 | Neet | |
| 6,466,972 B1 | 10/2002 | Paul et al. | |
| 6,529,780 B1 | 3/2003 | Soergel et al. | |
| 6,535,926 B1 | 3/2003 | Esker | |
| 6,578,005 B1 | 6/2003 | Lesaint et al. | |
| 6,624,388 B1 | 9/2003 | Blankenship et al. | |
| 6,640,145 B2 | 10/2003 | Hoffberg et al. | |
| 6,651,062 B2 | 11/2003 | Ghannam et al. | |
| 6,675,226 B1 | 1/2004 | Nair et al. | |
| 6,686,838 B1 | 2/2004 | Rezvani et al. | |
| 6,691,159 B1 | 2/2004 | Grewal et al. | |
| 6,705,229 B2 | 3/2004 | Frankenberger | |
| 6,708,074 B1 | 3/2004 | Chi et al. | |
| 6,708,385 B1 * | 3/2004 | Lemelson | B23Q 7/03 29/563 |
| 6,714,974 B1 | 3/2004 | Machida | |
| 6,728,262 B1 | 4/2004 | Woram | |
| 6,732,165 B1 | 5/2004 | Jennings, III | |
| 6,732,191 B1 | 5/2004 | Baker et al. | |
| 6,757,897 B1 | 6/2004 | Shi et al. | |
| 6,774,598 B1 | 8/2004 | Kohler | |
| 6,801,920 B1 | 10/2004 | Wischinski | |
| 6,819,960 B1 | 11/2004 | McKelvey et al. | |
| 6,891,850 B1 | 5/2005 | Vandesteeg et al. | |
| 6,895,532 B2 | 5/2005 | Raynham | |
| 6,904,600 B1 | 6/2005 | James et al. | |
| 6,907,302 B2 | 6/2005 | Karbassi | |
| 6,920,502 B2 | 7/2005 | Araujo et al. | |
| 6,952,680 B1 | 10/2005 | Melby et al. | |
| 6,965,802 B2 | 11/2005 | Sexton | |
| 6,968,242 B1 | 11/2005 | Hwu et al. | |
| 6,970,913 B1 | 11/2005 | Albert et al. | |
| 6,982,953 B1 | 1/2006 | Swales | |
| 7,032,045 B2 | 4/2006 | Kostadinov | |
| 7,085,814 B1 | 8/2006 | Gandhi et al. | |
| 7,103,428 B2 | 9/2006 | Varone et al. | |
| 7,133,900 B1 | 11/2006 | Szeto | |
| 7,149,792 B1 | 12/2006 | Hansen et al. | |
| 7,151,966 B1 | 12/2006 | Baier et al. | |
| 7,203,560 B1 | 4/2007 | Wylie et al. | |
| 7,210,095 B1 | 4/2007 | Mor | |
| 7,233,830 B1 | 6/2007 | Callaghan et al. | |
| 7,242,009 B1 * | 7/2007 | Wilson | G01N 15/1456 250/461.1 |
| 7,275,037 B2 | 9/2007 | Lauer | |
| 7,277,865 B1 | 10/2007 | Silverstone et al. | |
| 7,289,994 B2 | 10/2007 | Nixon et al. | |
| 7,298,275 B2 | 11/2007 | Brandt et al. | |
| 7,310,344 B1 | 12/2007 | Sue | |
| 7,383,155 B2 | 6/2008 | Rosam et al. | |
| 7,412,548 B2 | 8/2008 | Sichner | |
| 7,428,495 B2 | 9/2008 | Dhar et al. | |
| 7,478,010 B2 | 1/2009 | Hashemian | |
| 7,480,728 B2 | 1/2009 | Evans | |
| 7,539,724 B1 | 5/2009 | Callaghan | |
| 7,734,590 B2 | 6/2010 | Chand et al. | |
| 7,827,122 B1 | 11/2010 | Campbell, Jr. et al. | |
| 7,831,317 B2 | 11/2010 | McGreevy et al. | |
| 8,150,959 B1 | 4/2012 | Bezdicek et al. | |
| 8,266,066 B1 | 9/2012 | Wezter et al. | |
| 8,353,012 B2 | 1/2013 | Del Real | |
| 8,392,845 B2 | 3/2013 | Cahill et al. | |
| 8,451,753 B2 | 5/2013 | Vanga et al. | |
| 8,468,272 B2 | 6/2013 | Giroti | |
| 8,484,250 B2 | 7/2013 | Sujeet et al. | |
| 8,686,871 B2 | 4/2014 | Jensen et al. | |
| 8,914,300 B2 | 12/2014 | Sustaeta et al. | |
| 8,924,328 B1 * | 12/2014 | Kozlovsky | H04L 41/0816 703/2 |
| 9,024,955 B2 | 5/2015 | Ramarao et al. | |
| 9,117,076 B2 | 8/2015 | Devost | |
| 9,438,648 B2 | 9/2016 | Asenjo et al. | |
| 9,507,807 B1 | 11/2016 | Florissi et al. | |
| 9,685,053 B2 * | 6/2017 | Palmeri | G01C 21/206 |
| 9,690,669 B2 | 6/2017 | Bernal et al. | |
| 9,703,902 B2 | 7/2017 | Asenjo et al. | |
| 9,709,978 B2 | 7/2017 | Asenjo et al. | |
| 10,026,049 B2 | 7/2018 | Asenjo et al. | |
| 10,054,914 B2 | 8/2018 | Vartiainen et al. | |
| 2001/0035729 A1 | 11/2001 | Graiger et al. | |
| 2002/0004798 A1 | 1/2002 | Babula et al. | |
| 2002/0016839 A1 | 2/2002 | Smith | |
| 2002/0042756 A1 | 4/2002 | Kumar et al. | |
| 2002/0046239 A1 | 4/2002 | Stawikowski et al. | |
| 2002/0049833 A1 | 4/2002 | Kikinis | |
| 2002/0065898 A1 | 5/2002 | Leontiev et al. | |
| 2002/0068983 A1 | 6/2002 | Sexton | |
| 2002/0068984 A1 | 6/2002 | Alexander et al. | |
| 2002/0073236 A1 | 6/2002 | Helgeron et al. | |
| 2002/0077711 A1 | 6/2002 | Nixon et al. | |
| 2002/0078432 A1 | 6/2002 | Charisius et al. | |
| 2002/0082966 A1 | 6/2002 | O'Brien et al. | |
| 2002/0094588 A1 | 7/2002 | Fan et al. | |
| 2002/0096077 A1 | 7/2002 | Frankenberger | |
| 2002/0107904 A1 | 8/2002 | Talluri et al. | |
| 2002/0138378 A1 | 9/2002 | Leskuski | |
| 2002/0156562 A1 | 10/2002 | Berger et al. | |
| 2002/0156872 A1 | 10/2002 | Brown | |
| 2002/0156926 A1 | 10/2002 | Batka | |
| 2002/0161745 A1 | 10/2002 | Call | |
| 2002/0169993 A1 | 11/2002 | Woods et al. | |
| 2003/0004937 A1 | 1/2003 | Salmenkaita et al. | |
| 2003/0009253 A1 | 1/2003 | McIntyre et al. | |
| 2003/0009572 A1 | 1/2003 | Thurner | |
| 2003/0011467 A1 | 1/2003 | Suomela | |
| 2003/0014149 A1 | 1/2003 | Kreidler et al. | |
| 2003/0023336 A1 | 1/2003 | Kreidler et al. | |
| 2003/0033179 A1 * | 2/2003 | Katz | G06Q 10/063 705/7.12 |
| 2003/0041089 A1 * | 2/2003 | Mauro | G05B 19/0421 718/106 |
| 2003/0051074 A1 | 3/2003 | Edwards | |

(56) References Cited

U.S. PATENT DOCUMENTS

| | | |
|---|---|---|
| 2003/0056224 A1 | 3/2003 | Stone |
| 2003/0069002 A1 | 4/2003 | Hunter et al. |
| 2003/0084016 A1 | 5/2003 | Norgaard et al. |
| 2003/0105535 A1 | 6/2003 | Rammler |
| 2003/0105585 A1 | 6/2003 | Ukita |
| 2003/0109942 A1 | 6/2003 | Yeh et al. |
| 2003/0120817 A1 | 6/2003 | Ott et al. |
| 2003/0150908 A1 | 8/2003 | Pokorny et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0183456 A1* | 10/2003 | Hatzor ............... G07F 9/002 186/39 |
| 2003/0198188 A1 | 10/2003 | Castlebury et al. |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0024572 A1 | 2/2004 | Pagnano et al. |
| 2004/0025173 A1* | 2/2004 | Levonai ............ G06F 11/0748 719/328 |
| 2004/0032935 A1 | 2/2004 | Mills et al. |
| 2004/0083165 A1 | 4/2004 | Lawrence |
| 2004/0111512 A1 | 6/2004 | Barth |
| 2004/0148039 A1 | 7/2004 | Farchmin et al. |
| 2004/0148187 A1 | 7/2004 | Boettcher et al. |
| 2004/0148383 A1 | 7/2004 | Gonsalves |
| 2004/0159113 A1* | 8/2004 | Singh ............... G05B 15/02 62/129 |
| 2004/0199573 A1 | 10/2004 | Schwartz et al. |
| 2004/0203895 A1 | 10/2004 | Balasuriya |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0005093 A1 | 1/2005 | Bartels et al. |
| 2005/0021158 A1 | 1/2005 | De meyer et al. |
| 2005/0038528 A1 | 2/2005 | McKlvey et al. |
| 2005/0055429 A1 | 3/2005 | Abele |
| 2005/0080799 A1 | 4/2005 | Hamden et al. |
| 2005/0091410 A1* | 4/2005 | Gibart ............... G05B 9/03 709/248 |
| 2005/0120112 A1 | 6/2005 | Wing et al. |
| 2005/0125441 A1 | 6/2005 | Clemens et al. |
| 2005/0137735 A1 | 6/2005 | Loy et al. |
| 2005/0149922 A1 | 7/2005 | Vincent |
| 2005/0203869 A1 | 9/2005 | Minamino et al. |
| 2005/0209902 A1 | 9/2005 | Iwasaki et al. |
| 2005/0257204 A1 | 11/2005 | Bryant et al. |
| 2005/0278441 A1 | 12/2005 | Bond et al. |
| 2006/0022048 A1 | 2/2006 | Johnson |
| 2006/0026193 A1 | 2/2006 | Hood |
| 2006/0046712 A1 | 3/2006 | Shamp et al. |
| 2006/0077095 A1 | 4/2006 | Tucker et al. |
| 2006/0078859 A1 | 4/2006 | Mullin |
| 2006/0149813 A1 | 7/2006 | Janik |
| 2006/0153089 A1 | 7/2006 | Silverman |
| 2006/0173873 A1 | 8/2006 | Prompt et al. |
| 2006/0190106 A1 | 8/2006 | Kay et al. |
| 2006/0236374 A1 | 10/2006 | Hartman |
| 2006/0253205 A1 | 11/2006 | Gardiner |
| 2006/0259154 A1 | 11/2006 | Hood et al. |
| 2006/0259472 A1 | 11/2006 | MacClellan |
| 2006/0282432 A1 | 12/2006 | Cassidy et al. |
| 2007/0008129 A1 | 1/2007 | Soliman |
| 2007/0019641 A1 | 1/2007 | Pai et al. |
| 2007/0021968 A1 | 1/2007 | Amir et al. |
| 2007/0050206 A1 | 3/2007 | Whikehart et al. |
| 2007/0061018 A1 | 3/2007 | Callaghan et al. |
| 2007/0073850 A1 | 3/2007 | Callaghan et al. |
| 2007/0078525 A1 | 4/2007 | Chand |
| 2007/0078536 A1 | 4/2007 | Gordon et al. |
| 2007/0078537 A1 | 4/2007 | Chand et al. |
| 2007/0078736 A1* | 4/2007 | Chand ............... G06Q 20/10 705/35 |
| 2007/0078862 A1 | 4/2007 | Chand et al. |
| 2007/0095907 A1 | 5/2007 | Robinson et al. |
| 2007/0112801 A1 | 5/2007 | McGreevy et al. |
| 2007/0118560 A1 | 5/2007 | Bornhoevd et al. |
| 2007/0130112 A1 | 6/2007 | Lin |
| 2007/0168057 A1 | 7/2007 | Blevins et al. |
| 2007/0192213 A1 | 8/2007 | Wu et al. |
| 2007/0194097 A1 | 8/2007 | Jones |
| 2007/0213989 A1 | 9/2007 | Cooksy et al. |
| 2007/0244892 A1 | 10/2007 | Narancic |
| 2007/0245169 A1 | 10/2007 | Farchmin et al. |
| 2007/0247789 A1 | 10/2007 | Benson et al. |
| 2007/0255431 A1* | 11/2007 | Kinsey ............... A01K 63/003 700/21 |
| 2008/0004739 A1 | 1/2008 | Varadhan et al. |
| 2008/0027704 A1 | 1/2008 | Kephart |
| 2008/0049013 A1 | 2/2008 | Nasle |
| 2008/0065243 A1 | 3/2008 | Fallman et al. |
| 2008/0077512 A1 | 3/2008 | Grewal |
| 2008/0082186 A1 | 4/2008 | Hood et al. |
| 2008/0109099 A1 | 5/2008 | Moshier |
| 2008/0125887 A1 | 5/2008 | Case |
| 2008/0155064 A1 | 6/2008 | Cosuge |
| 2008/0162688 A1 | 7/2008 | Reumann et al. |
| 2008/0189637 A1 | 8/2008 | Krajewski et al. |
| 2008/0208365 A1 | 8/2008 | Grgic et al. |
| 2008/0209211 A1 | 8/2008 | Grgic et al. |
| 2008/0214104 A1 | 9/2008 | Baumert et al. |
| 2008/0229754 A1 | 9/2008 | Goebel et al. |
| 2008/0263514 A1 | 10/2008 | DeMesa |
| 2008/0303472 A1 | 12/2008 | John et al. |
| 2009/0024440 A1 | 1/2009 | Spahn |
| 2009/0037378 A1 | 2/2009 | Moor et al. |
| 2009/0037872 A1 | 2/2009 | Schnabele et al. |
| 2009/0063258 A1 | 3/2009 | Mueller et al. |
| 2009/0065578 A1 | 3/2009 | Peterson et al. |
| 2009/0070163 A1 | 3/2009 | Angell et al. |
| 2009/0083204 A1 | 3/2009 | Baier et al. |
| 2009/0086692 A1 | 4/2009 | Chen |
| 2009/0088875 A1 | 4/2009 | Baier et al. |
| 2009/0089032 A1 | 4/2009 | Sturrock et al. |
| 2009/0089233 A1 | 4/2009 | Gach et al. |
| 2009/0089359 A1 | 4/2009 | Siorek et al. |
| 2009/0089682 A1 | 4/2009 | Baier |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0132458 A1 | 5/2009 | Edwards et al. |
| 2009/0182689 A1 | 7/2009 | Chiles et al. |
| 2009/0204234 A1 | 8/2009 | Sustaeta et al. |
| 2009/0210071 A1 | 8/2009 | Agrusa et al. |
| 2009/0210814 A1 | 8/2009 | Agrusa et al. |
| 2009/0216341 A1 | 8/2009 | Enkerud et al. |
| 2009/0265157 A1 | 10/2009 | Piepenbrock et al. |
| 2009/0300151 A1 | 12/2009 | Friedman et al. |
| 2009/0316977 A1 | 12/2009 | Juncker et al. |
| 2009/0319831 A1 | 12/2009 | Kruchinin et al. |
| 2010/0010859 A1 | 1/2010 | Ratakonda et al. |
| 2010/0023562 A1 | 1/2010 | Kreuch et al. |
| 2010/0057660 A1 | 3/2010 | Kato |
| 2010/0076575 A1 | 3/2010 | Vasko et al. |
| 2010/0077160 A1 | 3/2010 | Liu et al. |
| 2010/0082127 A1 | 4/2010 | Plache et al. |
| 2010/0082129 A1 | 4/2010 | McGreevy et al. |
| 2010/0082142 A1 | 4/2010 | Usadi et al. |
| 2010/0082314 A1 | 4/2010 | Pritchard et al. |
| 2010/0082453 A1 | 4/2010 | Speers et al. |
| 2010/0082669 A1 | 4/2010 | Obitko et al. |
| 2010/0083232 A1 | 4/2010 | Chouinard et al. |
| 2010/0118895 A1 | 5/2010 | Radulescu |
| 2010/0146014 A1 | 6/2010 | Ionescu et al. |
| 2010/0153487 A1 | 6/2010 | Greven et al. |
| 2010/0192144 A1 | 7/2010 | Schmit |
| 2010/0211509 A1* | 8/2010 | Jacobs ............... G01R 21/133 705/302 |
| 2010/0219950 A1 | 9/2010 | Kong et al. |
| 2010/0223212 A1 | 9/2010 | Manolescu et al. |

(56) References Cited

U.S. PATENT DOCUMENTS

| | | |
|---|---|---|
| 2010/0241260 A1 | 9/2010 | Kilibarda et al. |
| 2010/0256795 A1 | 10/2010 | McLaughlin et al. |
| 2010/0257227 A1 | 10/2010 | McLaughlin |
| 2010/0257228 A1 | 10/2010 | Staggs et al. |
| 2010/0306377 A1 | 12/2010 | DeHaan et al. |
| 2010/0318392 A1 | 12/2010 | Cassels et al. |
| 2010/0318837 A1 | 12/2010 | Murphy et al. |
| 2010/0324855 A1* | 12/2010 | Parker .................. G06F 11/2294 702/119 |
| 2010/0332008 A1 | 12/2010 | Knipfer et al. |
| 2011/0004446 A1 | 1/2011 | Dorn et al. |
| 2011/0016058 A1 | 1/2011 | Pinchuk |
| 2011/0035253 A1 | 2/2011 | Mason et al. |
| 2011/0047230 A1 | 2/2011 | McGee |
| 2011/0078300 A9 | 3/2011 | Grelewicz et al. |
| 2011/0093308 A1 | 4/2011 | Majeed |
| 2011/0161378 A1 | 6/2011 | Williamson |
| 2011/0173127 A1 | 7/2011 | Ho et al. |
| 2011/0257766 A1* | 10/2011 | Sundaram .......... G05B 19/4185 700/7 |
| 2011/0265020 A1 | 10/2011 | Fields et al. |
| 2011/0276498 A1 | 11/2011 | Madhik |
| 2011/0288667 A1 | 11/2011 | Noda et al. |
| 2011/0295634 A1 | 12/2011 | Bhamidipaty et al. |
| 2012/0005242 A1 | 1/2012 | Feng et al. |
| 2012/0022700 A1 | 1/2012 | Dress et al. |
| 2012/0054246 A1 | 3/2012 | Fischer |
| 2012/0072597 A1 | 3/2012 | Teather et al. |
| 2012/0079461 A1 | 3/2012 | Copass et al. |
| 2012/0083906 A1 | 4/2012 | Weatherhead et al. |
| 2012/0084400 A1 | 4/2012 | Almadi et al. |
| 2012/0089920 A1 | 4/2012 | Eick |
| 2012/0095808 A1 | 4/2012 | Kattapuram et al. |
| 2012/0101801 A1 | 4/2012 | Van Dorsselaer |
| 2012/0143374 A1 | 6/2012 | Mistry et al. |
| 2012/0147894 A1 | 6/2012 | Mulligan et al. |
| 2012/0191439 A1 | 7/2012 | Meagher et al. |
| 2012/0197911 A1 | 8/2012 | Banka et al. |
| 2012/0232876 A1 | 9/2012 | Misra |
| 2012/0257544 A1 | 10/2012 | Schein et al. |
| 2012/0262069 A1 | 10/2012 | Reed |
| 2012/0290104 A1 | 11/2012 | Holt et al. |
| 2012/0290266 A1 | 11/2012 | Jain et al. |
| 2012/0297249 A1 | 11/2012 | Yang et al. |
| 2012/0304007 A1 | 11/2012 | Hanks et al. |
| 2012/0306620 A1 | 12/2012 | Karaffa et al. |
| 2012/0311387 A1 | 12/2012 | Santhosh et al. |
| 2013/0004281 A1* | 1/2013 | Anders .................. E02F 9/2075 414/687 |
| 2013/0012220 A1 | 1/2013 | Waris et al. |
| 2013/0018696 A1 | 1/2013 | Meldrum |
| 2013/0024542 A1* | 1/2013 | Keller .................. G05B 19/0428 709/217 |
| 2013/0031158 A1 | 1/2013 | Salsburg |
| 2013/0036198 A1 | 2/2013 | Galm et al. |
| 2013/0041705 A1 | 2/2013 | Hampapur et al. |
| 2013/0097563 A1 | 4/2013 | Pacheco Rodrigues Velho et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111019 A1 | 5/2013 | Tjew et al. |
| 2013/0111034 A1 | 5/2013 | Upadhya |
| 2013/0117064 A1 | 5/2013 | Sadeghi et al. |
| 2013/0117806 A1 | 5/2013 | Parthasarathy et al. |
| 2013/0125233 A1* | 5/2013 | Bush .................. G05B 23/0216 726/19 |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0159500 A1 | 6/2013 | Reus et al. |
| 2013/0182107 A1 | 7/2013 | Anderson |
| 2013/0191106 A1 | 7/2013 | Kephart et al. |
| 2013/0204982 A1 | 8/2013 | Kim et al. |
| 2013/0211546 A1* | 8/2013 | Lawson ............. G05B 19/4185 700/9 |
| 2013/0211547 A1 | 8/2013 | Buchdunger et al. |
| 2013/0211555 A1 | 8/2013 | Lawson et al. |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0212521 A1 | 8/2013 | Fedoseyeva et al. |
| 2013/0218971 A1* | 8/2013 | Sasaki ..................... H04W 4/00 709/204 |
| 2013/0237204 A1 | 9/2013 | Buck et al. |
| 2013/0257627 A1 | 10/2013 | Rafael |
| 2013/0262654 A1 | 10/2013 | Masli et al. |
| 2013/0274899 A1 | 10/2013 | Hamzaoui et al. |
| 2013/0282150 A1* | 10/2013 | Panther ............... G05B 19/042 700/75 |
| 2013/0283265 A1 | 10/2013 | Acharya et al. |
| 2013/0304237 A1 | 11/2013 | Schroeder et al. |
| 2013/0311827 A1 | 11/2013 | Drory et al. |
| 2013/0325545 A1 | 12/2013 | Mordvinova et al. |
| 2013/0347003 A1 | 12/2013 | Whitmore |
| 2014/0013100 A1 | 1/2014 | Menzel et al. |
| 2014/0046618 A1 | 2/2014 | Arunachalam et al. |
| 2014/0046977 A1 | 2/2014 | Gopalakrishnan et al. |
| 2014/0047107 A1* | 2/2014 | Maturana ............ G05B 19/056 709/224 |
| 2014/0052499 A1* | 2/2014 | Wagner ................. G06Q 10/06 705/7.36 |
| 2014/0059056 A1 | 2/2014 | Chaney et al. |
| 2014/0067360 A1 | 3/2014 | Bhamidipaty et al. |
| 2014/0081691 A1 | 3/2014 | Wendell |
| 2014/0095231 A1 | 4/2014 | Cherusseri et al. |
| 2014/0095654 A1 | 4/2014 | Finnerty et al. |
| 2014/0121789 A1 | 5/2014 | Brandes et al. |
| 2014/0137257 A1 | 5/2014 | Martinez et al. |
| 2014/0156032 A1 | 6/2014 | Jenkins et al. |
| 2014/0156584 A1 | 6/2014 | Motukuri |
| 2014/0215487 A1 | 7/2014 | Cherkasova et al. |
| 2014/0250153 A1 | 9/2014 | Nixon et al. |
| 2014/0250337 A1 | 9/2014 | Yamaji et al. |
| 2014/0278738 A1 | 9/2014 | Feit et al. |
| 2014/0279201 A1 | 9/2014 | Iyoob et al. |
| 2014/0279641 A1 | 9/2014 | Singh et al. |
| 2014/0279948 A1 | 9/2014 | Mahate et al. |
| 2014/0282015 A1 | 9/2014 | Nixon et al. |
| 2014/0282257 A1 | 9/2014 | Nixon et al. |
| 2014/0297354 A1 | 10/2014 | Kogiso et al. |
| 2014/0306533 A1* | 10/2014 | Paquin .................... H02J 3/383 307/52 |
| 2014/0316794 A1 | 10/2014 | Goll et al. |
| 2014/0335480 A1 | 11/2014 | Asenjo et al. |
| 2014/0336785 A1* | 11/2014 | Asenjo ............... G05B 19/4185 700/17 |
| 2014/0336786 A1 | 11/2014 | Asenjo et al. |
| 2014/0336791 A1 | 11/2014 | Asenjo et al. |
| 2014/0336795 A1 | 11/2014 | Asenjo et al. |
| 2014/0337000 A1 | 11/2014 | Asenjo et al. |
| 2014/0337086 A1* | 11/2014 | Asenjo ................. H04L 41/0896 705/7.28 |
| 2014/0358606 A1 | 12/2014 | Hull |
| 2014/0372347 A1 | 12/2014 | Cohen et al. |
| 2015/0012763 A1 | 1/2015 | Cohen et al. |
| 2015/0019191 A1 | 1/2015 | Maturana et al. |
| 2015/0032242 A1 | 1/2015 | Schouwenburg et al. |
| 2015/0032886 A1* | 1/2015 | Wang .................. G06F 11/3006 709/224 |
| 2015/0048952 A1 | 2/2015 | Murphy |
| 2015/0235161 A1 | 8/2015 | Azar et al. |
| 2015/0278407 A1 | 10/2015 | Vennelakanti et al. |
| 2015/0304193 A1 | 10/2015 | Ishii et al. |
| 2015/0378356 A1 | 12/2015 | Hefeeda et al. |
| 2016/0154693 A1* | 6/2016 | Uhde ................... G06F 11/079 714/49 |
| 2016/0217378 A1 | 7/2016 | Bellala et al. |
| 2016/0217410 A1 | 7/2016 | Santos et al. |
| 2017/0019483 A1 | 1/2017 | Maturana et al. |

(56) References Cited

U.S. PATENT DOCUMENTS

| | | | |
|---|---|---|---|
| 2017/0236391 A1* | 8/2017 | Palmeri | G01C 21/206 340/944 |
| 2018/0157995 A1 | 6/2018 | O'Malley | |
| 2018/0205803 A1 | 7/2018 | Asenjo et al. | |

FOREIGN PATENT DOCUMENTS

| | | |
|---|---|---|
| CN | 1605958 A | 4/2005 |
| CN | 1690685 A | 11/2005 |
| CN | 1833424 A | 9/2006 |
| CN | 101086760 A | 12/2007 |
| CN | 101091195 A | 12/2007 |
| CN | 100362442 C | 1/2008 |
| CN | 101114160 | 1/2008 |
| CN | 101326471 A | 12/2008 |
| CN | 101536002 | 9/2009 |
| CN | 101553763 A | 10/2009 |
| CN | 201444256 U | 4/2010 |
| CN | 101739007 | 6/2010 |
| CN | 101776862 A | 7/2010 |
| CN | 102435870 A | 5/2012 |
| CN | 102449567 A | 5/2012 |
| CN | 102483837 A | 5/2012 |
| CN | 102640475 A | 8/2012 |
| CN | 102830666 A | 12/2012 |
| CN | 102927937 | 2/2013 |
| CN | 103019102 A | 4/2013 |
| CN | 103403753 A | 11/2013 |
| CN | 104142629 A | 11/2014 |
| CN | 104142630 A | 11/2014 |
| CN | 104142662 A | 11/2014 |
| CN | 104142664 A | 11/2014 |
| CN | 104142679 A | 11/2014 |
| CN | 104144204 A | 11/2014 |
| DE | 19834456 | 2/2000 |
| DE | 10 2014 102 844 A1 | 9/2014 |
| EP | 1209558 A2 | 5/1996 |
| EP | 1 491 977 A2 | 12/2004 |
| EP | 1531373 A2 | 5/2005 |
| EP | 1686442 A1 | 8/2006 |
| EP | 1 868 152 A1 | 12/2007 |
| EP | 1933214 | 6/2008 |
| EP | 2189900 A1 | 5/2010 |
| EP | 2293164 A1 | 3/2011 |
| EP | 2453326 | 5/2012 |
| EP | 2469466 A1 | 6/2012 |
| EP | 2 509 042 A1 | 10/2012 |
| EP | 2 660 667 A2 | 11/2013 |
| EP | 2 704 401 A1 | 3/2014 |
| EP | 2 778 816 A1 | 9/2014 |
| EP | 2 790 101 A1 | 10/2014 |
| EP | 2 801 935 A1 | 11/2014 |
| EP | 2 801 936 A1 | 11/2014 |
| EP | 2801938 | 11/2014 |
| EP | 2801940 | 11/2014 |
| EP | 2801941 | 11/2014 |
| EP | 3 037 901 A2 | 6/2016 |
| EP | 3 070 550 B1 | 7/2018 |
| JP | 2001-242931 A | 9/2001 |
| WO | 0111586 A | 2/2001 |
| WO | 169329 A2 | 9/2001 |
| WO | 0217131 | 2/2002 |
| WO | 02/057856 A2 | 7/2002 |
| WO | 03/007097 A1 | 1/2003 |
| WO | 03058506 A1 | 7/2003 |
| WO | 2008133715 | 11/2008 |
| WO | 2009046095 | 4/2009 |
| WO | 2011050482 | 5/2011 |
| WO | 2013007866 A1 | 1/2013 |
| WO | 2014/090310 A1 | 6/2014 |
| WO | 2016/001718 A1 | 1/2016 |

OTHER PUBLICATIONS

Non-Final Office Action for U.S. Appl. No. 13/677,060 dated Mar. 10, 2016, 66 pages.

Notice of Allowance for U.S. Appl. No. 13/725,660 dated Feb. 3, 2016, 47 pages.

Non-Final Office Action for U.S. Appl. No. 14/087,730 dated Mar. 11, 2016, 81 pages.

Non-Final Office Action for U.S. Appl. No. 14/087,821 dated Mar. 2, 2016, 86 pages.

Non-Final Office Action for U.S. Appl. No. 14/087,977 dated Mar. 17, 2016, 83 pages.

"Recursion Software, ""SCADA-Aware Mobile""", Frisco, TX, Aug. 29, 2012 (accessed from<<http://www.emsenergyautomation.com/brochures/scada.pdf>> on Feb. 11, 2016)".

"Ars Technica, ""Windows 7 themes: how to unlock them or create your own""", Nov. 12, 2009 (accessed from<<http://arstechnica.com/information-technology/2009/11/unlock-hidden-windows-7-themesl on Mar. 8, 2016»)".

Non-Final Office Action for U.S. Appl. No. 14/088,014 dated Mar. 22, 2016, 98 pages.

"Microsoft," "Sharing Outlook 2010 ContactNotes/Field?", microsoft.com, Jun. 23, 2011 (accessed on Mar. 11, 2016) from http://answers.microsoff.com/en-us/office/forum/office_2010-outlook/sharing-outlook-2010-contactnotes-field/c7e74273-ff60-4da3-a3aa-ccb6cadcd25e?auth=1).

Notice of Allowance for U.S. Appl. No. 13/608,850 dated Apr. 12, 2016, 37 pages.

Notice of Allowance for U.S. Appl. No. 14/087,873 dated Apr. 18, 2016, 26 pages.

Chinese Office Action for Chinese Application No. 201410196198.5 dated Mar. 29, 2016, 18 pages.

Office Action dated Nov. 25, 2015 for U.S. Appl. No. 14/087,873, 57 pages.

Final Office Action for U.S. Appl. No. 13/725,619 dated Dec. 4, 2015, 21 pages.

Final Office Action for U.S. Appl. No. 13/608,821 dated Dec. 7, 2015, 39 pages.

Final Office Action for U.S. Appl. No. 13/615,195, dated Feb. 11, 2016, 19 pages.

Non-Final Office Action for U.S. Appl. No. 13/725,543, dated Feb. 2, 2016, 15 pages.

Non-Final Office Action for U.S. Appl. No. 13/725,660, dated Jan. 21, 2016, 72 pages.

Final Office Action for U.S. Appl. No. 13/608,850, dated Dec. 9, 2015, 25 pages.

Office Action dated Nov. 24, 2015 for European Application No. 14167706.2-1955, 8 pages.

Office Action dated Nov. 24, 2015 for European Application No. 14167626.2-1955, 8 pages.

Office Action dated Sep. 22, 2015 for European Application No. 14167707.0-1955, 9 pages.

Office Action for U.S. Appl. No. 13/725,660 dated Aug. 18, 2015, 90 pgs.

Colombo, A.W., et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.

Colombo, Amando Walter, et al., "Towards the Factory of the Future: A Service-Oriented Cross-layer Infrastructure," ICT Shaping the World: A Scientific View, 2009, pp. 65-81.

Notice of Allowance for U.S. Appl. No. 13/725,578, dated Apr. 24, 2015, 23 pages.

Office Action for U.S. Appl. No. 13/677,060, dated Oct. 20, 2015, 48 pages.

Office Action for U.S. Appl. No. 13/615,195, dated Sep. 21, 2015, 19 pages.

Office Action for U.S. Appl. No. 13/725,660, dated Oct. 26, 2015, 79 pages.

Non-Final Office Action for U.S. Appl. No. 14/087,730, dated Feb. 9, 2017, 78 pages.

Chinese Office Action for CN Application Serial No. 201410198289.2, dated Dec. 15, 2016, 21 pages.

(56) References Cited

OTHER PUBLICATIONS

Chinese Office Action for CN Application Serial No. 201410195780. X, dated Feb. 3, 2017, 18 pages.
Chinese Office Action for CN Application Serial No. 201410196127. 5, dated Nov. 30, 2016, 13 pages.
Chinese Office Action for Chinese Application Serial No. 201410195780.X, dated May 26, 2016, 16 pages (including translation).
Final Office Action for U.S. Appl. No. 14/087,977, dated Jul. 13, 2016, 59 pages.
Final Office Action for U.S. Appl. No. 14/088,014, dated Jul. 15, 2016, 65 pages.
Non-Final Office Action for U.S. Appl. No. 14/087,922, dated Jul. 19, 2016, 120 pages.
Extended European Search Report for European Patent Application Serial No. 16160604.1, dated Aug. 17, 2016, 9 pages.
Office Action dated Dec. 27, 2004 for U.S. Appl. No. 10/162,315, 8 pages.
Office Action dated Jun. 15, 2005 for U.S. Appl. No. 10/162,315, 9 pages.
Office Action dated Sep. 9, 2005 for U.S. Appl. No. 10/162,315, 10 pages.
Vasudevan, A Web Services Primer, Apr. 4, 2001, XML.com, http://webservices.xml.com/pub/a/ws/2001/04/04/webservices/index. html, 10 pages.
Office Action dated Mar. 6, 2006 for U.S. Appl. No. 10/162,315, 8 pages.
W3C, Web Services Description Language, http://www.w3.org/TR/wsd1, Mar. 15, 2001, 36 pages.
European Search Report dated Mar. 18, 2004 for European Patent Application No. 03026339, 3 Pages.
Compuquest, Inc., SPM-IM-lnstant Messaging Client for SpreadMsg Wireless Messaging Software, http://www.compuquestinc.com/spmim.html, Aug. 13, 2002, 4 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
International Business Machines Corporation, Cross platform instant messaging using web services, Research Disclosure, Kenneth Mason Publications, Hampshire, GB, vol. 458, No. 156, Jun. 2002, 3 pages.
Office Action dated Jun. 18, 2014 for U.S. Appl. No. 13/725,578, 13 pages.
Office Action dated Aug. 19, 2014 for U.S. Appl. No. 13/615,195, 22 pages.
European Search Report dated Aug. 11, 2014 for European Application No. 14167706.2-1955, 7 pages.
European Search Report dated Aug. 11, 2014 for European Application No. 14167714.6-1955, 5 pages.
European Search Report dated Aug. 11, 2014 for European Application No. 14167626.2-1955, 9 pages.
European Search Report dated Aug. 11, 2014 for European Application No. 14167627.0-1955, 6 pages.
European Search Report dated Aug. 11, 2014 for European Application No. 14167703.9-1955, 7 pages.
European Search Report dated Aug. 11, 2014 for European Application No. 14167707.0-1955, 7 pages.
European Search Report dated Aug. 11, 2014 for European Application No. 14167708.8-1955, 5 pages.
European Search Report dated Aug. 11, 2014 for European Application No. 14167712.0-1955, 5 pages.
European Search Report dated Aug. 11, 2014 for European Application No. 14167511.6-1955, 6 pages.
Office Action dated Oct. 9, 2014 for U.S. Appl. No. 13/725,543, 10 pages.
Office Action dated Dec. 12, 2014 for U.S. Appl. No. 13/725,578, 24 pages.
Office Action dated Jan. 20, 2015 for U.S. Appl. No. 13/615,195, 22 pages.
Third Party Submission under 37 CFR 1.290 dated Nov. 21, 2014 for U.S. Appl. No. 14/087,873, 23 pages.
Office Action for U.S. Appl. No. 13/725,543 dated May 20, 2015, 15 pages.
Office Action for U.S. Appl. No. 13/608,821 dated Jun. 1, 2015, 44 pages.
Office Action for U.S. Appl. No. 13/608,850 dated Jun. 1, 2015, 38 pages.
Office Action for U.S. Appl. No. 13/677,060 dated Apr. 24, 2015, 54 pgs.
Office Action for U.S. Appl. No. 13/725,619 dated Jul. 17, 2015, 45 pages.
Non-Final Office Action for U.S. Appl. No. 14/088,011 dated May 12, 2016, 96 pages.
Office Action dated Jun. 21, 2016 for U.S. Appl. No. 13/615,195, 27 pages.
Final Office Action dated Jun. 17, 2016 for U.S. Appl. No. 13/725,543, 19 pages.
Office Action dated Jun. 17, 2016 for U.S. Appl. No. 14/087,970, 36 pages.
Chinese Office Action for Chinese Application No. 201410196775.0 dated May 5, 2016, 14 pages.
Chinese Office Action for Chinese Application No. 201410198289.2 dated Apr. 5, 2016, 18 pages.
Chinese Office Action for Chinese Application No. 201410196905.0 dated Apr. 5, 2016, 20 pages.
Chinese Office Action for Chinese Application No. 201410196127.5 dated Apr. 7, 2016, 13 pages.
Chinese Office Action for Chinese Application No. 201410196114.8 dated Apr. 25, 2016, 20pages.
Chinese Office Action for Chinese Application No. 201410196525.7, dated May 5, 2016, 13 pages.
Extended European Search Report for EP Patent Application Serial No. 16160611.6, dated Aug. 24, 2016, 10 pages.
Final Office Action for U.S. Appl. No. 14/087,730, dated Aug. 24, 2016, 113 pages.
Extended European Search Report for EP Patent Application Serial No. 16160602.5, dated Sep. 2, 2016, 9 pages.
Non-Final Office Action for U.S. Appl. No. 14/087,835, dated Sep. 23, 2016, 82 pages.
Final Office Action for U.S. Appl. No. 14/087,821, dated Sep. 9, 2016, 97 pages.
Extended European Search Report for EP Patent Application Serial No. 13166670.3, dated Jun. 14, 2016, 10 pages.
"Cloud Computing," Whatis.com, Oct. 27, 2009, http://searchcloudcomputing.techtarget.com/sDefinition/0,,sid201_gci1287881,00.html, 2 pages.
Mell, P., et al., "The NIST Definition of Cloud Computing," Oct. 7, 2009, http://csrc.nist.gov/groups/SNS/cloud/computing/index.html, 2 pages.
European Office Action for EP Patent Application Serial No. 16160611.6, dated Sep. 26, 2016, 2 pages.
European Office Action for EP Patent Application Serial No. 13166670.3, dated Jul. 18, 2016, 2 pages.
European Office Action for EP Patent Application Serial No. 16160604.1, dated Sep. 26, 2016, 2 pages.
Office Action for U.S. Appl. No. 13/615,195, dated Oct. 21, 2016, 44 pages.
Office Action for U.S. Appl. No. 14/088,011, dated Nov. 1, 2016, 79 pages.
European Office Action for EP Patent Application Serial No. 16160602.5, dated Oct. 10, 2016, 2 pages.
Office Action for U.S. Appl. No. 14/088,014, dated Nov. 17, 2016, 61 pages.
Chinese Office Action for CN Application Serial No. 201410196114.8, dated Nov. 9, 2016, 19 pages.
Chinese Office Action for CN Application Serial No. 201410196905.0, dated Nov. 18, 2016, 6 pages.
Office Action for U.S. Appl. No. 14/087,922, dated Nov. 25, 2016, 65 pages.
European Office Action for EP Patent Application Serial No. 16160610.8, dated Oct. 17, 2016, 2 pages.

(56) References Cited

OTHER PUBLICATIONS

Office Action for European Patent Application Serial No. 16160604.1-1802, dated May 17, 2017, 6 pages.
Office Action for U.S. Appl. No. 14/088,011, dated May 17, 2017.
Rouse, et al. "Definition Industrial Control System (ICS," whatis.techtarget.com, ed. Mar. 2016 (accessed from <<http://whatistechtarget.com/definition/industrial-control-system-ICS>> on Jan. 11, 2017).
Examiner Answer to Appeal Brief for U.S. Appl. No. 14/087,977, dated Feb. 1, 2017.
Chinese Office Action for CN Application Serial No. 201410196150.4, dated Mar. 2, 2017, 37 pages (with English Translation).
Office Action for U.S. Appl. No. 14/087,970, dated Apr. 12, 2017, 59 pages.
Office Action for U.S. Appl. No. 14/658,394, dated Apr. 21, 2017, 97 pages.
Office Action for U.S. Appl. No. 15/388,260, dated Apr. 24, 2017, 101 pages.
Office Action for U.S. Appl. No. 14/658,345, dated Mar. 17, 2017, 95 pages.
Office Action for U.S. Appl. No. 14/658,327, dated May 1, 2017, 99 pages.
Notice of Allowance for U.S. Appl. No. 14/087,835, dated Jan. 31, 2017, 25 pages.
Givehchi, et al., "Control-as-a-Service from the Cloud: A Case Study for using Virtualized PLCs," 2014 10th IEEE Workshop on Factory Communication Systems (WFCS 2014), May 5, 2014 IEEE, 4 pages.
Office Action for U.S. Appl. No. 14/087,821 dated Sep. 7, 2017, 63 pages.
Final Office Action for U.S. Appl. No. 14/087,730 dated Aug. 18, 2017, 72 pages.
Office Action for U.S. Appl. No. 15/214,583 dated Aug. 28, 2017, 80 pages.
Final Office Action for U.S. Appl. No. 14/658,345 dated Sep. 25, 2017, 52 pages.
Final Office Action for U.S. Appl. No. 15/388,260 dated Oct. 18, 2017, 76 pages.
Office Action for U.S. Appl. No. 15/206,744 dated Nov. 6, 2017, 48 pages.
Office Action for U.S. Appl. No. 14/658,327 dated Oct. 30, 2017, 48 pages.
Final Office Action for U.S. Appl. No. 14/658,394 dated Nov. 16, 2017, 49 pages.
Office Action for U.S. Appl. No. 15/490,076 dated Dec. 20, 2017, 37 pages.
Office Action for U.S. Appl. No. 15/278,139 dated Jan. 11, 2018, 103 pages.
Final Office Action for U.S. Appl. No. 14/087,821 dated Dec. 14, 2017, 37 pages.
Final Office Action for U.S. Appl. No. 14/088,011 dated Nov. 22, 2017, 77 pages.
Office Action for U.S. Appl. No. 14/087,970 dated Feb. 12, 2018, 69 pages.
Chinese Office Action for CN Application Serial No. 201410196114.8, dated Dec. 13, 2017, 26 pages.
Office Action for U.S. Appl. No. 15/143,733 dated Mar. 8, 2018, 141 pages.
Office Action for U.S. Appl. No. 15/490,076 dated Apr. 2, 2018, 23 pages.
Office Action for U.S. Appl. No. 14/658,327 dated Apr. 10, 2018, 43 pages.
Office Action for U.S. Appl. No. 14/658,345 dated Mar. 14, 2018, 56 pages.
Office Action for U.S. Appl. No. 14/658,394, dated Apr. 6, 2018, 40 pages.
Office Action for U.S. Appl. No. 15/143,733, dated Jun. 18, 2018, 76 pages.
Office Action for U.S. Appl. No. 15/599,921, dated Jun. 29, 2018, 75 pages.

Office Action for U.S. Appl. No. 14/087,970, dated Aug. 1, 2018, 68 pages.
Wikipedia; "PID Controller"; Jul. 20, 2018; https://en.wikipedia.org/wiki/PID_controller (Year: 2018).
Communication pursuant to Article 94(3) EPC for EP Application Serial No. 14167714.6 dated Aug. 3, 2018, 5 pages.
Communication pursuant to Article 94(3) EPC for EP Application Serial No. 14167708.8 dated Aug. 3, 2018, 5 pages.
Communication pursuant to Article 94(3) EPC for EP Application Serial No. 14167712.0 dated Aug. 3, 2018, 5 pages.
Search Report received for Chinese Application Serial No. 201610149668.1 dated Apr. 2, 2018, 1 page.
First Office Action received for Chinese Patent Application Serial No. 201610151380.8 dated Jul. 17, 2018, 65 pages.
Office Action for U.S. Appl. No. 14/658,345, dated Sep. 13, 2018, 79 pages.
Search Report received for Chinese Application Serial No. 201610149635.7 dated Apr. 2, 2018, 1 page.
Final Office Action received for U.S. Appl. No. 13/615,195 dated Jan. 20, 2015, 22 pages.
Chinese First Office Action for Chinese Application No. 20170339669.7 dated Dec. 11, 2018, 25 pages (Including English Translation).
Notice of Allowance received for U.S. Appl. No. 15/923,127 dated Nov. 21, 2018, 85 pages.
Non-Final Office Action received for U.S. Appl. No. 14/658,327 dated Nov. 1, 2018, 58 pages.
Final Office Action received for U.S. Appl. No. 14/658,394 dated Nov. 1, 2018, 51 pages.
Second Office Action received for Chinese Patent Application Serial No. 201610149668.1 dated Oct. 24, 2018, 18 pages (including English Translation).
Second Office Action received for Chinese Patent Application Serial No. 201610149635.7 dated Oct. 24, 2018, 24 pages (including English Translation).
First Office Action received for Chinese Patent Application Serial No. 201610151417.7 dated Sep. 18, 2018, 28 pages (including English Translation).
Non-Final Office Action received for U.S. Appl. No. 10/234,504 dated Oct. 18, 2006, 15 pages.
Final Office Action received for U.S. Appl. No. 10/234,504 dated Feb. 7, 2007, 12 pages.
Final Office Action received for U.S. Appl. No. 10/234,504 dated May 1, 2007, 12 pages.
Non-Final Office Action received for U.S. Appl. No. 10/162,314 dated Dec. 15, 2005, 17 pages.
Final Office Action received for U.S. Appl. No. 10/162,314 dated Jun. 5, 2006, 23 pages.
Non-Final Office Action received for U.S. Appl. No. 10/162,314 dated Nov. 16, 2006, 20 pages.
Final Office Action received for U.S. Appl. No. 10/162,314 dated Apr. 30, 2007, 35 pages.
Non-Final Office Action received for U.S. Appl. No. 10/162,314 dated Oct. 25, 2007, 28 pages.
Final Office Action received for U.S. Appl. No. 10/162,314 dated May 5, 2008, 31 pages.
Non-Final Office Action received for U.S. Appl. No. 10/161,848 dated Nov. 15, 2005, 15 pages.
Final Office Action received for U.S. Appl. No. 10/161,848 dated Mar. 27, 2006, 13 pages.
Non-Final Office Action received for U.S. Appl. No. 10/161,848 dated Sep. 5, 2006, 15 pages.
Final Office Action received for U.S. Appl. No. 10/161,848 dated Feb. 23, 2007, 17 pages.
Non-Final Office Action received for U.S. Appl. No. 10/161,848 dated May 7, 2007, 14 pages.
Final Office Action received for U.S. Appl. No. 10/161,848 dated Oct. 17, 2007, 15 pages.
Non-Final Office Action received for U.S. Appl. No. 10/161,848 dated Feb. 7, 2008, 14 pages.
Final Office Action received for U.S. Appl. No. 10/161,848 dated Sep. 9, 2008, 17 pages.
Non-Final Office Action received for U.S. Appl. No. 12/410,632 dated Feb. 1, 2011, 56 pages.

(56) References Cited

OTHER PUBLICATIONS

Final Office Action received for U.S. Appl. No. 12/410,632 dated May 17, 2011, 17 pages.
Non-Final Office Action received for U.S. Appl. No. 12/410,632 dated Sep. 2, 2011, 11 pages.
Non-Final Office Action received for U.S. Appl. No. 10/298,366 dated Apr. 20, 2006, 13 pages.
Final Office Action received for U.S. Appl. No. 10/298,366 dated Sep. 29, 2006, 16 pages.
Non-Final Office Action received for U.S. Appl. No. 10/298,366 dated Jan. 31, 2007, 12 pages.
Final Office Action received for U.S. Appl. No. 10/298,366 dated Jul. 18, 2007, 14 pages.
Non-Final Office Action received for U.S. Appl. No. 10/298,366 dated Dec. 17, 2007, 10 pages.
Non-Final Office Action received for U.S. Appl. No. 10/298,366 dated Jun. 11, 2008, 24 pages.
Final Office Action received for U.S. Appl. No. 10/298,366 dated Nov. 18, 2008, 20 pages.
Notice of Allowance received for U.S. Appl. No. 10/298,366 dated Feb. 2, 2009, 23 pages.
Non-Final Office Action received for U.S. Appl. No. 13/615,195, dated Aug. 19, 2014, 24 pages.
Communication pursuant to Article 96(2) EPC for EP Application Serial No. 03026339.6 dated Apr. 6, 2006, 6 pages.
Communication pursuant to Article 96(2) EPC for EP Application Serial No. 13166670.3 dated Dec. 14, 2018, 4 pages.
Chinese Third Office Action for Chinese Application No. 201410196114.8 dated Apr. 12, 2017, 25 pages (Including English Translation).
Chinese Fourth Office Action for Chinese Application No. 201410196114.8 dated Aug. 15, 2017, 24 pages (Including English Translation).
Chinese Second Office Action for Chinese Application No. 201410196198.5 dated Dec. 21, 2016, 10 pages Including English Translation).
Chinese Third Office Action for Chinese Application No. 201410196198.5 dated Mar. 28, 2017, 10 pages (Including English Translation).
Chinese Second Office Action for Chinese Application No. 201410196525.7 dated Dec. 21, 2016, 8 pages (Including English Translation).
Chinese Second Office Action for Chinese Application No. 201410196775.0 dated Dec. 7, 2016, 8 pages (Including English Translation).
Chinese Third Office Action for CN Application Serial No. 201410196150.4, dated Nov. 29, 2017, 10 pages Including English Translation).
Communication pursuant to Article 94(3) EPC for EP Application Serial No. 14167511.6 dated Jan. 23, 2019, 7 pages.
Communication pursuant to Article 94(3) EPC for EP Application Serial No. 14167703.9 dated Jan. 23, 2019, 6 pages.
Anonymous: "Hash function—Wikipedia", Wikipedia, Apr. 19, 2009, URL:https://en.wikipedia.org/w/index.php?title=Hash_function &oldid=284890279, 9 pages.
Communication pursuant to Article 94(3) EPC for EP Application Serial No. 16160611.6 dated Apr. 5, 2017, 5 pages.
Communication pursuant to Article 94(3) EPC for EP Application Serial No. 16160611.6 dated May 10, 2017, 5 pages.
Second Office Action received for Chinese Patent Application Serial No. 201610151417.7 dated Jan. 22, 2019, 7 pages (Including English Translation).
Communication pursuant to Article 94(3) EPC for EP Application Serial No. 16160604.1 dated Jun. 13, 2017, 6 pages.
Summons to attend oral proceedings pursuant to Rule 115(1) EPC received for EP Patent Application Serial No. 14167706.2 dated Dec. 13, 2018, 65 pages.
Second Office Action received for Chinese Patent Application Serial No. 201410196150.4 dated Aug. 3, 2017, 10 pages (Including English Translation).
Extended European Search Report received for EP Patent Application Serial No. 16160610.8 dated Sep. 8, 2016, 9 pages.
Non-Final Office Action received for U.S. Appl. No. 13/725,543 dated Oct. 9, 2014, 10 pages.
Final Office Action received for U.S. Appl. No. 13/725,543 dated May 20, 2015, 15 pages.
Non-Final Office Action received for U.S. Appl. No. 15/621,206 dated Mar. 22, 2019, 118 pages.
Non-Final Office Action received for U.S. Appl. No. 14/658,345 dated May 13, 2019, 78 pages.
Third Office Action received for Chinese Patent Application Serial No. 201610149635.7 dated Apr. 26, 2019, 23 pages (including English Translation).
Notice of Opposition received for EP Patent Application Serial No. 16160611.6 dated Apr. 11, 2019, 789 pages.
Wen et al., "Current Trends and Perspectives in Wireless Virtualization", 2013 International Conference on Selected Topics in Mobile and Wireless Networking (MoWNeT), 2013, 6 pages.
Wang et al., "The Research of Chemical Plant Monitoring Base on the Internet of Things and 3D Visualization Technology", Proceeding of the IEEE International Conference on Information and Automation, Aug. 2013, 5 pages.
Non-Final Office Action received for U.S. Appl. No. 15/714,333 dated Jul. 17, 2019, 113 pages.
Notice of Allowance received for U.S. Appl. No. 15/621,206 dated Aug. 19, 2019, 52 pages.
Non-Final Office Action received for U.S. Appl. No. 14/658,394 dated Aug. 19, 2019, 70 pages.
First Office Action received for Chinese Patent Application Serial No. 201710778822 6 dated Jun. 24, 2019, 29 pages (Including English Translation).
Second Office Action received for Chinese Patent Application Serial No. 201710339669.7 dated Jul. 2, 2019, 20 pages (Including English Translation).
Non-Final Office Action received for U.S. Appl. No. 16/129,116 dated Apr. 1, 2020, 142 pages.
Non-Final Office Action received for U.S. Appl. No. 15/714,333 dated Apr. 15, 2020, 44 pages.
Final Office Action received for U.S. Appl. No. 15/970,932 dated Apr. 13, 2020, 37 pages.
Non-Final Office Action received for U.S. Appl. No. 14/658,345 dated May 14, 2020, 83 pages.
Communication pursuant to Article 94(3) EPC received for EP Patent Application Serial No. 16160602.5 dated May 19, 2020, 07 pages.
Communication pursuant to Article 94(3) EPC received for EP Patent Application Serial No. 16160610.8 dated May 27, 2020, 08 pages.
Summons to attend oral proceedings pursuant to Rule 115(1) EPC received for EP Patent Application Serial No. 16160611.6 dated Dec. 19, 2019, 26 pages.
Third Office Action received for Chinese Patent Application Serial No. 201710778822.6 dated Mar. 3, 2020, 43 pages (Including English Translation).
Communication pursuant to Article 94(3) EPC received for EP Patent Application Serial No. 14167627.0 dated Jan. 23, 2020, 6 pages.
Summons to attend oral proceedings pursuant to Rule 115(1) EPC received for EP Patent Application Serial No. 14167703.9 dated Feb. 6, 2020, 8 pages.
Notification of Grant of Patent for Invention received for Chinese Patent Application Serial No. 201710339669.7 dated Dec. 31, 2019, 7 pages (Including English Translation).
Non-Final Office Action received for U.S. Appl. No. 14/658,394 dated Feb. 20, 2020, 67 pages.
Second Office Action received for Chinese Patent Application Serial No. 201710778822 6 dated Sep. 20, 2019, 5 pages.
Supplementary Search Report received for Chinese Patent Application Serial No. 201710339669.7 dated Sep. 18, 2019, 2 pages.
Final Office Action received for U.S. Appl. No. 15/714,333 dated Oct. 25, 2019, 36 pages.
Non-Final Office Action received for U.S. Appl. No. 15/970,932 dated Nov. 14, 2019, 122 pages.

(56) References Cited

OTHER PUBLICATIONS

Final Office Action received for U.S. Appl. No. 14/658,345 dated Nov. 26, 2019, 48 pages.
Summons to attend oral proceedings pursuant to Rule 115(1) EPC received for EP Patent Application Serial No. 16160611.6 dated Oct. 30, 2020, 05 pages.
Notification of Reexamination received for Chinese Application No. 201610149635.7, dated Nov. 5, 2020, 17 pages.
Notification of Reexamination received for Chinese Application No. 201610149668.1, dated Oct. 20, 2020, 3 pages.
Final Office Action received for U.S. Appl. No. 16/129,116 dated Jul. 2, 2020, 58 pages.
Final Office Action received for U.S. Appl. No. 15/714,333 dated Jul. 22, 2020, 40 pages.
Non-Final Office Action received for U.S. Appl. No. 14/658,394 dated Aug. 5, 2020, 59 pages.
Notice of Allowance received for U.S. Appl. No. 15/714,333 dated Dec. 17, 2020, 59 pages.
Final Office Action received for U.S. Appl. No. 15/714,333 dated Nov. 4, 2020, 62 pages.
Non-Final Office Action received for U.S. Appl. No. 16/129,116 dated Nov. 16, 2020, 51 pages.
Summons to attend oral proceedings pursuant to Rule 115(1) EPC received for European Patent Application Serial No. 14167708.8 dated Mar. 18, 2021, 09 pages.
Non-Final Office Action received for U.S. Appl. No. 16/234,039 dated May 13, 2021, 149 pages.
Non-Final Office Action received for U.S. Appl. No. 16/900,022 dated May 27, 2021, 146 pages.
Communication Pursuant to Rules 94(3) EPC received for EP Patent Application Serial No. 16160602.5 dated May 11, 2021, 07 pages.
Notice of Allowance received for U.S. Appl. No. 14/658,394 dated Feb. 9, 2021, 92 pages.
Non-Final Office Action received for U.S. Appl. No. 14/658,345 dated Jun. 24, 2021, 73 pages.
Communication pursuant to Article 94(3) EPC received for European application No. 16160610.8 dated May 27, 2021, 9 pages.
First Office Action received for Chinese application No. 201810240055.8 dated Jun. 25, 2021, 22 pages (Including English Translation).
Non-Final Office Action received for U.S. Appl. No. 16/599,276 dated Dec. 3, 2021, 172 pages.
Final Office Action received for U.S. Appl. No. 16/900,022 dated Dec. 30, 2021, 66 pages.
Notice of Allowance received for U.S. Appl. No. 16/234,039 dated Oct. 25, 2021, 24 pages.
European Office Action for EP Patent Application Serial No. 14167708.8, dated Oct. 20, 2021, 10 pages.
Communication pursuant to Article 94(3) EPC received for European Application Serial No. 11152520.0-1205 dated Nov. 8, 2021, 8 pages.
Communication Pursuant to Rules 94(3) EPC received for EP Patent Application Serial No. 16160602.5 dated Sep. 23, 2022, 08 pages.
Communication Pursuant to Article 94(3) EPC received for EP Patent Application Serial No. 16160610.8 dated Sep. 23, 2022, 10 pages.
Non-Final Office Action received for U.S. Appl. No. 17/344,118 dated Aug. 31, 2022, 164 pages.

* cited by examiner

CLOUD-BASED INDUSTRIAL CONTROLLER

TECHNICAL FIELD

The subject application relates generally to industrial automation, e.g., to a cloud-based industrial controller for industrial automation.

BACKGROUND

Industrial controllers and their associated input/output (I/O) devices can be useful to the operation of modern industrial automation systems. These industrial controllers can interact with field devices on the plant floor to control automated processes relating to such objectives as product manufacture, material handling, batch processing, supervisory control, and other such applications. Industrial controllers can store and execute user-defined control programs to effect decision-making in connection with the controlled process. Such programs can include, but are not limited to, ladder logic, sequential function charts, function block diagrams, structured text, or other such programming structures. In general, industrial controllers can read input data from sensors and metering devices that can provide discreet and telemetric data regarding one or more states of the controlled system, and can generate control outputs based on these inputs in accordance with the user-defined program.

In addition to industrial controllers and their associated I/O devices, some industrial automation systems also can include low-level control systems, such as vision systems, barcode marking systems, variable frequency drives, industrial robots, and the like, which can perform local control of portions of the industrial process, or which can have their own localized control systems.

During operation of a given industrial automation system, comprising a collection of industrial devices, industrial processes, other industrial assets, and network-related assets, users (e.g., operators, technicians, maintenance personnel, etc.) typically can monitor or manage operations of the industrial automation system, perform maintenance, repairs, or upgrades on the industrial automation system, or perform other tasks in connection with operation of the industrial automation system. The above-described description of today's industrial control and business systems is merely intended to provide a contextual overview of relating to conventional industrial automation systems, and is not intended to be exhaustive.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Presented herein are various systems, methods, and techniques of the disclosed subject matter that relate to the use of data analysis (e.g., big data analysis) in a cloud platform to facilitate cloud-based control of an industrial automation system(s) to enhance control and performance of the industrial automation system(s). A collection component (e.g., cloud-based collection component on the cloud platform) can collect information from the industrial automation system via one or more cloud gateway components associated with industrial devices, industrial processes, other industrial assets, and other components (e.g., network component) of the industrial automation system(s) or extrinsic data sources. A cloud-based industrial controller can control the industrial devices, industrial processes, other industrial assets, and other components of the industrial automation system(s) via control algorithms that can execute on the cloud platform. The cloud-based industrial controller can be a virtualized industrial controller, for example. The cloud-based industrial controller can monitor and analyze the collected information, generate control instructions based at least in part on the analysis results, and communicate the control instructions to the devices, processes, other assets, and/or other components of the industrial automation system to control operation of the industrial automation system.

In some implementations, an industrial automation system can comprise an industrial plant-based industrial controller (e.g., a hardware-based industrial controller), wherein the cloud-based industrial controller can interface with the industrial plant-based industrial controller. Based at least in part on the results of the analysis of the collected information, the cloud-based industrial controller can determine supplemental control instructions, and can provide the supplemental control instructions to the industrial plant-based industrial controller to assist in controlling the industrial automation system and control decision-making.

Control algorithms for the industrial automation system can be stored in the cloud (e.g., in a cloud-based data store). The stored control algorithms can be in a standardized, agnostic format. The cloud-based industrial controller can translate a control algorithm into any desired format for any type of controller platform for execution of the translated control algorithm by the cloud-based industrial controller or industrial plant-based industrial controller to facilitate controlling operations of the industrial automation system.

To facilitate standardizing and controlling operations of multiple industrial automation systems at multiple industrial facilities (e.g., associated with an industrial enterprise), the cloud-based industrial controller, which can be a virtualized industrial controller, can be replicated, as desired, wherein respective virtualized industrial controllers can be utilized in respective industrial automation systems at respective industrial facilities. In addition, or in the alternative, the information and control algorithms relating to the virtualized industrial controller can be translated into the respective formats for the respective controller platforms of the respective industrial plant-based industrial controllers at the respective industrial facilities. Such translated information and control algorithms can be provided to respective industrial plant-based industrial controllers (e.g., hardware-based industrial controllers) for the respective industrial automation systems at the respective industrial facilities, wherein the respective industrial plant-based industrial controllers can utilize (e.g., implement, execute) the respectively translated and formatted information and control algorithms to facilitate controlling the respective industrial automation systems.

In some implementations, the cloud-based industrial controller can operate in conjunction with an analytics component (e.g., a cloud-based analytics engine) to determine modifications that can be made to the cloud-based industrial controller, industrial plant-based industrial controller, and/or other aspects associated with the industrial automation system to enhance control and operation of the industrial automation system and/or achieve one or more defined goals in connection with operation of the industrial automation system (e.g., reduction or minimization of energy costs, maximize or improve production output, reduction or minimization of maintenance downtime with regard to industrial devices). For instance, the cloud-based industrial controller can modify its operation (e.g., modify a control algorithm) or facilitate modifying operation of an associated industrial plant-based industrial controller, in response to analytics results generated by the analytics component performing analytics on data relating to the industrial automation system. Alternatively, the analytics component can generate a recommendation message that can include a recommendation to modify the operation (e.g., control algorithm or routine) of the industrial plant-based industrial controller and can communicate the recommendation message to a user (e.g., authorized plant personnel) associated with the industrial automation system for consideration and/or responsive action by the user.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
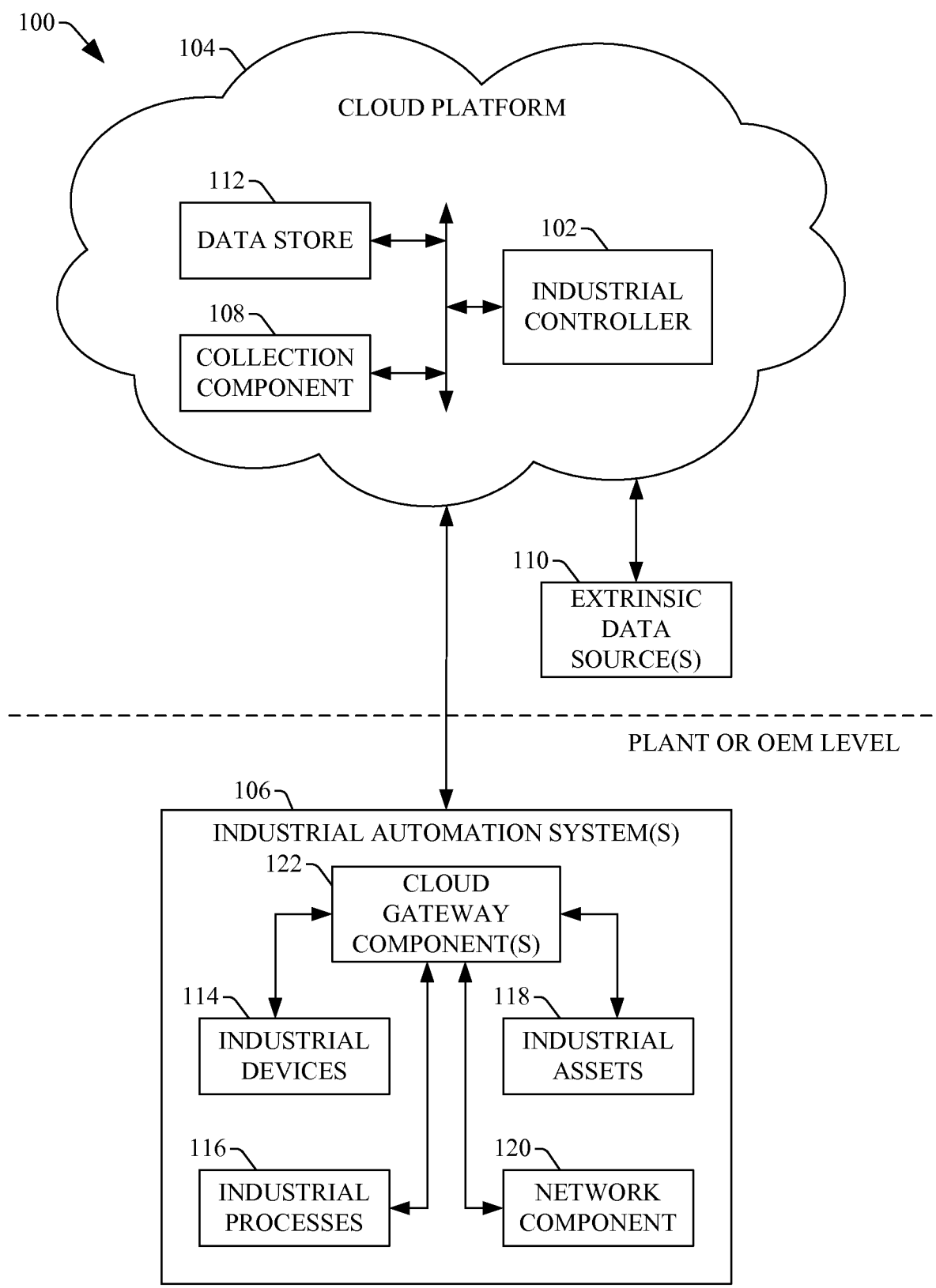
FIG. 1 illustrates a block diagram of an example system that can employ a cloud-based industrial controller that can control an industrial automation system(s) based at least in part on data (e.g., cloud-based data) relating to the industrial automation system(s) associated with an industrial enterprise to facilitate enhancing control (e.g., cloud-based control) of and performance of operations associated with the industrial automation system(s), in accordance with various implementations and embodiments of the disclosed subject matter.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

Industrial automation systems can perform various processes to produce desired products or processed materials. An industrial automation system can comprise various industrial devices, industrial processes, other industrial assets, and network-related assets (e.g., communication network devices and software). During operation of a given industrial automation system, users, such as, for example, operators, technicians, maintenance personnel, typically can monitor or manage operations of the industrial automation system, perform maintenance, repairs, or upgrades on the industrial automation system, or perform other tasks in connection with operation of the industrial automation system.

To that end, presented are various systems, methods, and techniques of the disclosed subject matter that relate to the use of data analysis (e.g., big data analysis) in a cloud platform to facilitate cloud-based control of an industrial automation system(s) to enhance control and performance of the industrial automation system(s). A collection component (e.g., cloud-based collection component on the cloud platform) can collect information from the industrial automation system via one or more cloud gateway components associated with industrial devices, industrial processes, other industrial assets, and other components (e.g., network component) of the industrial automation system(s) or extrinsic data sources. A cloud-based industrial controller can control the industrial devices, industrial processes, other industrial assets, and other components of the industrial automation system(s) via control algorithms that can execute on the cloud platform. The cloud-based industrial controller can be a virtualized industrial controller, for example. The cloud-based industrial controller can monitor and analyze the collected information, generate control instructions based at least in part on the analysis results, and communicate the control instructions to the devices, processes, other assets, and/or other components of the industrial automation system to control operation of the industrial automation system.

In some implementations, an industrial automation system can comprise an industrial plant-based industrial controller (e.g., a hardware-based industrial controller), wherein the cloud-based industrial controller can interface with the industrial plant-based industrial controller. Based at least in part on the results of the analysis of the collected information, the cloud-based industrial controller can determine supplemental control instructions, and can provide the supplemental control instructions to the industrial plant-based industrial controller to assist in controlling the industrial automation system and control decision-making.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or application programming interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a block diagram of an example system 100 that can employ a cloud-based industrial controller that can control an industrial automation system(s) based at least in part on data (e.g., cloud-based data) relating to the industrial automation system(s) associated with an industrial enterprise to facilitate enhancing control (e.g., cloud-based control) of and performance of operations associated with the industrial automation system(s), in accordance with various implementations and embodiments of the disclosed subject matter. The system 100 can comprise an industrial controller 102 (e.g., cloud-based industrial controller), which can be located on a cloud platform 104 that can be associated with one or more industrial automation systems, comprising an industrial automation system 106. The industrial controller 102 can be a cloud-based virtualized industrial controller, for example. The industrial controller 102 can employ data analysis (e.g., big data analysis) in the cloud platform 104 to facilitate cloud-based control of the industrial automation system(s) 106 to enhance control and performance of the industrial automation system(s) 106.

The industrial controller 102 can comprise or be associated with a collection component 108 (e.g., cloud-based collection component) that can collect or obtain data (e.g., industrial-automation-system-related data) from the industrial automation system(s) 106 and/or other data sources, such as extrinsic data sources 110. The collection component 108 can store the collected data in a data store 112 (e.g., cloud-based data store) of or associated with the industrial controller 102 for future data analysis, and/or the industrial controller 102 can analyze the data as it is received by the industrial controller 102. In some implementations, the industrial controller 102 also can receive analytics results from an analytics component (e.g., cloud-based analytics component, not shown in FIG. 1) that can perform analytics on the collected data, wherein the industrial controller 102 can perform operations and control the industrial automation system(s) 106, based at least in part on the analytics results and/or associated (e.g., corresponding), notifications, instructions, or recommendations (e.g., notifications, instructions, or recommendations generated by the analytics component based at least in part on the analytics results), as more fully described herein.

The industrial automation system 106 can comprise one or more industrial devices 114, industrial processes 116, or other industrial assets 118 that can be distributed throughout an industrial facility(ies) and respectively associated with various of the other industrial devices 114, industrial processes 116, or other industrial assets 118, in accordance with a desired industrial-automation-system configuration. The industrial automation system 106 can perform industrial processes or other actions to facilitate producing desired products, processed materials, etc., as an output, in accordance with the control operations performed by the industrial controller 102.

The industrial automation system 106 also can include a network component 120 that can be associated with (e.g., integrated with, interfaced with, and/or communicatively connected to) the various industrial devices 114, industrial processes 116, and/or other industrial assets 118 of the industrial automation system 106 to facilitate communication of information (e.g., command or control information, status information, production information, etc.) between the various industrial devices 114, industrial processes 116, and/or other industrial assets 118 via the network component 120, and/or communication with the industrial controller 102 via the network component 120. The network component 120, and/or all or a portion of the industrial devices 114 or other industrial assets 118, can be associated with (e.g., interfaced with, communicatively connected to (e.g., via one or more cloud gateway components 122) the collection component 108 and industrial controller 102 to facilitate the communication of data between the industrial automation system 106 and the collection component 108 and industrial controller 102.

The network component 120 can comprise network-related devices (e.g., communication devices, routers (e.g., wireline or wireless routers), switches, etc.), wherein respective network-related devices can be connected to or interfaced with certain other network-related devices to form a communication network having a desired communication network configuration. In some implementations, one or more network-related devices of the network component 120 can be connected to or interfaced with one or more industrial devices 114, industrial processes 116, and/or other industrial assets 118 to facilitate collecting data (e.g., industrial-automation-system-related data) from the one or more industrial devices 114, industrial processes 116, and/or other industrial assets 118 or communicating information (e.g., control signals, parameter data, configuration data, etc.) to the one or more industrial devices 114, industrial processes 116, and/or other industrial assets 118.

The industrial controller 102 can monitor or track the operation of the industrial automation system 106, including monitoring and tracking the respective operations of respective industrial devices 114, industrial processes 116, other industrial assets 118, and/or network-related devices of the network component 120, and monitoring and tracking the configuration of the industrial automation system 106. The collection component 108 can receive, obtain, detect, or collect data relating to the operation and configuration of the respective industrial devices 114, industrial processes 116, other industrial assets 118, and/or network-related devices of the network component 120 of the industrial automation system 106, as desired (e.g., automatically, dynamically, or continuously, in real or near real time) via the one or more cloud gateway components 122 or network component 120, in accordance with defined control criteria. For example, the collection component 108 can receive data relating to the industrial devices 114 (e.g., operation, status, or configurations of the industrial devices, properties or characteristics of the industrial devices, maintenance records of the industrial devices, employees associated with respective industrial devices), industrial processes 116 (e.g., operation, status, or configurations of the industrial processes, properties or characteristics of the industrial processes, maintenance records associated with the industrial processes, employees associated with respective industrial processes), and the other industrial assets 118 (e.g., operation, status, or configurations of the industrial assets, properties or characteristics of the industrial assets, maintenance records associated with the industrial assets, employees associated with respective industrial assets).

The industrial controller 102 (and/or collection component 108) can be interfaced with the industrial devices 114, industrial processes 116, and other industrial assets 118 via respective input/output (I/O) devices of or associated with the respective industrial devices 114, industrial processes 116, and other industrial assets 118, and via one or more cloud gateway components, comprising cloud gateway component 122, of (e.g., integrated with) or associated with (e.g., communicatively connected to) the respective I/O devices of or associated with the respective industrial devices 114, industrial processes 116, and other industrial assets 118. The industrial controller 102 (and/or collection component 108) can receive and collect data relating to the respective the industrial devices 114, industrial processes 116, and other industrial assets 118 from the respective industrial devices 114, industrial processes 116, and other industrial assets 118 via the respective I/O devices the one or more cloud gateway components 122. The industrial controller 102 and/or collection component 108 also can receive or collect data relating to operation of the sub-components (e.g., network-related devices) of the network component 120 (e.g., operation or status of the network devices or assets, communication conditions associated with a communication channel, total bandwidth of a communication channel, available bandwidth of a communication channel, properties or characteristics of the network devices or assets, maintenance records associated with the network devices or assets, configurations of the network devices or assets, employees associated with respective network-related devices). The industrial controller 102 (and/or collection component 108) further can receive and collect data relating to the industrial automation system 106 from one or more extrinsic data sources 110.

The industrial controller 102 (and/or the analytics component, associated therewith) can analyze the received and collected data, and the industrial controller 102 can determine and generate (e.g., automatically or dynamically determine and generate) respective control information (e.g., control instructions or commands) in accordance with one or more control algorithms, and/or other determine and generate other information (e.g., modification or configuration information to facilitate modifying parameters for industrial assets or configuring industrial assets), based at least in part on the results of the analysis of the data. To facilitate controlling (e.g., automatically or dynamically controlling) operation of the industrial automation system 106, the industrial controller 102 can communicate (e.g., transmit) the control information (e.g., control instructions or commands) and/or the other information (e.g., modification or configuration information) to the respective industrial devices 114, industrial processes 116, and other industrial assets 118 via the respective I/O devices (e.g., cloud-enabled I/O devices or modules) and via the one or more cloud gateway components 122, for example, in response to the analysis results (e.g., by the industrial controller 102) of the data received by the industrial controller 102 (and/or collection component 108) to facilitate controlling (e.g., facilitate cloud-based controlling of) the respective industrial devices 114, industrial processes 116, and other industrial assets 118 in the performance of their respective operations, in accordance with the one or more control algorithms. In accordance with various implementations, the respective I/O devices of or associated with the respective industrial devices 114, industrial processes 116, or other industrial assets 118 can be integrated with or associated with respective cloud gateway components 122.

The respective industrial devices 114, industrial processes 116, and other industrial assets 118 can perform their respective operations in accordance with the respective control information and the one or more control algorithms, in accordance with the defined control criteria. When the industrial controller 102 (and/or the analytics component) determine, instruct, or recommend a particular modification or re-configuration be performed with respect to the industrial automation system 106, one or more of the respective industrial devices 114, industrial processes 116, other industrial assets 118, and/or network-related devices of the network component 120 can be modified or re-configured in accordance with and in response to the other information (e.g., information relating to the instructions or recommendations), in accordance with the defined control criteria.

Figure 2:
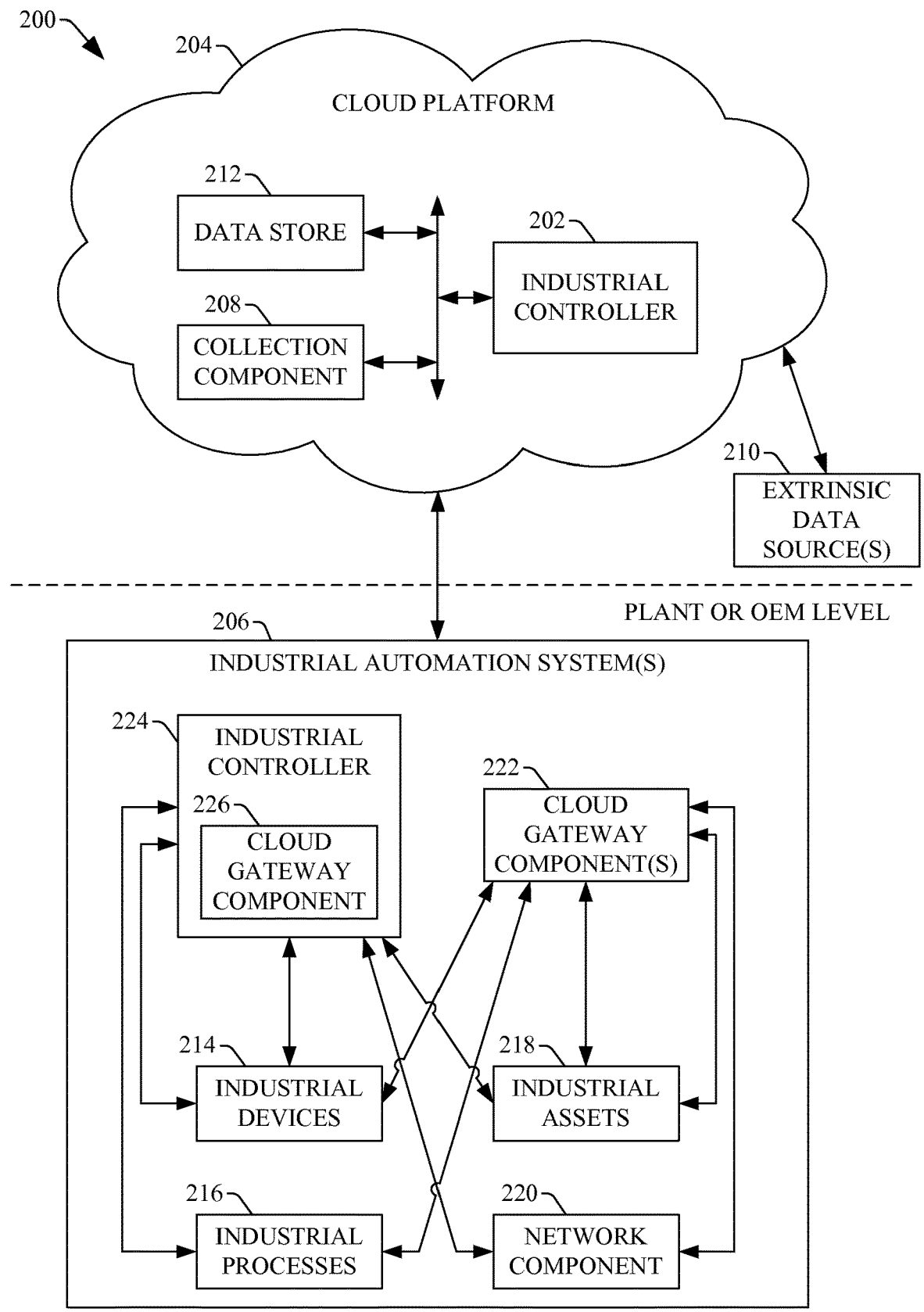
FIG. 2 depicts a block diagram of an example system that can employ a cloud-based industrial controller and an industrial plant-based industrial controller that can operate in conjunction with each other to control an industrial automation system(s) based at least in part on data (e.g., cloud-based data) relating to the industrial automation system(s) associated with an industrial enterprise to facilitate enhancing control (e.g., cloud-based control) of and performance of operations associated with the industrial automation system(s), in accordance with various implementations and embodiments of the disclosed subject matter.

FIG. 2 depicts a block diagram of an example system 200 that can employ a cloud-based industrial controller and an industrial plant-based industrial controller that can operate in conjunction with each other to control an industrial automation system(s) based at least in part on data (e.g., cloud-based data) relating to the industrial automation system(s) associated with an industrial enterprise to facilitate enhancing control (e.g., cloud-based control) of and performance of operations associated with the industrial automation system(s), in accordance with various implementations and embodiments of the disclosed subject matter. The system 200 can comprise an industrial controller 202 (e.g., cloud-based industrial controller), which can be located on a cloud platform 204 that can be associated with one or more industrial automation systems, comprising an industrial automation system 206. The system 200 also can comprise a collection component 208 (e.g., cloud-based collection component) that can collect or obtain data (e.g., industrial-automation-system-related data) from the industrial automation system(s) 206 and/or other data sources, such as extrinsic data sources 210. The system 200 further can comprise a data store 212 that can store the data collected from the one or more industrial automation systems 206 and/or the extrinsic data sources 210.

The industrial automation system(s) 206 can comprise one or more industrial devices 214, industrial processes 216, other industrial assets 218, and/or network-related devices of a network component 220 that can be distributed throughout an industrial facility(ies) and respectively associated with various of the other industrial devices 214, industrial processes 216, or other industrial assets 218, in accordance with a desired industrial-automation-system configuration. The industrial automation system 206 also can include a network component 220 that can be associated with (e.g., integrated with, interfaced with, and/or communicatively connected to) the various industrial devices 214, industrial processes 216, and/or other industrial assets 218 of the industrial automation system 206 to facilitate communication of information (e.g., command or control information, status information, production information, etc.) between the various industrial devices 214, industrial processes 216, and/or other industrial assets 218 via the network component 220, and/or communication with the industrial controller 202 via the network component 220. The network component 220, and/or all or a portion of the industrial devices 214 or other industrial assets 218, can be associated with (e.g., interfaced with, communicatively connected to (e.g., via one or more cloud gateway components 222)) the collection component 208 and industrial controller 202 to facilitate the communication of data between the industrial automation system 206 and the collection component 208 and industrial controller 202.

In some implementations, the industrial automation system 206 can comprise an industrial plant-based industrial controller (e.g., a hardware-based industrial controller), such as industrial controller 224, wherein the cloud-based industrial controller 202 can be interfaced (e.g., via an integrated cloud interface) with the industrial controller 224 to facilitate cooperative, coordinated, or shared controlling of the industrial automation system 206 by the industrial controller 202 and industrial controller 224. The industrial plant-based industrial controller 224 can be interfaced with the cloud platform 204, including the cloud-based industrial controller 202, to enable the cloud-based industrial controller 202 and other components of the cloud platform 204 to provide cloud-based services and additional information (e.g., extrinsic data) to the industrial controller 224 and the industrial automation system 206 to enable the industrial controller 224 to perform control decision making, based at least in part on the industrial-automation-system-related data, including extrinsic data (e.g., obtained and collected by the cloud platform 204 from extrinsic data sources 210), to facilitate enhanced controlling of the industrial automation system 206 by the industrial controller 224, as more fully disclosed herein.

The industrial controller 224 within the industrial facility can be associated with (e.g., interfaced with, communicatively connected to) one or more of the industrial devices 214, industrial processes, 216, other industrial assets 218, and the network component 220 of the industrial automation system 206. In accordance with the control instructions implemented or executed by the industrial controller 224, the industrial controller 224 can provide (e.g., communicate) control commands or instructions to one or more of the industrial devices 214, industrial processes, 216, and/or other industrial assets 218 to facilitate controlling operation of the one or more of the industrial devices 214, industrial processes, 216, and/or other industrial assets 218, in accordance with one or more defined control algorithms. The industrial controller 224 also can monitor operations of and exchange data with (e.g., transmit data to, receive data from) the one or more of the industrial devices 214, industrial processes 216, other industrial assets 218 (e.g., via respective I/O devices of the respective industrial devices, processes, or assets), and/or network component 220, and can exchange data with the cloud-based industrial controller 202 (which also can monitor operations of the industrial automation system 206), to facilitate determining operations to be performed by, and controlling the performance of operations by, the one or more of the industrial devices 214, industrial processes, 216, and/or other industrial assets 218, in accordance with the one or more defined control algorithms.

The industrial controller 224 can comprise (e.g., be integrated with) or associated with (e.g., communicatively connected to) a cloud interface (e.g., integrated cloud interface), such as a cloud gateway component 226, that can facilitate interfacing the industrial controller with the cloud platform 204, including the industrial controller 202, collection component 208, and data store 212. The industrial controller 224 can exchange data with (e.g., receive data from, transmit data to) the cloud platform 204 via the cloud gateway component 226. The industrial controller 202 (and/or the analytics component) can perform data analysis (e.g., big data analysis) on the collected data in the cloud platform 204 to facilitate cloud-based control of the industrial automation system(s) 206 to enhance control and performance of the industrial automation system(s) 206, as more fully disclosed herein.

In accordance with various implementations, the cloud-based industrial controller 202 can act as the primary (e.g., master, main) industrial controller for the industrial automation system 206, can supplement control of the industrial automation system 206 in addition to the control of the operations of the industrial automation system 206 performed by the industrial controller 224, and/or can act as a back-up industrial controller that can control all or a portion of the industrial automation system 206 in the event that there is a problem (e.g., communication problem, power problem, or other operational problem) with or other issue with (e.g., maintenance being performed on, or other downtime associated with) the industrial controller 224 that prevents it from controlling all or a portion of the industrial automation system 206. In accordance with other implementations, the industrial controller 224 can be a primary industrial controller for the industrial automation system 206, wherein the industrial controller 224 can control all or at least a portion of the industrial automation system 206, and/or the industrial controller 224 can act as a back-up industrial controller that can control all or a portion of the industrial automation system 206 in the event that there is a problem (e.g., communication problem, power problem, or other operational problem) with or other issue with (e.g., maintenance being performed on, or other downtime associated with) the cloud-based industrial controller 202 that prevents it from controlling all or a portion of the industrial automation system 206.

In some implementations, the cloud-based industrial controller 202 can analyze, and/or the analytics component can perform analytics on, the data collected from the industrial automation system 206 and/or data obtained from one or more extrinsic data sources 210. Based at least in part on the results of the analysis of or analytics performed on the collected information (e.g., data collected from the industrial automation system 206, data collected from one or more extrinsic data sources 210), the cloud-based industrial controller 202 can determine supplemental control instructions for controlling operation of the industrial automation system 206, in accordance with the one or more defined control algorithms.

For example, the cloud-based industrial controller 202 and/or collection component 208 also can obtain data from one or more extrinsic data sources 210. The data obtained from the one or more extrinsic data sources 210 can relate to, for example, energy prices for energy to be used by the industrial automation system 206, an order for materials to be used by the industrial automation system 206 to produce a product, an order for product that can be produced by the industrial automation system 206, transportation schedules in connection with the transportation of materials (e.g., supplied materials) or products, weather forecasts that can affect operation of or decisions relating to the industrial automation system 206, news that can be relevant to operation of or decisions relating to the industrial automation system 206, another industrial automation system(s) associated with the cloud platform 204 and/or associated with an entity (e.g., industrial enterprise) that owns or manages the industrial automation system 206, or other types of data items that can be relevant to operation of or decisions relating to the industrial automation system 206. The cloud-based industrial controller 202 can analyze, and/or the analytics component can perform analytics on, the data collected from the industrial automation system 206 and the data obtained from the one or more extrinsic data sources 210. Based at least in part on the analysis or analytics results, the cloud-based industrial controller 202 can determine supplemental control instructions that can be used by (e.g., executed by) the industrial controller 224 to control operations of the industrial automation system 206, in accordance with the one or more defined control algorithms.

The industrial controller 202 can provide the supplemental control instructions to the industrial plant-based industrial controller 224 via the cloud gateway component 226 to assist the industrial controller 224 in controlling the industrial automation system 206 and to control or facilitate decision-making by the industrial controller 224. The industrial controller 224 can facilitate controlling operations of the respective industrial devices 214, industrial processes 216, and/or other industrial assets 218 based at least in part on the supplemental control instructions received from the cloud-based industrial controller 202.

For instance, if data from an extrinsic data source 210 indicates that a shipment of material that is to be provided to the industrial facility by a supplier is going to be delayed for a period of time, and data obtained from the industrial automation system 206 or another source provides information indicating a current amount of material available at the industrial facility and a current amount of usage of the material by the industrial automation system 206 in connection with producing a product. Based at least in part on an analysis of such data, the cloud-based industrial controller 202 (and/or the analytics component) can determine that, under current operating conditions and use of the material by the industrial automation system 206 to produce a product, the amount of material available at the industrial facility will be used by the industrial automation system 206 to produce the product before the shipment of material arrives at the industrial facility.

Based at least in part on the analysis results and the determination regarding the material, the cloud-based industrial controller 202 (and/or the analytics component) can determine that the current instructions being implemented by the industrial controller 224 to control operations of the industrial automation system 206 in connection with producing the product are to be modified to compensate for or mitigate the negative impact the delay of the shipment of the material to the industrial facility will have or is projected to have on the operation and performance of the industrial automation system 206. For example, to compensate for or mitigate such negative impact, the cloud-based industrial controller 202 (and/or analytics component) can determine that the portion of the industrial automation system 206 that is handling an order for the product is to switch over to produce another product that does not use the material or uses less of the material during production.

Based on this, the cloud-based industrial controller 202 can generate supplemental instructions (e.g., modified control instructions) and can communicate the supplemental instructions to the industrial controller 224 via the cloud gateway component 226 to facilitate supplementing or modifying the instructions currently being implemented by the industrial controller 224 to facilitate controlling operation of the industrial automation system 206. The industrial controller 224 can receive the supplemental instructions and can implement (e.g., execute) the supplemental instruction to modify and control operation of the industrial automation system 206, in accordance with the supplemental instructions and defined control algorithm.

In this regard, the cloud-based industrial controller 202 can leverage the cloud-based data (e.g., collected and stored in the cloud-based data store 212), and cloud-based analytics (e.g., as performed by the analytics component) to determine how control of the industrial automation system 206 (e.g., control of an industrial device, process, and/or other asset) can or should be modified in response to outside events, e.g., based at least in part on extrinsic data obtained from one or more extrinsic data sources 210. In this way, the cloud-based industrial controller 202 and the industrial controller 224 at the plant can work together to facilitate control of the industrial automation system 206 that can be based on more than just the local machine statuses of the industrial devices 214 and other industrial assets (e.g., 218).

The cloud-based industrial controller 202 and the industrial controller 224 also can cooperate with each other to share control of the industrial automation system 206, in accordance with one or more defined control algorithms. For example, the cloud-based industrial controller 202 can control a first portion of the industrial automation system 206 (e.g., a first portion of the industrial devices 214, industrial processes 216, other industrial assets 218, and/or network-related devices of the network component 220) and the industrial controller 224 can control a second portion of the industrial automation system 206 (e.g., a second portion of the industrial devices 214, industrial processes 216, other industrial assets 218, and/or network-related devices of the network component 220). The cloud-based industrial controller 202 and the industrial controller 224 can exchange data (e.g., operational data, control instructions) with each other to facilitate coordinating (e.g., synchronizing) performance of the respective control operations by the cloud-based industrial controller 202 and the industrial controller 224, sharing control of the industrial automation system 206, and coordinating (e.g., synchronizing) the respective performance of operations by the first portion of the industrial automation system 206 and the second portion of the industrial automation system 206.

The cloud-based industrial controller 202 can store control algorithms for the industrial automation system 206 and/or other industrial automation systems in the cloud platform 204, for example, in the data store 212. The industrial controller 224 also can have one or more control algorithms (e.g., one or more control algorithms being implemented or that are frequently implemented by the industrial controller 224) stored in a data store of the industrial controller 224. In some implementations, the control algorithms stored in the data store 212 in the cloud platform 204 can be in a standardized and/or an agnostic format that can be translated by the industrial controller 202 to a desired (e.g., suitable, applicable, or compatible) format for execution on any or at least virtually any controller platform employed by an industrial-plant-based industrial controller (e.g., 224).

The cloud-based industrial controller 202 also can facilitate standardizing and controlling operations of similar industrial automation systems at respective industrial facilities (e.g., associated with an industrial enterprise). For a configuration in which the cloud-based industrial controller 202 executes the control algorithm from the cloud platform 204 to control the industrial automation system 206, whereby the cloud-based industrial controller 202 (e.g., virtualized industrial controller) can exchange data with respective I/O devices associated with the respective industrial devices 214 or other industrial assets (e.g., 218) of the industrial automation system 206 on the plant floor via one or more cloud gateway components 222, the cloud-based industrial controller 202, which can be a virtualized industrial controller, can be replicated (e.g., by the cloud-based industrial controller 202 or a virtualization component). The respective replicated virtualized industrial controllers (e.g., 202) can be interfaced (e.g., via respective cloud gateway components) with the respective industrial automation systems (e.g., 206) of the respective industrial facilities to enable the respective replicated virtualized industrial controllers to respectively control operations of the respective industrial automation systems. The respective replicated virtualized industrial controllers (e.g., 202) can execute the same or similar control algorithms in respective formats to facilitate desired control of the respective industrial automation systems (e.g., 206) of the respective industrial facilities. This can facilitate standardized control of similar industrial automation systems at multiple industrial facilities by the respective replicated cloud-based industrial controllers in the cloud platform 204.

Additionally, or alternatively, for respective industrial automation systems at respective industrial facilities, the cloud-based industrial controller 202 can translate the virtualized industrial controller or control algorithm to generate a translated virtualized industrial controller or translated control algorithm. Prior to preparing to send (e.g., download) a virtualized industrial controller or control algorithm to a local industrial controller (e.g., 224), the cloud-based industrial controller 202 can determine the characteristics of the industrial controller 224, wherein the characteristics can be or can relate to the controller platform, format or language, manufacturer, model number, specifications, or other characteristics associated with the industrial controller 224 based at least in part on information received from the industrial controller 224 or an extrinsic source(s) 210 (e.g., and stored in the data store 212). The cloud-based industrial controller 202 can determine a translation to apply to the standardized and/or agnostic formatted virtualized industrial controller or control algorithm to generate a translated virtualized industrial controller or translated control algorithm that can be in a desired format suitable for use by the industrial controller 224 based at least in part on the characteristics associated with the industrial controller 224, in accordance with defined control criteria.

The cloud-based industrial controller 202 can send (e.g., download) the translated virtualized industrial controller or translated control algorithm to the local industrial controller 224 (e.g., hardware-based industrial controller) on the plant floor at the industrial facility via the cloud gateway component 226. The industrial controller 224 can implement and execute the translated virtualized industrial controller or the translated control algorithm to facilitate controlling operation of the industrial automation system 206. In this way, the cloud-based industrial controller 202 in the cloud platform 204 can enable a standardized control algorithm to be used to control similar industrial automation systems at different industrial facilities (e.g., plant locations) regardless of the model, vendor, controller platform, or other characteristics of the target industrial controller (e.g., industrial-plant-based industrial controller).

Figure 3:
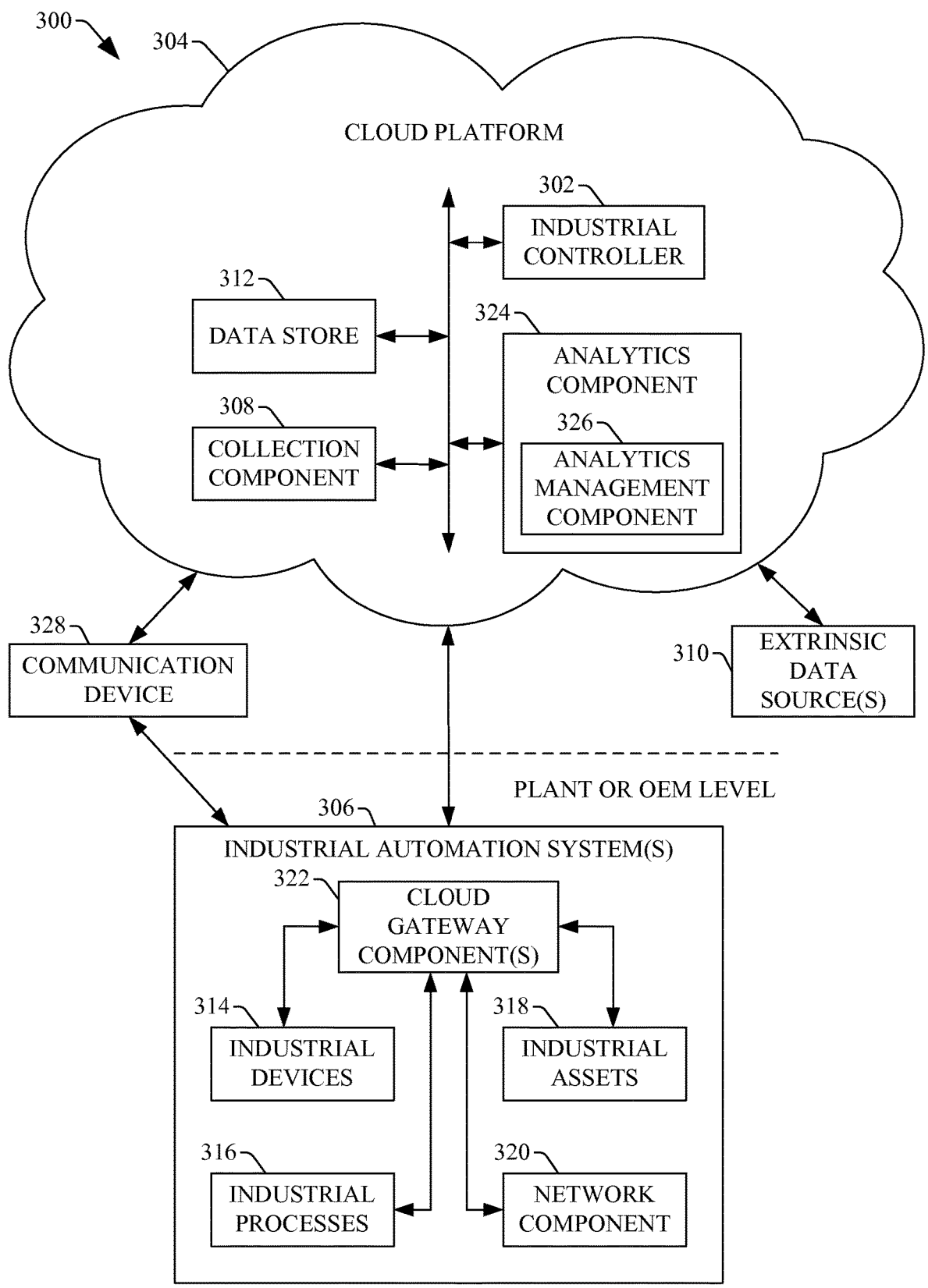
FIG. 3 illustrates a block diagram of an example system that can perform analytics on data (e.g., cloud-based data) associated with an industrial automation system associated with an industrial enterprise to facilitate cloud-based control of the industrial automation system, in accordance with various implementations and embodiments of the disclosed subject matter.

FIG. 3 illustrates a block diagram of an example system 300 that can perform analytics on data (e.g., cloud-based data) associated with an industrial automation system associated with an industrial enterprise to facilitate cloud-based control of the industrial automation system, in accordance with various implementations and embodiments of the disclosed subject matter. The system 300 can comprise an industrial controller 302 (e.g., cloud-based industrial controller), which can be located on a cloud platform 304 that can be associated with one or more industrial automation systems, comprising an industrial automation system 306. The system 300 also can comprise a collection component 308 (e.g., cloud-based collection component) that can collect or obtain data (e.g., industrial-automation-system-related data) from the industrial automation system(s) 306 and/or other data sources, such as extrinsic data sources 310. The system 300 further can comprise a data store 312 that can store the data collected from the one or more industrial automation systems 306 and/or the extrinsic data sources 310.

The industrial automation system(s) 306 can comprise one or more industrial devices 314, industrial processes 316, other industrial assets 318, and/or network-related devices of a network component 320 that can be distributed throughout an industrial facility(ies) and respectively associated with various of the other industrial devices 314, industrial processes 316, or other industrial assets 318, in accordance with a desired industrial-automation-system configuration. The industrial automation system 306 also can include a network component 320 that can be associated with (e.g., integrated with, interfaced with, and/or communicatively connected to) the various industrial devices 314, industrial processes 316, and/or other industrial assets 318 of the industrial automation system 306 to facilitate communication of information (e.g., command or control information, status information, production information, etc.) between the various industrial devices 314, industrial processes 316, and/or other industrial assets 318 via the network component 320, and/or communication with the industrial controller 302 via the network component 320. The network component 320, and/or all or a portion of the industrial devices 314 or other industrial assets 318, can be associated with (e.g., interfaced with, communicatively connected to (e.g., via one or more cloud gateway components 322)) the collection component 308 and industrial controller 302 to facilitate the communication of data between the industrial automation system 306 and the collection component 308 and industrial controller 302.

In some implementations, the system 300 can comprise an analytics component 324 perform analytics on data relating to the industrial automation systems, including industrial automation system 306, and perform other services (e.g., cloud-based services) in connection with operation of the industrial automation systems. The analytics component 324 can be associated with (e.g., communicatively connected to) the industrial controller 302 to facilitate using analytics-related services or other services in connection with the industrial controller 302 controlling operations of the industrial automation systems 306.

In some implementations, the analytics component 324 can reside on the cloud platform 304, and can provide cloud-based services (e.g., analytics services, remote monitoring services, modeling services, data and/or correlation visualization services, virtualization services) in connection with an industrial automation system(s) 306. The analytics component 324 can use data analysis (e.g., big data analysis) in the cloud platform to facilitate performing analytics in connection with an industrial automation system(s) 306 to improve performance of the industrial automation system(s) 306 and/or meet (e.g., satisfy, achieve) one or more defined goals (e.g., production goal, revenue goal, profit goal, energy efficiency goal, operational efficiency goal) in accordance with the defined control criteria. In other implementations, the analytics component 324 can reside locally with an industrial automation system 306, wherein the analytics component 324 can perform services to facilitate improving performance of the industrial automation system 306.

When residing on the cloud platform 304, the analytics component 324 (e.g., a cloud-based analytics engine) can be interfaced with the industrial automation system(s) 306 via the one or more cloud gateway components 322. For instance, one or more industrial devices 314 or other industrial assets 318 can comprise or be associated with the one or more cloud gateway components 322 that can be employed to interface the analytics component 324 with the one or more industrial devices 314 or other industrial assets 318. The analytics component 324 can monitor (e.g., remotely monitor) operations of the industrial automation system(s) 306. The analytics component 324 can comprise or be associated with the collection component 308 (e.g., cloud-based collection component) that can collect or obtain data (e.g., industrial-automation-system-related data) from the industrial automation system(s) 306 and/or other data sources (e.g., extrinsic data sources 310). The collection component 308 can store the collected data in a data store 312 (e.g., cloud-based data store) of or associated with the analytics component 324 for future data analysis, and/or the analytics component 324 can analyze the data as it is received by the analytics component 324.

The analytics component 324 can comprise an analytics management component 326 that can manage and implement the various services (e.g., cloud-based services, such as analytics services, remote monitoring services, visualization services). The analytics management component 326 can analyze the industrial-automation-system-related data obtained from the industrial automation system(s) 306 or other sources (e.g., extrinsic data sources 310) to facilitate enhancing operation of the industrial automation system(s) 306.

Based at least in part on the results of the data analysis, the analytics management component 326 can determine one or more correlations between respective portions or aspects of the industrial automation system(s) (e.g., between a first industrial device 314 and a second industrial device), between a portion(s) or aspect(s) of the industrial automation system(s) and extrinsic events or conditions (e.g., between an industrial device 314 and a weather condition, or between an industrial process 316 and an inventory of a material supplier that provides a material(s) used in the industrial process 316), or between an employee(s) and a portion(s) or aspect(s) of the industrial automation system(s) 306 (e.g., between an employee and an industrial device(s) 314 or industrial process(es) 316).

In some implementations, the analytics component 324 can normalize or standardize the respective pieces of collected data to facilitate easier determination or identification of dependencies or correlations between respective subsets of data. This can facilitate enabling an "apples-to-apples" comparison of data, as opposed to an "apples-to-oranges" comparison of data. For example, the analytics component 324 can normalize or standardize respective pieces of data based at least in part on a unit of measurement of the data, a type of data, a type or characteristic of a data value represented by the data (e.g., average data value, median data value, peak data value, standard deviation associated with a data value, an amount of error associated with a data value), source of the data, and/or other factors, in accordance with defined analytics criteria.

Based at least in part on one or more correlations determined by the analytics management component 326, the analytics management component 326 can determine one or more recommendations or instructions in connection with the industrial automation system(s) 306 to enhance performance of the industrial automation system(s) 306, or an employee(s) associated with the industrial automation system(s) 306. The analytics component 324 can provide (e.g., transmit) the recommendations or instructions to the cloud-based industrial controller 302, a communication device 328 associated with a user (e.g., operator, technician, maintenance person, supervisor, information technology (IT) personnel, or other personnel) associated with the industrial automation system(s) 306, and/or the industrial automation system(s) 306 (e.g., to an industrial device 314 or industrial process 316) to facilitate enhancing operational performance of the industrial automation system(s) 306 or an associated employee. The communication device 328 can be, for example, (a handheld communication device), such as a computer (e.g., a laptop computer), a mobile phone (e.g., a smart phone or other type of cellular phone), an electronic tablet, electronic eyeglasses (e.g., electronic eyeglasses (e.g., smart glasses) with computing and communication functionality), or other type of communication device.

In some implementations, the cloud-based industrial controller 302 can operate in conjunction with an analytics component 324 (e.g., a cloud-based analytics engine) to determine modifications that can be made to the cloud-based industrial controller 302, industrial plant-based industrial controller (not shown in FIG. 3), a control algorithm, and/or other aspects (e.g., parameter settings or configuration of an industrial device 314) associated with the industrial automation system 306 to enhance control and operation of the industrial automation system 306 and/or achieve one or more defined goals in connection with operation of the industrial automation system 306 (e.g., maximize or improve profit or revenue, reduce or minimize energy costs, maximize or improve production output, reduce or minimize maintenance downtime with regard to industrial devices 314). For instance, the cloud-based industrial controller 302 can modify (e.g., automatically or dynamically modify) its operation (e.g., modify a control algorithm) or facilitate modifying (e.g., automatically or dynamically modifying) operation of an associated industrial plant-based industrial controller, in response to analytics results generated by the analytics component 324 performing analytics on data relating to the industrial automation system 306. Alternatively, the analytics component 324 can generate (e.g., automatically or dynamically generate) a recommendation message that can include a recommendation to modify the operation (e.g., control algorithm or routine) of the industrial plant-based industrial controller and can communicate the recommendation message to a user (e.g., authorized plant personnel), via the communication device 328, associated with the industrial automation system 306 for consideration and/or responsive action by the user.

For example, based at least in part on a data analysis of collected data, the analytics management component 326 can determine a correlation between an industrial device 314 (e.g., industrial controller) associated with a first industrial process 316 and a second industrial process 316, wherein the operation of the second industrial process 316 can be positively or negatively affected by changes in the operation of the industrial device 314. The analytics management component 326 can determine that the current parameter settings of the industrial device 314 are having a negative impact on (e.g., causing undesirable (e.g., sub-optimal, unacceptable) performance by) the second industrial process 316. The analytics management component 326 can determine modified parameter settings for the industrial device 314 that can improve the operation of the second industrial process 316, while still performing in a desired (e.g., suitable, acceptable) manner with respect to the first industrial process 316.

The cloud-based industrial controller 302 and analytics component 324 can be interfaced with the industrial device 314 via a cloud gateway component 322 (e.g., integrated or otherwise associated with the industrial device 314). The analytics management component 326 can generate instructions that can facilitate changing the current parameter settings to the modified parameter settings. The analytics management component 326 or the cloud-based industrial controller 302 can communicate the instructions to the industrial device 314 via the cloud gateway component 322. The respective configurations and interfacing of industrial controller 302, the analytics component 324, and industrial device 314 can thereby yield a closed-loop control configuration that can facilitate enabling the industrial controller 302 and analytics component 324 to control (e.g., control configuration, parameter settings, operations of) the industrial device 314. The industrial device 314 can configure (e.g., re-configure) its parameter settings to change them from the current settings to the modified parameter settings, in response to the received instructions. The industrial device 314 can operate, based at least in part on the modified parameter settings, to facilitate improving the operation of the second industrial process 316. In other implementations (e.g., alternatively), the analytics management component 326 can generate the instructions or a corresponding recommendation to change the current parameter settings of the industrial device 314 to the modified parameter settings, and/or other information relating to (e.g., detailing) the correlation. The analytics management component 326 or the cloud-based industrial controller 302 can communicate the instructions, recommendation, or other correlation-related information to a user (e.g., to a communication device 328 of the user) for consideration and/or action by the user to facilitate improving the operation of the second industrial process 316. In response to the instructions, recommendation, or other correlation-related information, the user can take appropriate action (e.g., can change the current parameter settings of the industrial device 314 to the modified parameter settings).

As another example, based at least in part on a data analysis of collected data (e.g., including data from an extrinsic data source 310), the analytics management component 326 can determine a correlation between an external event, such as unusually high product inventory levels for a particular product in a chain of stores that were identified in recently obtained product inventory data, and an order for the particular product that is scheduled to be serviced using a set of industrial devices 314 associated with an industrial process 316 of the industrial automation system 306 used to produce the particular product. Further, based at least in part on the determined correlation, the analytics management component 326 can determine that servicing the order will result in unnecessarily producing more of the particular product and negatively impacting (e.g., reducing) the amount of revenue generated by the customer associated with the industrial facility. In response to these determinations, the analytics management component 326 can determine a different order for a different product that can and should be serviced using the set of industrial devices 314 instead of the order, and can generate a notification, a recommendation, and/or an instruction that can notify a user of the problems (e.g., undesirably high product inventory levels for the particular product, reduced revenue) associated with servicing the order, recommend running (e.g., servicing) the different order using the set of industrial devices 314 instead of the order, and/or instructing that the different order be serviced on the set of industrial devices 314 instead of the order. The analytics management component 326 can transmit the notification, recommendation, and/or instruction to the user (e.g., via the communication device 328), the cloud-based industrial controller 302, and/or the industrial automation system 306 for consideration and/or action (e.g., implementation, execution) by the user, cloud-based industrial controller 302, and/or industrial automation system 306.

As still another example, based at least in part on a data analysis of collected data, including extrinsic data obtained from an extrinsic data source 310, the analytics management component 326 can determine a correlation between a weather condition indicated in a weather forecast to occur at a particular geographical region at a particular time and a supply of an ingredient used in an industrial process 316 of the industrial automation system 306. Further, based at least in part on the determined correlation, the analytics management component 326 can determine that the weather condition will or at least is predicted to negatively affect the supplying of the ingredient to the industrial facility wherein the industrial automation system 306 resides, and this will or at least is predicted to have a negative affect on producing a particular product that uses that ingredient via the industrial process 316. In response to these determinations, the analytics management component 326 can determine that the industrial process 316 should be modified to a different industrial process that does not use or uses less of the ingredient to produce a different product than the industrial process used to produce the particular product, to facilitate compensating for the negative impact (e.g., process interruption or downtime) or at least potential negative impact on the industrial process that may result from the negative affect or potential negative affect on the supply of the ingredient due to the forecasted weather condition. The analytics management component 326 can generate a notification, a recommendation, and/or an instruction that can notify a user of the problem or potential problem with the supply of the ingredient and its negative impact or potential negative impact on the production of the particular product, recommend modifying the industrial process to a different industrial process to produce a different product, and/or instructing that the industrial process be modified to a different industrial process to produce a different product. The analytics management component 326 can transmit the notification, recommendation, and/or instruction to the user (e.g., via the communication device 328), the cloud-based industrial controller 302, and/or the industrial automation system 306 for consideration and/or action by the user, industrial controller 302, and/or industrial automation system 306.

The analytics component 324 also can monitor the work of employees in connection with an industrial automation system 306 and can collect (e.g., via the collection component 308) industrial-automation-system-related data relating to the employees and the industrial automation system 306. Based at least in part on results from the analysis of such data, the analytics management component 326 identify one or more correlations between one or more employees and the operation of the industrial automation system 306 relating to the impact (e.g., negative impact, positive impact) the one or more employees have on the operation of the industrial automation system 306. For example, based at least in part on results from the analysis of such data, the analytics management component 326 can determine, identify, or learn that a certain employee is more influential (e.g., in a positive manner) than another employee on production outcomes for the industrial automation system 306. For instance, the analytics management component 326 can learn that when the certain influential employee is absent from work, not only is there a direct negative impact on production in the industrial automation system 306 due to that's employee's absence, but other employees do not work as productively with respect to the industrial automation system 306 as when certain influential employee is at work (e.g., due to a negative change in mood of the other employees due to the certain influential employee being absent, due to the lack of work guidance to those other employees from the certain influential employee, or for other reasons). The analytics management component 326 can generate a notification or recommendation relating to the correlation between the employees and the operation of the industrial automation system 306, and can communicate the notification or recommendation to the user (e.g., to the communication device 328 of the user) to facilitate improving performance of operations by the employees, facilitate improving operation of the industrial automation system 306, and/or at least notify the user regarding such correlation relating to the employees in connection with production outcomes for the industrial automation system 306.

In some implementations, the analytics component 324 can monitor and collect data (e.g., via the collection component 308) regarding the respective focuses of attention of employees in connection with their work with the industrial automation system 306. Based at least in part on results from an analysis of such data, the analytics management component 326 can determine or identify correlations between the respective focuses of attention of employees (e.g., with regard to where and when each employee's attention is focused) and production outcomes for the industrial automation system 306. The analytics management component 326 also can determine one or more changes or recommendations that can be made to facilitate improving production outcomes for the industrial automation system 306, wherein the changes or recommendations can be, for example, changes in work schedules for the employees to facilitate improving their attention and focus, changes in work tasks of respective employees, instructions regarding how employees can improve their attention or focus in connection with their work with the industrial automation system 306, or other changes or recommendations. The analytics component 324 can communicate the one or more changes or recommendations to the user (e.g., to the communication device 328 of the user) to facilitate improving performance of operations by the employees, facilitate improving operation of the industrial automation system 306, and/or at least notify the user regarding such correlation relating to the employees in connection with production outcomes for the industrial automation system 306.

When an industrial enterprise comprises or is associated with multiple industrial automation systems 306 (e.g., multiple facilities or plants), the analytics component 324 can monitor and collect (e.g., via the collection component 308) respective industrial-automation-system-related data from the respective industrial automation systems 306, including the respective industrial devices 314, industrial processes 316, other industrial assets 318, and network-related devices of the network components 320 of the respective industrial automation systems 306 in connection with the respective operations of the respective industrial automation systems 306. The analytics management component 326 can aggregate the respective industrial-automation-system-related data collected from the respective industrial automation systems 306. The analytics management component 326 also can analyze the respective industrial-automation-system-related data, and can determine correlations between industrial automation systems 306, correlations between an industrial device and another industrial device (e.g., that can span across multiple industrial automation systems 306), correlations between an operation and another operation (e.g., that can span across multiple industrial automation systems 306), and/or other correlations based at least in part on the analysis results. The analytics management component 326 can generate one or more instructions, recommendations, or notifications that can provide information to facilitate modification of one or more of the industrial automation systems 306 and/or notify a user regarding system-related correlations or recommended modifications to facilitate improving the overall operations of the multiple industrial automation systems 306 for the industrial enterprise. The analytics management component 326 can communicate the one or more instructions, recommendations, or notifications to the appropriate industrial automation system(s) 306, the cloud-based industrial controller 302, or the appropriate user(s) (e.g., via the communication device 328) for action or consideration by the appropriate industrial automation system(s) 306, industrial controller 302, or appropriate user(s).

For example, based at least in part on a data analysis across multiple industrial automation systems 306, the analytics management component 326 can determine a correlation between transportation costs to transport products produced by the industrial enterprise at one or more of the industrial automation systems 306 and the location of demand for the products by consumers. Also, the analytics management component 326 can determine that shifting a portion of the production load relating to production of the product from a first industrial automation system 306 to a second industrial automation system 306 that is closer to the location of the consumer demand for the product can be accomplished with respect to the first industrial automation system 306 and second industrial automation system 306, and can result in a reduction in transportation costs associated with transporting the product to product distributors or retail stores that service the area of the consumer demand and an increase in overall profit for the industrial enterprise, based at least in part on the analysis results. The analytics management component 326 can generate one or more instructions, recommendations, or notifications relating to the determination that shifting a portion of the production load from the first industrial automation system 306 to the second industrial automation system 306 can result in transportation cost reduction and increased profits for the industrial enterprise. The analytics management component 326 can communicate the one or more instructions, recommendations, or notifications to the cloud-based industrial controller 302, the first industrial automation system 306, the second industrial automation system 306, and/or associated users (e.g., communication devices 328 of the associated users), for action or consideration by the industrial controller 302, the first industrial automation system 306, the second industrial automation system 306, and/or associated users.

In some implementations, the analytics component 324 can monitor and track operations of the industrial automation system(s) 306 over time, and collect and store data (e.g., via the collection component 308 and data store 312, respectively) relating to such monitoring and tracking. The analytics management component 326 can analyze the data to generate pertinent analysis results that can facilitate improving operation of the industrial automation system 306. Based at least in part on the results of the data analysis, the analytics management component 326 can determine respective baselines (e.g., performance baselines or guidelines) for respective variables associated with the industrial automation system 306 that can indicate suitable (e.g., optimal, acceptable, preferred) operation of the industrial automation system 306, or portion thereof. The defined analytics criteria can indicate or specify a defined threshold level of suitability or acceptability that can be applied to a baseline (e.g., performance baseline) by the analytics management component 326. The analytics management component 326 can set the respective baselines for the respective variables, wherein the respective baselines can be used as respective guidelines for satisfying (e.g., achieving) a desired production goal(s) (e.g., desirably high or efficient production output) for the industrial automation system 306, in accordance with defined operation criteria. The variables can be or can relate to, for example, a configuration of an industrial asset (e.g., 314, 316, 318) or network-related device, operational variable (e.g., speed of a conveyor), a production output(s), material inventory level, raw material cost, energy cost, employee behavior (e.g., amount or quality of work performed, attentiveness or focus on work tasks), or other variables. Based at least in part on the results of the data analysis, the analytics management component 326 also can determine respective impacts (e.g., negative impacts, positive impacts) of the respective variables on the operation of the industrial automation system 306, and can use these determined respective impacts of the respective variables to facilitate maintaining the respective baselines and satisfying the desired production goal(s).

With the respective baselines for the respective variables associated with the industrial automation system 306 set, the analytics management component 326 can monitor and track operation of the industrial automation system 306 and respective employees' behaviors in connection with the operation of the industrial automation system 306. The analytics management component 326 can identify and track respective employees based at least in part on recognition techniques (e.g., facial recognition, fingerprint recognition, iris recognition), identifiers associated with their respective communication devices (e.g., 328), or respective radio-frequency identification (RFID) tags, for example. The analytics component 324 can collect and store data (e.g., via the collection component 308 and data store 312, respectively) relating to this monitoring and tracking. The analytics management component 326 can analyze this data to generate pertinent analysis results that can facilitate improving or maintaining desired operation of the industrial automation system 306, for example, by satisfying the desired production goal(s) associated with the industrial automation system 306. Based at least in part on the results of the data analysis and the respective baselines for the respective variables, the analytics management component 326 can determine when there is a deviation or a potential for deviation from suitable (e.g., optimal, acceptable, preferred) performance by an industrial asset (e.g., 314, 316, 318) or an employee in connection with operation of the industrial automation system 306. For instance, the analytics management component 326 can determine when there is a deviation or a potential for deviation (e.g., a trend towards deviation) from a baseline for a variable in connection with operation of the industrial automation system 306, wherein the deviation or potential for deviation can indicate that the variable is unsuitable (e.g., not optimal, not acceptable, not preferred) or at least has the potential to be or become unsuitable.

In response to determining or detecting a deviation or potential for deviation from a set baseline for a variable associated with operation of the industrial automation system 306, the analytics management component 326 can generate a notification, a recommendation, or an instruction that can comprise information and/or commands that can facilitate rectifying or avoiding the deviation from the set baseline for the variable. The analytics management component 326 can communicate the notification, recommendation, or instruction to the cloud-based industrial controller 302, a user (e.g., via the communication device 328) associated with the industrial automation system 306 or to the industrial automation system 306 (e.g., to an industrial device 314), wherein the industrial controller 302, the user, or industrial automation system 306 can consider or take action (e.g., corrective or preventive action) in response to the notification, recommendation, or instruction to facilitate rectifying or avoiding the deviation from the set baseline for the variable. The information relating to the deviation or potential for deviation can comprise, for example, a recommendation or instruction (e.g., command) to alter operation of one or more industrial assets (e.g., 314, 316, 318) to compensate for or rectify the deviation or potential for deviation from the set baseline(s) for the variable(s) based at least in part on the determined or estimated (e.g., by the analytics management component 326) effect of altering operation of the one or more industrial assets with respect to the deviation or potential for deviation, or a recommendation to have one or more employees change how they perform certain work tasks in connection with operation of the industrial automation system 306 based at least in part on the determined or estimated (e.g., by the analytics management component 326) effect of changing how the one or more employees perform the certain work tasks with respect to the deviation or potential for deviation.

The analytics management component 326 also can perform data analysis (e.g., big data analysis) on aggregated customer data relating to respective industrial automation systems (e.g., 306) of respective customers to facilitate anonymous knowledge sharing among the customers, wherein the collection component 308 can collect respective customer data from the respective industrial automation systems (e.g., 306) of the respective customers. The analytics management component 326 can have information that can enable the analytics management component 326 to be aware of the respective industry(ies) of respective customers. The analytics management component 326 can aggregate respective subsets of customers, and respective portions of data associated with those customers, based at least in part on the respective industry(ies) of the respective customers, to facilitate collective analysis of those portions of data associated with a same or similar industry (e.g., to facilitate identifying industry-specific trends or industry-specific correlations). Based at least in part on the data analysis on the aggregated customer data, the analytics management component 326 can determine or learn that a particular system configuration for performing a particular industrial process (e.g., 316) in a given industry (e.g., beverage industry) can result in a relatively higher output or less downtime than other system configurations. In response to this determination, the analytics management component 326 can generate a recommendation to adopt the particular system configuration for performing the particular industrial process, and can communicate the recommendation to one or more customers (e.g., to one or more communication devices of the one or more communication devices) in the given industry that may find such recommendation beneficial to them (e.g., can improve their respective industrial automation systems 306). The information in the recommendation (e.g., recommendation message) can be tailored such that it does not include any data of a particular customer that can enable another customer to identify the data as being related to or obtained from the particular customer to facilitate maintaining the anonymity of customers with respect to particular pieces of data that have been collected by the collection component 308.

Figure 4:
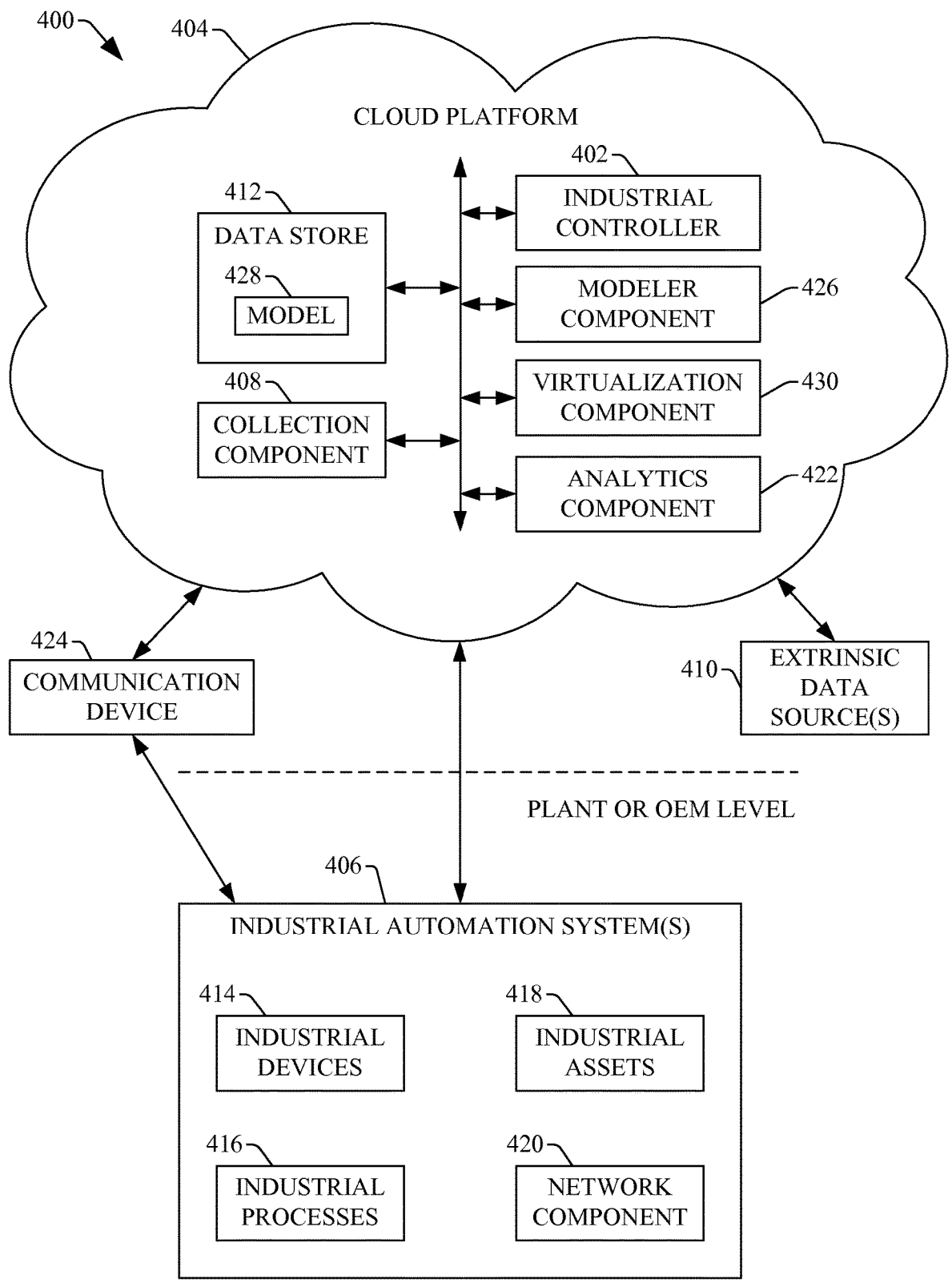
FIG. 4 illustrates a block diagram of an example system that can perform analytics in connection with an industrial automation system(s) using a model(s) of the industrial automation system(s) to facilitate to facilitate cloud-based control of operations of the industrial automation system(s), in accordance with various implementations and embodiments of the disclosed subject matter.

Referring to FIG. 4, depicted is a block diagram of an example system 400 that can perform analytics in connection with an industrial automation system(s) using a model(s) of the industrial automation system(s) to facilitate to facilitate cloud-based control of operations of the industrial automation system(s), in accordance with various implementations and embodiments of the disclosed subject matter. The system 400 can comprise an industrial controller 402, a cloud platform 404, an industrial automation system(s) 406, a collection component 408, an extrinsic data source 410, and a data store 412, wherein the industrial automation system(s) 406 can comprise industrial devices 414, industrial processes 416, other industrial assets 418, and a network component 420. The system 400 also can comprise an analytics component 422, and can comprise or be associated with a communication device 424, which can be associated with the industrial controller 402, industrial automation system(s) 406, collection component 408, data store 412, and/or the analytics component 422.

The system 400 also can comprise a modeler component 426 (e.g., a cloud-based modeler component) that can employ and provide a variety of services including a cloud-based model generation service. The modeler component 426 can facilitate generation and management of a model 428 that can correspond to the industrial automation system 406 based at least in part on data (e.g., industrial-automation-system-related data) obtained from the industrial automation system 406, another industrial automation system(s), or from other sources (e.g., extrinsic sources), in accordance with defined modeling criteria. As more fully disclosed herein, the collection component 408 can collect industrial-automation-system-related data from one or more industrial automation systems 406 of one or more industrial customers (e.g., industrial enterprises) for storage (e.g., in the data store 412) and analysis (e.g., by the modeler component 426, industrial controller 402, and/or analytics component 422) on the cloud platform 404. As part of providing the cloud-based model generation service, the modeler component 426 (or the industrial controller 402 or analytics component 422) can perform data analysis (e.g., big data analysis) on the data in a cloud platform to facilitate generating the model 428 of the industrial automation system 406 that can be used to facilitate interacting with (e.g., remotely monitoring operation of, tracking operation of, controlling operation of, troubleshooting problems with, providing assistance relating to, etc., via a communication device) the industrial automation system 406.

The modeler component 426 (or the industrial controller 402 or analytics component 422) can monitor or track the operation of the industrial automation system 406, including monitoring and tracking the respective operations of respective industrial devices 414, industrial processes 416, industrial assets 418, and/or network-related devices of the network component 420, and monitoring and tracking the configuration of the industrial automation system 406. The modeler component 426 can generate an interactive model(s) 428 of one or more industrial automation systems 406 (e.g., of an industrial plant environment(s)), based at least in part on the data analysis performed on the data (e.g., industrial-automation-system-related data) relating to the operation of the industrial automation system 406 by the modeler component 426, industrial controller 402, and/or analytics component 422.

In some implementations, the modeler component 426 can facilitate providing cloud-based services (e.g., modeling services, troubleshooting services, optimization services, remote viewing or controlling services, and/or other cloud-based services) to users and an industrial automation system(s) 406. Users (e.g., operators, technicians, maintenance personnel, supervisors, IT personnel, or other plant personnel) can interact with a model 428 (e.g., interactive model), or a virtualized industrial automation system generated based on the model 428, of an industrial automation system(s) 406 to perform various work tasks, functions, and/or operations, etc. For instance, a user can interact with the model 428 or a corresponding virtualized industrial automation system (e.g., as generated by the virtualization component 430) to facilitate remote viewing of, interaction with, troubleshooting of problems with, controlling operation of, and/or optimization of industrial assets (e.g., industrial devices 414, industrial processes 416, other assets 418) or the network-related devices of the network component 420 of the industrial automation system(s) 406.

The industrial assets (e.g., industrial devices 414, industrial processes 416, other assets 418) and network-related components of the network component 420 of an industrial automation system(s) 406 can be equipped with or associated with components, tools, functions, etc., that can allow the modeler component 426 or analytics component 422 to inventory such industrial assets (e.g., 414, 416, 418) and network-related components of the network component 420 from the cloud, wherein the modeler component 426 can generate a model 428 of the industrial automation system(s) 406 based at least in part on the data obtained from such inventory. The modeler component 426, industrial controller 402, or analytics component 422 can poll (e.g., request information from) industrial assets, such as industrial devices 414, industrial processes 416, or other industrial assets 418, and/or network-related components of the network component 420 via cloud gateway components (not shown in FIG. 4) to facilitate obtaining information regarding the industrial assets (e.g., 414, 416, 418) or network-related devices of the network component 420 from the industrial assets (e.g., 414, 416, 418) or network-related devices. For example, an industrial asset (e.g., 414, 416, 418) and/or a network-related device of the network component 420 can comprise (e.g., be integrated with) or be associated with a cloud gateway component that can enable the industrial asset (e.g., 414, 416, 418) and/or network-related device to communicate with the modeler component 426, industrial controller 402, or analytics component 422 on the cloud platform 404 to facilitate the modeler component 426, industrial controller 402, or analytics component 422 discovering, obtaining information from, analyzing information relating to, and/or modeling the industrial asset (e.g., 414, 416, 418) and/or network-related device of the network component 420. The information can comprise, for example, identification information (e.g., identifiers) that can identify an industrial asset (e.g., 414, 416, 418) or network-related device, configuration information that can identify a configuration of an industrial asset (e.g., 414, 416, 418) or network-related device, contextual information relating to an industrial asset (e.g., 414, 416, 418) or network-related device of the network component 420, information relating functional or geographical relationships between industrial assets (e.g., 414, 416, 418), between the industrial controller 402 and the industrial assets (e.g., 414, 416, 418), or between an industrial asset (e.g., 414, 416, 418) and a network-related device of the network component 420, information relating to a layout (e.g., functional layout, logic layout, geographical layout) of an industrial automation system 406, communication network connections, or other information.

In some implementations, an industrial automation system 406 can contain legacy industrial assets (e.g., legacy industrial devices or other legacy industrial assets) or legacy network-related components that do not comprise or are not directly associated with a cloud gateway component. The communication device 424 (e.g., computer, mobile phone, electronic tablet or pad, electronic glasses) can be employed to facilitate inventorying and collecting information relating to such legacy industrial assets or legacy network-related components. For instance, the communication device 424 can comprise a camera that can be used to take one or more pictures of legacy industrial assets, legacy network-related components, other industrial assets or network-related components in proximity to the legacy industrial assets or legacy network-related components, and/or an area of the plant in proximity to a legacy industrial asset or legacy network-related component. For instance, the communication device 424 can take a picture of nameplate or other identifier information on a legacy industrial asset or legacy network-related component to facilitate identifying the legacy industrial asset or legacy network-related component. The communication device 424 can comprise a recognizer component (not shown in FIG. 4) that can recognize (e.g. using pattern or optical character recognition (OCR) recognition) or identify the legacy industrial asset or legacy network-related component based at least in part on information obtained via the photograph. Information relating to legacy industrial assets or legacy network-related components also can be input to the communication device 424 by a user via a keyboard, keypad, or audio interface (e.g., a microphone that receives information from the user via the user's voice).

The communication device 424 can interface with the cloud platform 404 (e.g., via a wireline or wireless communication connection), including with the industrial controller 402, analytics component 422, and/or modeler component 426, to communicate (e.g., migrate) the information relating to legacy industrial assets or legacy network-related components to the industrial controller 402, analytics component 422, and/or modeler component 426 (e.g., via the collection component 408). The collection component 408 can facilitate storing this information in the data store 412.

The modeler component 426 can model the industrial automation system 406, including modeling industrial assets (e.g., 414, 416, 418), legacy industrial assets, network-related devices (e.g., of the network component 420), and/or legacy network-related devices, based at least in part on the respective information obtained from the industrial assets (e.g., 414, 416, 418), network component 420, and/or communication device 424, to generate the interactive model 428 (e.g., a data-rich interactive model) of the industrial automation system 406. To facilitate generating a model 428 that can correspond to and be associated with (e.g., can interact or be interfaced with) the industrial automation system 406, the modeler component 426 can access the data store 412 (e.g., cloud-based data store) to obtain a set of data relating to the industrial automation system 406 and/or another industrial automation system (e.g., another system comprising an industrial device(s), process(es), and/or asset(s) that can be the same or similar to an industrial device(s) 414, process(es) 416, and/or asset(s) 418 of the industrial automation system 406). The set of data can comprise information relating to, for example, control-related data or analysis-related data generated by the industrial controller 402; analytics data generated by the analytics component 422 based at least in part on an analysis of data obtained from the industrial automation system 406 or from another data source; a pre-deployed model of an industrial asset (e.g., 414, 416, 418) or a network-related device that can be stored on the industrial asset or network-related device and provided to the industrial controller 402, analytics component 422, or modeler component 426 by the industrial asset or network-related device (or by an extrinsic data source 410); the respective properties, characteristics, functions, configurations, etc., of respective industrial devices 414, industrial processes 416, other industrial assets 418, or network-related devices of the network component 420; or the configuration of industrial devices 414, industrial processes 416, and/or other industrial assets 418 in relation to each other. For example, the properties or characteristics for industrial devices 414 or industrial processes 416 can comprise mechanical or process properties or characteristics associated with industrial devices or processes (e.g., mechanical latency, process cycle times, operating schedules, etc., associated with industrial devices). As another example, the properties or characteristics for network-related devices can comprise communication properties or characteristics (e.g., wireless and/or wireline communication functionality, type(s) of network or communication protocol(s), network or communication specifications, total bandwidth, etc.) of the respective network-related devices.

The set of data also can comprise information relating to, for example, the configuration of the network-related devices in relation to each other, or the configuration of network-related devices in relation to the industrial devices 414, industrial processes 416, and/or other industrial assets 418; software, firmware, and/or operating system utilized by the industrial automation system 406 (e.g., type(s), version(s), revision(s), configuration(s), etc., of the software, firmware, and/or operating system); functional and communicative relationships between industrial devices 414, industrial processes 416, industrial assets 418, network-related devices of the network component 420, etc. (e.g., communication connections or conditions between industrial devices, types of connections between industrial devices, communication connections between industrial devices and network-related devices, etc.). The set of data further can include information relating to, for example, human behavior or interaction in connection with the industrial automation system 406 (e.g., maintenance schedules, shift-specific or operator-specific behavior or interaction of operators with the industrial automation system); production or process flows of the industrial automation system 406 at particular times or in connection with particular projects; and/or other aspects or features of the industrial automation system 406.

The modeler component 426 can analyze the set of data and can generate the model 428 of the industrial automation system 406 based at least in part on the results of the analysis of the set of data. In some implementations, the modeler component 426 can generate the model 428, which can be a multidimensional (e.g., two-dimensional (2-D) or three-dimensional (3-D)) model, in accordance with an International Standardization Organization (ISO) standard(s).

The system 400 also can comprise the virtualization component 430 that can generate, update, and maintain a virtualized industrial automation system that can virtualize and correspond to the industrial automation system 406. The virtualization component 430 can generate or update the respective virtualized industrial automation system based at least in part on results of the analysis or analytics performed on the set of data and/or the model 428. The virtualized industrial automation system can be a multi-dimensional (e.g., 2-D or 3-D) virtualized industrial automation system. The virtualized industrial automation system also can comprise a virtualized industrial controller(s), including a virtualized cloud-based industrial controller that can virtualize and correspond to the industrial controller 402 and/or a virtualized industrial-plant-based industrial controller that can virtualize and correspond to an industrial-plant-based industrial controller (if any is present). The virtualization component 430 also can virtualize the defined control algorithm(s) to generate a virtualized control algorithm(s) that can correspond to the defined control algorithm(s) utilized by the industrial controller 402 (or industrial-plant-based industrial controller). The multi-dimensional virtualized industrial automation system can be used (e.g., interacted with by a user) to facilitate remote viewing of, interaction with, troubleshooting of problems with, controlling operation of, determining and/or generating optimization recommendations for, and/or optimization of industrial assets (e.g., 414, 416, 418) or the network component 420 of the industrial automation system 406.

When there are multiple industrial plant facilities, the modeler component 426 can generate a model 428 that can represent (e.g., model) the multiple industrial automation systems (e.g., 406) of the multiple industrial plant facilities and/or respective models (e.g., sub-models) of the respective industrial automation systems (e.g., 406) of the respective industrial plant facilities. The virtualization component 430 can facilitate generation of a multi-dimensional virtualization of the multiple industrial automation systems (e.g., 406) that can be interacted with by users to facilitate remote viewing of, interaction with, troubleshooting of problems with, controlling operation of, determining and/or generating optimization recommendations for, and/or optimization of industrial assets (e.g., 414, 416, 418) of the multiple industrial automation systems (e.g., 406).

In response to any changes to the industrial automation system 406 (e.g., modification of settings of an industrial device 414, replacement of an industrial asset 418, software update to an industrial device 414, modification of an industrial process 416), the industrial controller 402, analytics component 422, modeler component 426, or virtualization component 430 can detect and/or receive information relating to the changes to the industrial automation system 406. The industrial controller 402, analytics component 422, modeler component 426, or virtualization component 430 can analyze the information relating to the changes to the industrial automation system 406. Based at least in part on the results of the data analysis, the modeler component 426 can update or modify the model 428 to generate a modified model (e.g., new model 428) that can reflect and incorporate the changes made to the industrial automation system 406 to facilitate accurately modeling the industrial automation system 406 and improving operation of the industrial automation system 406. Also, based at least in part on the results of the data analysis, the virtualization component 430 can update or modify the virtualized industrial automation system reflect and incorporate the changes made to the industrial automation system 406 to facilitate accurately virtualizing the industrial automation system 406 and improving operation of the industrial automation system 406. Further, based at least in part on the results of the data analysis, the analytics component 422 can update (e.g., modify) correlations or generate new correlations relating to respective portions (e.g., industrial assets) or aspects of the industrial automation system 406, or update correlations or generate new correlations between respective portions (e.g., industrial assets) or aspects of the industrial automation system 406 and extrinsic conditions or events, to facilitate improving operation of the industrial automation system 406. Also, based at least in part on the results of the data analysis, as desired (e.g., when appropriate), the industrial controller 402 can modify operations, control instructions, a control algorithm, or other operational aspects associated with the industrial automation system 406, in accordance with the defined control criteria, to facilitate accounting for the changes to the industrial automation system 406.

As disclosed, the modeler component 426 can generate the model 428 of the industrial automation system 406 based at least in part on the results of the analysis of the industrial-automation-system-related data by the industrial controller 402, analytics component 422, modeler component 426, or virtualization component 430. The generated model 428 can be used by the analytics component 422 to facilitate performing analytics on the industrial automation system 406 and determining correlations relating to respective portions (e.g., industrial assets) or aspects of the industrial automation system 406, or correlations between respective portions (e.g., industrial assets) or aspects of the industrial automation system 406 and extrinsic conditions or events. In some implementations, the analysis performed by the analytics component 422 can be based in part on the aggregation of data relating to respective industrial assets (e.g., 414, 416, 418) and/or network-related devices of the network component 420, wherein the data aggregation can be modeled, in the model 428, on the physical structure of the industrial automation system 406. Such data aggregation and structuring can allow (e.g., enable) the analytics component 422 to locate respective industrial assets (e.g., 414, 416, 418) and/or network-related devices within the industrial-automation-system context (e.g., the analytics component 422 can identify an asset, a device, or production area in the industrial automation system 406 in which a sensor resides, based at least in part on the data aggregation and data structuring associated with the model 428).

The system 400 also can employ strategies and techniques to facilitate migrating controller functionality (e.g., of a hardware-based controller) from local hardware-based industrial controllers to the cloud platform 404 to generate or virtualize the hardware-based industrial controllers as cloud-based industrial controllers (e.g., 402). The virtualization component 430, modeler component 426, and/or analytics component 422 can facilitate obtaining function-related, feature-related, specification-related information regarding a hardware-based industrial controller from the hardware-based industrial controller and/or an extrinsic source(s) 410. The virtualization component 430, modeler component 426, and/or analytics component 422 can analyze such information, and the modeler component 426 can generate a model of the hardware-based industrial controller and/or the virtualization component 430 can generate a virtualized industrial controller (e.g., 402) that can operate on the cloud platform 404 based at least in part on the results of the analysis of such information.

In some implementations, when there is a local hardware-based industrial controller being used to control operations of the industrial automation system 406, the hardware-based industrial controller and the cloud-based industrial controller 402 can operate in parallel to control operations of the industrial automation system 406, as desired, in accordance with the defined control criteria. For instance, during initial implementation of the cloud-based industrial controller 402 or at other desired times (e.g., after modification, maintenance, or re-booting of the cloud-based industrial controller 402), the local hardware-based industrial controller and the cloud-based industrial controller 402 can operate in parallel to control operations of the industrial automation system 406 (e.g., with the hardware-based industrial controller taking a primary control role) at least until operation of the cloud-based industrial controller 402 has been verified as being acceptable (e.g., suitable, optimal, safe, correct, accurate) by the virtualization component 430, the industrial controller 402 itself, or another component (e.g., analytics component 422), in accordance with the defined control criteria. Once the cloud-based industrial controller 402 is determined to be operating in an acceptable manner (e.g., by the virtualization component 430 or other component), the cloud-based industrial controller 402 can take over all or a desired portion of the control of the industrial automation system 406 and/or the cloud-based industrial controller 402 can coordinate with each other to share control of the industrial automation system 406, in accordance with the defined control criteria and/or user preferences (e.g., preference of an authorized user associated with the industrial automation system 406).

The cloud-based industrial controller 402 and/or the virtualization component 430 also can scale or modify (e.g., automatically scale or modify) the size, complexity, and functionality of the cloud-based industrial controller 402 to correspond with and account for changes in size, complexity, and functionality made to the industrial automation system 406. The cloud-based industrial controller 402, the virtualization component 430, modeler component 426, and/or analytics component 422 can monitor the industrial automation system 406 and collect (e.g., via the collection component 408) data relating to changes in the size, complexity, and/or functionality made to the industrial automation system 406. The cloud-based industrial controller 402, the virtualization component 430, modeler component 426, and/or analytics component 422 can analyze such data to determine the changes made to the industrial automation system 406. Based at least in part on the analysis results, the cloud-based industrial controller 402 and/or the virtualization component 430 can scale or modify the size, complexity, and functionality of the cloud-based industrial controller 402 in response to the changes in the size, complexity, and functionality made to the industrial automation system 406.

In some implementations, the cloud-based industrial controller 402 can operate and execute in a big data cloud or public cloud (e.g., a public cloud that can employ security measures (e.g., via a security component, as disclosed herein) to facilitate securing the data, the industrial controller 402 and the other components on the cloud platform 404). In other implementations, the cloud-based industrial controller 402 can operate and execute in a local or private cloud associated with (e.g., owned, operated, or managed by) a particular entity (e.g., an entity that owns, operates, or manages an industrial enterprise) associated with the industrial automation system 406.

In accordance with other aspects and implementations of the disclosed subject matter, once the model 428 of an industrial automation system 406, the virtualized industrial control system, and virtualized industrial controller are constructed, the model 428, virtualized industrial control system, and virtualized industrial controller can be an active part of the enterprise entity's industrial automation system 406 and can be integrated with other services (e.g., industrial-control-related services, analytics services, correlation or data visualization services, virtualization services, custom data services, remote services) and applications.

Figure 5:
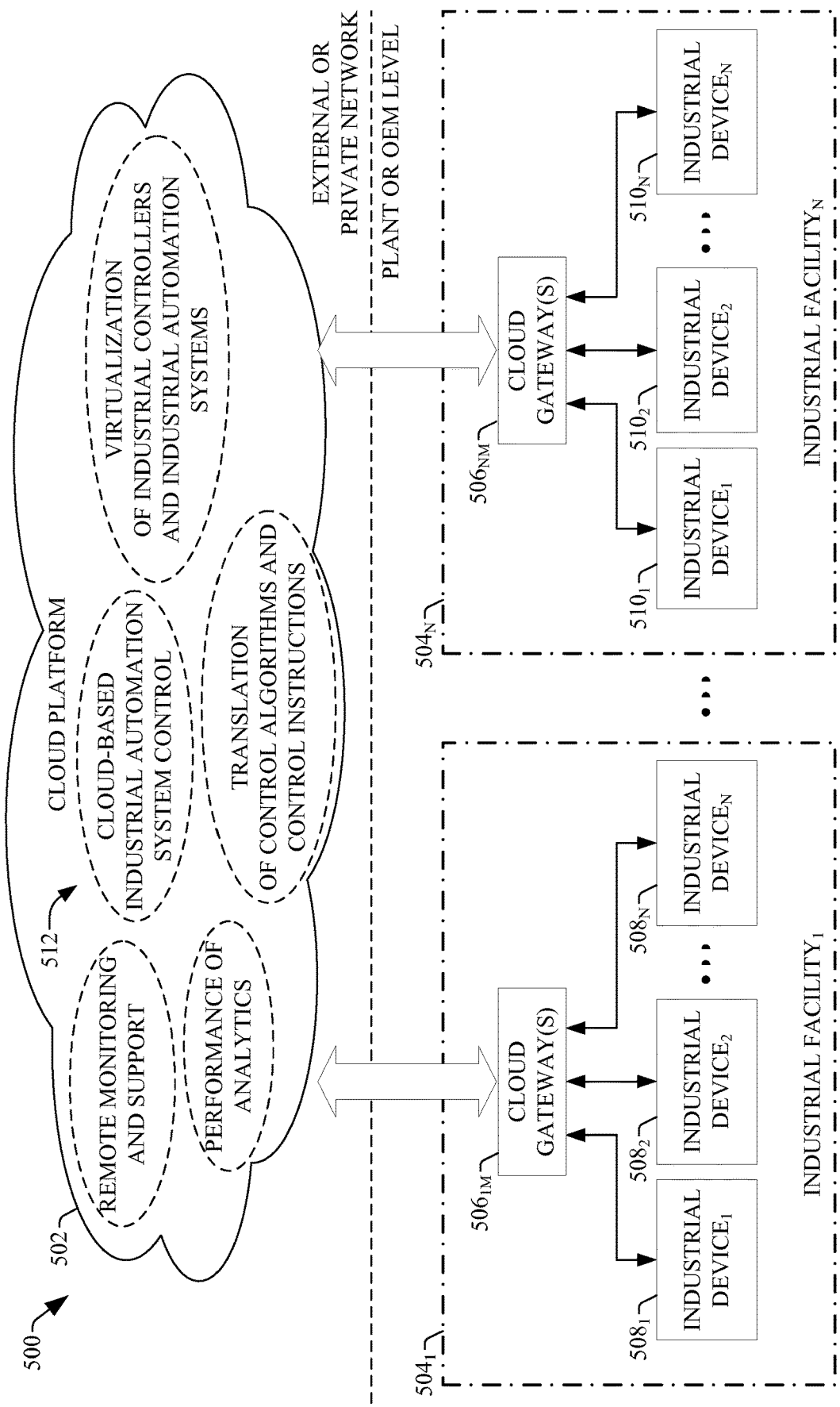
FIG. 5 illustrates a block diagram of a high-level overview of an example industrial enterprise that can leverage cloud-based services, including industrial-automation-system control services (e.g., remote or cloud-based industrial-automation-system control services), analytics services, data collection services, and data storage services, in accordance with various aspects and embodiments of the disclosed subject matter.

As disclosed herein, the systems (e.g., 100, 200, 300, 400) disclosed herein, or respective portions thereof, can be located on a cloud platform. To provide a general context for the cloud-based systems (e.g., industrial-controller systems, analytics systems, modeling systems, virtualization systems) and services described herein, FIG. 5 illustrates a block diagram of a high-level overview of an example industrial enterprise 500 that can leverage cloud-based services, including industrial-automation-system control services (e.g., remote or cloud-based industrial-automation-system control services), analytics services, data collection services, and data storage services, in accordance with various aspects and embodiments of the disclosed subject matter. The industrial enterprise 500 can comprise one or more industrial facilities, such as industrial facility$_2$ 504$_1$ up through industrial facility$_N$ 504$_N$, wherein each industrial facilitate can include a number of industrial devices in use. For example, industrial facility$_1$ 504$_1$ can comprise industrial device$_1$ 508$_1$ up through industrial device$_N$ 508$_N$, and industrial facility$_N$ 504$_N$ can comprise industrial device$_1$ 510$_1$ up through industrial device$_N$ 510$_N$. The industrial devices (e.g., 508$_1$, 508$_N$, 510$_1$, 510$_N$, etc.) can make up one or more industrial automation systems that can operate within the respective industrial facilities (e.g., industrial facility$_1$ 504$_1$ up through industrial facility$_N$ 504$_N$). Exemplary industrial automation systems can include, but are not limited to, batch control systems (e.g., mixing systems), continuous control systems (e.g., proportional-integral-derivative (PID) control systems), or discrete control systems. Industrial devices (e.g., 508$_1$, 508$_N$, 510$_1$, 510$_N$, etc.) can comprise such industrial devices as industrial controllers (e.g., programmable logic controllers or other types of programmable automation controllers); field devices such as sensors and meters; motor drives; HMIs; industrial robots, barcode markers, and readers; vision system devices (e.g., vision cameras); smart welders; or other types of industrial devices.

Exemplary industrial automation systems can include one or more industrial controllers (e.g., cloud-based or remote industrial controller, an industrial-plant-based industrial controller) that can facilitate monitoring and controlling of their respective industrial processes. The industrial controllers can exchange data with the field devices using native hardwired I/O or via a plant network, such as Ethernet/Internet Protocol (IP), Data Highway Plus, ControlNet, Devicenet, or the like. A given industrial controller typically can receive any combination of digital or analog signals from the field devices that can indicate a current state of the industrial devices and/or their associated industrial processes (e.g., temperature, position, part presence or absence, fluid level, etc.), and can execute a user-defined control program that can perform automated decision-making for the controlled industrial processes based on the received signals. The industrial controller can output appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code that can be used to process input signals read into the controller and to control output signals generated by the industrial controller, including, but not limited to, ladder logic, sequential function charts, function block diagrams, structured text, or other such platforms.

Although the exemplary overview illustrated in FIG. 5 depicts the industrial devices (e.g., $508_1$, $508_N$, $510_1$, $510_N$) as residing in fixed-location industrial facilities (e.g., industrial facility$_1$ $504_1$ up through industrial facility$_N$ $504_N$, respectively), in some implementations, the industrial devices (e.g., $508_1$, $508_N$, $510_1$, and/or $510_N$) also can be part of a mobile control and/or monitoring application, such as a system contained in a truck or other service vehicle.

According to one or more embodiments of the disclosed subject matter, industrial devices (e.g., $508_1$, $508_N$, $510_1$, $510_N$, etc.) can be coupled to a cloud platform 502 to facilitate leveraging cloud-based applications and services (e.g., data collection services, data storage services, industrial-controller services, analytics services, modeling services, virtualization services, etc.) associated with the cloud platform 502. That is, the industrial devices (e.g., $508_1$, $508_N$, $510_1$, $510_N$, etc.) can be configured to discover and interact with cloud-based computing services 512 that can be hosted by the cloud platform 502. The cloud platform 502 can be any infrastructure that can allow the cloud services 512 (e.g., cloud-based computing services, shared computing services) to be accessed and utilized by cloud-capable devices. The cloud platform 502 can be a public cloud that can be accessible via a public network, such as the Internet, by devices having public network connectivity (e.g., Internet connectivity) and appropriate authorizations to utilize the cloud services 512. In some scenarios, the cloud platform 502 can be provided by a cloud provider as a platform-as-a-service (PaaS) and/or reliability-as-a-service (RaaS), and the cloud services 512 can reside and execute on the cloud platform 502 as a cloud-based service. In some such configurations, access to the cloud platform 502 and associated cloud services 512 can be provided to customers as a subscription service by an owner of the cloud services 512. Additionally and/or alternatively, the cloud platform 502 can be a private cloud that can be operated internally by the industrial enterprise 500 or an associated enterprise associated with a third-party entity. An exemplary private cloud platform can comprise a set of servers that can host the cloud services 512 and can reside on a private network (e.g., an intranet, a corporate network, etc.) that can be protected by a firewall.

The cloud services 512 can include, but are not limited to, data collection, data storage, cloud-based or remote control of industrial automation systems by a cloud-based or remote industrial controller, control applications (e.g., applications that can generate and deliver control instructions to industrial devices (e.g., $508_1$, $508_N$, $510_1$, $510_N$, etc.) based at least in part on analysis of real-time or near real-time system data or other factors), performing analytics on data, determining correlations between respective items of interest associated with an industrial automation system(s), determining modifications that can be made in connection with an industrial automation system(s) based at least in part on results of the analytics and/or the determined correlations, remote monitoring and support, generation and management of a model(s) of an industrial automation system(s) that can correspond to the industrial automation system(s), generation and management of virtualized components (e.g., virtualized industrial controller, virtualized industrial device, virtualized industrial process) of data associated with industrial automation system(s), remote control of an industrial automation system(s) via a model(s) or virtualized industrial automation system(s), customization of a model(s) or virtualized industrial automation system and/or a data overlay on the virtualized industrial automation system, generation of virtual notes, view sharing (e.g., sharing of customized view of, customized data overlay associated with, and/or a virtual note associated with, a virtualized industrial automation system), provision of security in connection with a model or virtualized industrial automation system and an associated industrial automation system, or provision of other applications or services relating to industrial automation. If the cloud platform 502 is a web-based cloud, industrial devices (e.g., $508_1$, $508_N$, $510_1$, $510_N$, etc.) at the respective industrial facilities 504 can interact with cloud services 512 via the public network (e.g., the Internet). In an exemplary configuration, the industrial devices (e.g., $508_1$, $508_N$, $510_1$, $510_N$, etc.) can access the cloud services 512 through separate cloud gateways (e.g., cloud gateway component $506_{1M}$ up through cloud gateway component $506_{NM}$) at the respective industrial facilities (e.g., industrial facility$_1$ $504_1$ up through industrial facility$_N$ $504_N$, respectively), wherein the industrial devices (e.g., $508_1$, $508_N$, $510_1$, $510_N$, etc.) can connect to the respective cloud gateway components (e.g., cloud gateway component $506_{1M}$ up through cloud gateway component $506_{NM}$) through a physical (e.g., wireline) or wireless local area network or radio link. In another exemplary configuration, the industrial devices (e.g., $508_1$, $508_N$, $510_1$, $510_N$, etc.) can access the cloud platform 502 directly using an integrated cloud gateway service. Cloud gateway components (e.g., cloud gateway component $506_{1M}$ up through cloud gateway component $506_{NM}$) also can comprise an integrated component of a network infrastructure device, such as a firewall box, router, or switch.

Providing industrial devices with cloud capability via the cloud gateway components (e.g., cloud gateway component $506_{1M}$ up through cloud gateway component $506_{NM}$) can offer a number of advantages particular to industrial automation. For instance, cloud-based storage (e.g., cloud-based data store) offered by the cloud platform 502 can be easily scaled to accommodate the large quantities of data that can be generated daily by an industrial enterprise. Further, multiple industrial facilities (e.g., industrial facility$_1$ $504_1$ up through industrial facility$_N$ $504_N$) at different geographical locations can migrate (e.g., communicate) their respective industrial automation data to the cloud platform 502 (e.g., via the collection component) for aggregation, collation, collective big data analysis, and enterprise-level reporting without the need to establish a private network between the respective industrial facilities. Industrial devices (e.g., $508_1$, $508_N$, $510_1$, $510_N$, etc.) and/or cloud gateway components (e.g., cloud gateway component $506_{1M}$ up through cloud gateway component $506_{NM}$) having smart configuration capability can be configured to automatically detect and communicate with the cloud platform 502 upon installation at any facility, which can thereby simplify integration with existing cloud-based data storage, analysis, or reporting applications used by the industrial enterprise 500. In another exemplary application, a cloud-based or remote industrial controller can be interfaced with the assets (e.g., industrial devices (e.g., $508_1$, $508_N$, $510_1$, $510_N$), industrial processes, other industrial assets, network component) of an industrial automation system at an industrial facility (e.g., $504_1$, $504_N$) via one or more cloud gateway components (e.g., $506_{1m}$, $506_{NM}$). The cloud-based or remote industrial controller can receive data relating to the industrial devices (e.g., $508_1$, $508_N$, $510_1$, $510_N$), industrial processes, other industrial assets, and network component of the industrial automation system, and/or data from extrinsic data sources, can analyze such data and/or received analytics results from analytics performed on such data by the analytics component, can determine control instructions based at least in part on the analysis or analytics results, and can communicate the control instructions to the industrial devices (e.g., $508_1$, $508_N$, $510_1$, $510_N$), industrial processes, other industrial assets, network component, and/or a industrial-plant-based industrial controller of the industrial automation system to control operations of the industrial automation system. In still another exemplary application, cloud-based analytics applications (e.g., employed by an analytics system comprising the analytics component) can access the data relating to an industrial automation system(s) stored in the cloud-based data store, perform analytics on the data to generate analysis results, determine correlations between respective aspects (e.g., internal or intrinsic aspects, external or extrinsic aspects) associated with an industrial automation system(s), and generate notifications, recommendations, and/or instructions (e.g., control instructions that can be implemented or executed by a cloud-based or remote industrial controller) based on the correlations to facilitate improved operation of the industrial automation system(s). These industrial cloud-computing applications are only intended to be exemplary, and the systems and methods described herein are not limited to these particular applications. As these examples demonstrate, the cloud platform 502, working with cloud gateway components (e.g., cloud gateway component $506_{1M}$ up through cloud gateway component $506_{NM}$), can allow builders of industrial applications to provide scalable solutions as a service, removing the burden of maintenance, upgrading, and backup of the underlying infrastructure and framework.

Figure 6:
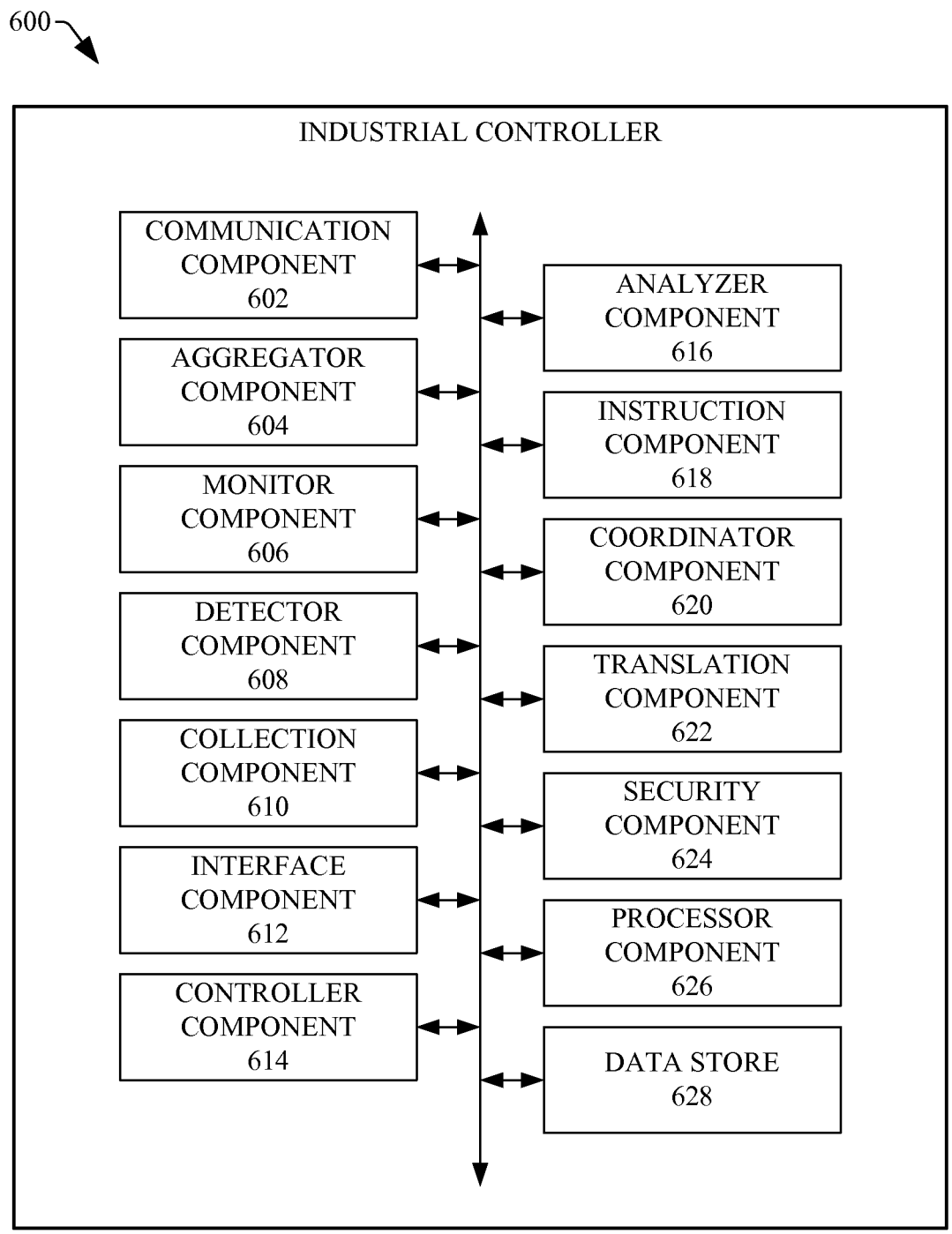
FIG. 6 presents a block diagram of an exemplary cloud-based industrial controller according to various implementations and embodiments of the disclosed subject matter.

FIG. 6 presents a block diagram of an exemplary industrial controller 600 (e.g., cloud-based, or partially cloud-based, industrial controller) according to various implementations and embodiments of the disclosed subject matter. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

The industrial controller 600 can comprise a communication component 602 that can be used to communicate (e.g., transmit, receive) information between the industrial controller 600 and other components (e.g., communication devices, network-related devices, industrial devices, other types of industrial assets that have communication functionality, other devices with communication functionality that are associated with industrial enterprises, cloud gateway components, etc.). The information can include, for example, data relating to industrial automation systems, data relating to specifications, properties, or characteristics of industrial devices or other industrial assets, customer-related data, work-order-related data relating to work orders that will or may be handled by an industrial automation system, etc.

The industrial controller 600 can comprise an aggregator component 604 that can aggregate data received (e.g., obtained, collected, detected, etc.) from various entities (e.g., communication devices, industrial devices, industrial assets, network-related devices, cloud gateway components, modeler component, virtualization component, other devices with communication functionality that are associated with industrial enterprises, processor component(s), user interface(s), data store(s), etc.). The aggregator component 604 can correlate respective items of data based at least in part on type of data, source of the data, time or date the data was generated or received, type of device or asset associated with the data, identifier associated with a device or asset, customer associated with the data, user (e.g., operator, supervisor or manager, engineer, technician, etc.) associated with the data, industrial automation system associated with the data, industrial enterprise associated with the system, etc., to facilitate processing of the data (e.g., analyzing of the data).

The industrial controller 600 also can include a monitor component 606 that can monitor device data, process data, asset data, system data, control-related data, customer data, and/or other data in connection with the industrial automation systems. For instance, the monitor component 606 can monitor information (e.g., signals, device or process statuses, network communication of information, process flows, updates, modifications, etc.) associated with industrial automation systems, modeled industrial automation systems, virtualized industrial automation systems, industrial enterprises, and/or systems or devices of customers associated with the industrial enterprises to facilitate detecting information associated with industrial automation systems that can facilitate controlling operations of the industrial automation systems, analyzing such data, determining whether changes are to be made to control instructions or a control algorithm, translating control instructions or a control algorithm, remotely tracking operation of or remotely controlling operation of an industrial automation system via the cloud-based industrial controller 600 and/or a virtualized industrial automation system (e.g., comprising a virtualized industrial controller), and/or performing other services (e.g., cloud-based services). The monitor component 606 can be associated with sensors, meters, HMIs, communication monitoring components, or other components associated with industrial automation systems, industrial enterprises, and/or systems or devices of the customers to facilitate the monitoring of the industrial automation systems, industrial enterprises, and/or systems or devices of the customers.

The industrial controller 600 can comprise a detector component 608 that can detect desired information associated with industrial automation systems that can facilitate performing industrial-control-related services, analytics-related services, model-related services, and virtualization-related services in connection with an industrial automation system. For example, the detector component 608 can detect desired information associated with industrial automation systems that can facilitate performing cloud-based or remote control of the industrial automation system, analyzing data relating to industrial automation systems, determining whether changes are to be made to control instructions or a control algorithm, translating control instructions or a control algorithm, or remotely interacting with (e.g., monitoring, tracking, and/or controlling, etc., operation of) an industrial automation system via interacting with a virtualized industrial automation system, in accordance with the defined control criteria, or other operation criteria. For instance, the detector component 608 can detect or discover desired device data, process data, asset data, system data, and/or customer data in connection with the industrial automation systems that can facilitate performing such services (e.g., cloud-based services).

The industrial controller 600 also can include a collection component 610 that can receive, collect, or obtain data (e.g., desired device data, process data, asset data, system data, and/or customer data) from industrial automation systems, communication devices, models, virtualized industrial automation systems, extrinsic sources, etc., to facilitate performing industrial-control-related, analytics-related, model-related, and virtualization-related services, as more fully disclosed herein. The data collected by the collection component 610 can be stored in the data store 628, and/or can be made available to other components (e.g., analyzer component 616, instruction component 618, processor component 626, etc.) to facilitate performing cloud-based or remote control of the industrial automation system, analyzing data relating to industrial automation systems, determining whether changes are to be made to control instructions or a control algorithm, translating control instructions or a control algorithm, or performing other industrial-control-related, analytics-related, model-related, or virtualization-related services or functions.

The industrial controller 600 can comprise an interface component 612 that can be employed to facilitate interfacing the industrial controller 600 (or interfacing an associated analytics component, modeler component, or virtualization component) with industrial automation systems and their constituent components (e.g., industrial devices or assets, network-related devices or assets, etc.) or processes, systems or devices associated with customers, systems or devices associated with device manufacturers, etc. For instance, the interface component 612 can be configured to receive industrial data (e.g., device data, process data, asset data, system data, configuration data, status data, process variable data, etc.) sent by one or more cloud-capable industrial devices, cloud gateway components, communication devices, or other sources of industrial data. The interface component 612 also can be configured to receive network-related data (e.g., data relating to communication conditions, network-status data, data identifying network-related devices, etc.) communicated by one or more network-related devices of the network component of an industrial automation system. The interface component 612 also can be configured to interface the industrial controller 600 (e.g., a virtualized industrial controller), a model, or an virtualized industrial automation system with a corresponding industrial automation system to facilitate cloud-based control of the industrial automation system by the industrial controller 600, or remotely interacting with (e.g., monitoring, tracking, and/or controlling, etc., operation of) the industrial automation system via interactions (e.g., user interactions) with the virtualized industrial automation system (e.g., via virtualized control of the virtualized operation of the virtualized industrial automation system)). The interface component 612 further can be configured to exchange data with one or more client or customer devices via an Internet connection. For example, the interface component 612 can receive customer profile data, requests for firmware upgrades, customer service selections, information relating to work orders for products, customer preferences or requirements with regard to a work order, or other such information from a client device (e.g., an Internet-capable client device, such as a phone, a computer, an electronic tablet or pad, or other suitable Internet-capable device). The interface component 612 also can deliver upgrade notifications, firmware upgrades, reports or notifications regarding the evaluation of and determinations regarding proposed modifications to an industrial automation system, notifications of impending device failures, identification of asset or system inefficiencies, configuration recommendations, or other such data to the client device.

The industrial controller 600 also can contain an operation controller component 614 that can control operations relating to processing data, performing industrial-control related operations, analyzing data, determining whether changes are to be made to control instructions or a control algorithm, translating control instructions or a control algorithm, or performing other industrial-control-related, analytics-related, model-related, or virtualization-related services or functions. The operation controller component 614 can facilitate controlling operations being performed by various components of the industrial controller 600, controlling data flow between various components of the industrial controller 600, controlling data flow between the industrial controller 600 and other components or systems associated with the industrial controller 600, etc.

The industrial controller 600 also can comprise an analyzer component 616 that can analyze data (e.g., operational data, device data, process data, asset data, system data, customer data, user-generated or user-provided data, and/or other data) to facilitate performing industrial-control related operations, determining whether changes are to be made to control instructions or a control algorithm, translating control instructions or a control algorithm, or performing other industrial-control-related, analytics-related, model-related, or virtualization-related services or functions. The analyzer component 616 can parse data to facilitate identifying data that is relevant to performing an operation (e.g., performing industrial-control related operations, determining whether changes are to be made to control instructions or a control algorithm, translating control instructions or a control algorithm) by the industrial controller 600. Based at least in part on the analysis of the data, the analyzer component 616 can generate analysis results that can be provided to another component (e.g., operation controller component 614, instruction component 618, processor component 626, data store 628, etc.) to facilitate the performance of various operations by the industrial controller 600.

The industrial controller 600 also can comprise an instruction component 618 that can determine control instructions, or determine modifications to be made to control instructions, that are to be implemented or executed to control operations of the industrial automation system based at least in part on the analysis results, in accordance with the defined control algorithm and the defined control criteria. When an industrial-plant-based industrial controller is employed by an industrial automation system, the instruction component 618 also can determine control instructions or supplemental control instructions that are to be implemented or executed by the industrial-plant-based industrial controller based at least in part on the analysis results, in accordance with the defined control algorithm and the defined control criteria.

In some implementations, the industrial controller 600 can include a coordinator component 620 that can coordinate respective operations of the cloud-based industrial controller 600 and an industrial-plant-based industrial controller of the industrial automation system, when the industrial-plant-based industrial controller is employed by the industrial automation system. The coordinator component 620 can facilitate synchronizing the respective performance of the respective control operations in connection with the industrial automation system by the cloud-based industrial controller 600 and the industrial-plant-based industrial controller. The coordinator component 620 can exchange data (e.g., operational data, status data) with the industrial-plant-based industrial controller via a cloud gateway component to facilitate determining what operations have or are being performed by the industrial-plant-based industrial controller, the status of the industrial-plant-based industrial controller or industrial assets that are being controlled by the industrial-plant-based industrial controller, or other aspects associated with the industrial-plant-based industrial controller to facilitate coordinating the respective performance of the respective control operations in connection with the industrial automation system by the cloud-based industrial controller 600 and the industrial-plant-based industrial controller, and the sharing of control functions by the cloud-based industrial controller 600 and the industrial-plant-based industrial controller.

The industrial controller 600 also can comprise a translation component 622 that can determine a translation to apply to a control algorithm or control instructions based at least in part on the characteristics of an industrial-plant-based industrial controller or an industrial automation system. The translation component 622 can retrieve a control algorithm or control instructions that are in one format (e.g., a standardized or agnostic format, a commonly used format), and can apply the determined translation to the control algorithm or control instructions to generate a translated control algorithm or translated control instructions. The industrial controller 600, via the communication component 602 can communicate the translated control algorithm or translated control instructions to the industrial-plant-based industrial controller, for example, via a cloud gateway component.

The industrial controller 600 also can comprise a security component 624 that can facilitate securing data associated with the industrial controller 600, industrial automation systems customer data, and models or virtualizations of industrial automation systems. The security component 624 can facilitate controlling access to data associated with the industrial controller 600, industrial automation systems, customer data, a model (or a particular (e.g., customized) view of a model), a virtualized industrial automation system (or a particular (e.g., customized) view of a virtualized industrial automation system), based at least in part on respective authentication credentials of respective users, respective access rights of users, respective locations of users, etc., as more fully disclosed herein.

The industrial controller 600 also can comprise a processor component 626 that can operate in conjunction with the other components (e.g., communication component 602, aggregator component 604, monitor component 606, etc.) to facilitate performing the various functions and operations of the industrial controller 600. The processor component 626 can employ one or more processors (e.g., CPUs, GPUs, FPGAs, etc.), microprocessors, or controllers that can process data, such as industrial data (e.g., device data, process data, asset data, system data, etc.) associated with industrial control systems, customer or client related data, data relating to parameters associated with the industrial controller 600 and associated components, etc., to facilitate performing industrial-control related operations, analyzing data, determining whether modifications are to be made to control instructions or a control algorithm, translating control instructions or a control algorithm, determining changes to operations or industrial assets associated with the industrial automation system(s) that can facilitate improving operations associated with the industrial automation system(s) and/or achieving desired goals with respect to the industrial automation system(s), or performing other industrial-control-related, analytics-related, model-related, or virtualization-related services or functions; and can control data flow between the industrial controller 600 and other components associated with the industrial controller 600.

In yet another aspect, the industrial controller 600 can contain a data store 628 that can store data structures (e.g., user data, metadata); code structure(s) (e.g., modules, objects, classes, procedures), commands, or instructions; industrial data or other data associated with industrial automation systems or industrial enterprises; customer or client related information; data relating to industrial-control-related, analytics-related, model-related, or virtualization-related services in connection with industrial automation systems; parameter data; algorithms (e.g., algorithm(s) (e.g., control algorithm(s)) relating to controlling operations of industrial automation systems; algorithm(s) relating to determining control instructions to be implemented or executed; algorithm(s) relating to translating a control algorithm or control instructions; defined control criteria or other operational criteria; and so on. In an aspect, the processor component 626 can be functionally coupled (e.g., through a memory bus) to the data store 628 in order to store and retrieve data desired to operate and/or confer functionality, at least in part, to the communication component 602, aggregator component 604, monitor component 606, etc., of the industrial controller 600 and/or substantially any other operational aspects of the industrial controller 600.

It is to be appreciated and understood that the various components of the industrial controller 600 can communicate data, instructions, or signals between each other and/or between other components associated with the industrial controller 600 as desired to carry out operations of the industrial controller 600. It is to be further appreciated and understood that respective components (e.g., communication component 602, aggregator component 604, monitor component 606, etc.) of the industrial controller 600 each can be a stand-alone unit, can be included within the industrial controller 600 (as depicted), can be incorporated within another component of the industrial controller 600 or a component separate from the industrial controller 600, and/or virtually any suitable combination thereof, as desired. It also is to be appreciated and understood that respective components (e.g., communication component 602, aggregator component 604, monitor component 606, . . . processor component 626, data store 628) of the industrial controller 600 can be shared with and used by another component(s) (e.g., analytics component, modeler component, virtualization component) or system(s) (e.g., analytics system, modeler system, virtualization system) or such other component(s) or system(s) can comprise components that can be the same as or similar to that of the industrial controller 600.

In accordance with various embodiments, one or more of the various components of the industrial controller 600 (e.g., communication component 602, aggregator component 604, monitor component 606, etc.) can be electrically and/or communicatively coupled to one another to perform one or more of the functions of the industrial controller 600. In some implementations, one or more components of the industrial controller 600 (e.g., communication component 602, aggregator component 604, monitor component 606, etc.) can comprise software instructions that can be stored in the data store 628 and executed by the processor component 626. The industrial controller 600 also can interact with other hardware and/or software components not depicted in FIG. 6. For example, the processor component 626 can interact with one or more external user interface devices, such as a keyboard, a mouse, a display monitor, a touchscreen, or other such interface devices.

Figure 7:
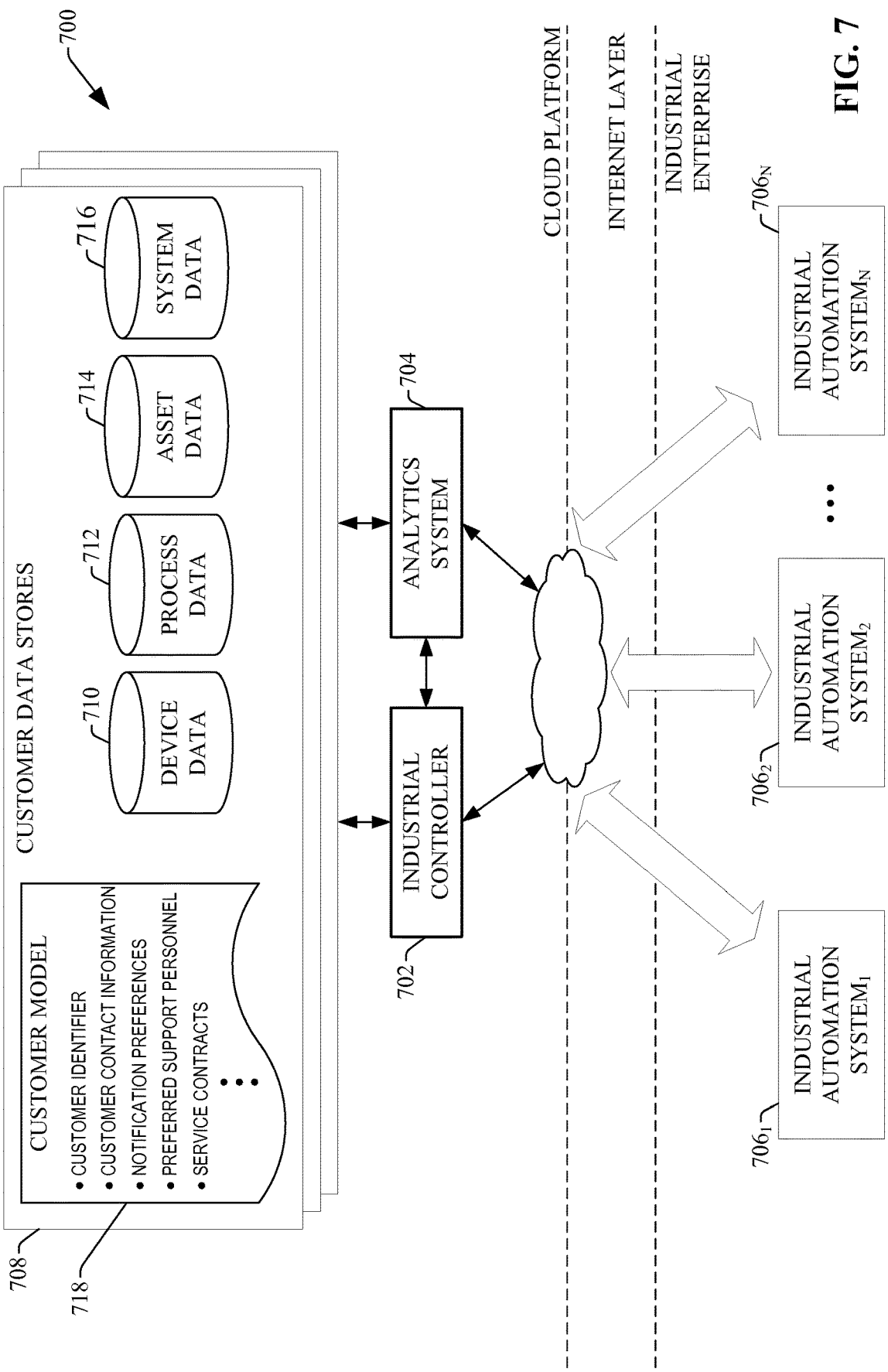
FIG. 7 illustrates a diagram of an example system that can facilitate cloud-based control of an industrial automation system and performing analytics on data relating to the industrial automation system, and the performance of other control-related and analytics-related based at least in part collection of customer-specific industrial data by a cloud-based industrial controller and a cloud-based analytics system, in accordance with various aspects and embodiments of the disclosed subject matter.

FIG. 7 illustrates a diagram of an example system 700 that can facilitate cloud-based control of an industrial automation system and performing analytics on data relating to the industrial automation system, and the performance of other control-related and analytics-related based at least in part collection of customer-specific industrial data by a cloud-based industrial controller and a cloud-based analytics system, in accordance with various aspects and embodiments of the disclosed subject matter. The system 700 can include an industrial controller 702 and an analytics system 704 that respectively can execute as cloud-based services on a cloud platform (e.g., cloud platform 502 of FIG. 5), and can collect data from multiple industrial automation systems, such as industrial automation system$_1$ 706$_1$, industrial automation system$_2$ 706$_2$, and/or (up through) industrial automation system$_N$ 706$_N$. The industrial automation systems (e.g., 706$_1$, 706$_2$, 706$_N$) can comprise different industrial automation systems within a given facility and/or different industrial facilities at diverse geographical locations. Industrial automation systems (e.g., 706$_1$, 706$_2$, 706$_N$) also can correspond to different business entities (e.g., different industrial enterprises or customers), wherein the industrial controller 702 and analytics system 704 can collect and maintain a distinct customer data store 708 for each customer or business entity.

The industrial controller 702 and analytics system 704 can organize manufacturing data collected from the industrial automation systems (e.g., 706$_1$, 706$_2$, 706$_N$) according to various classes. In the illustrated example, manufacturing data can be classified according to device data 710, process data 712, asset data 714, and system data 716.

Figure 8:
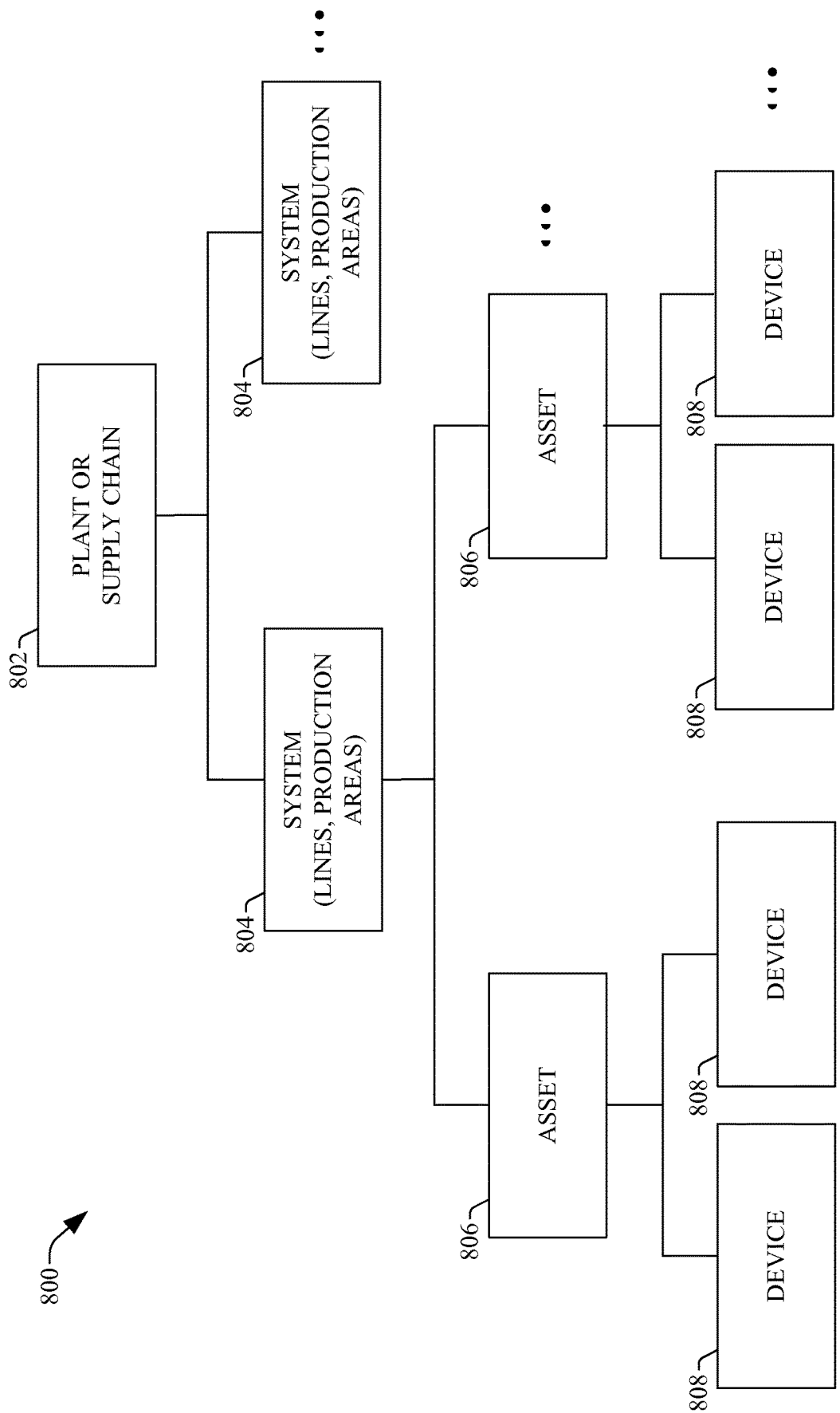
FIG. 8 illustrates a diagram of an example hierarchical relationship between example data classes.

Referring briefly to FIG. 8, FIG. 8 illustrates a diagram of an example hierarchical relationship 800 between these example data classes. A given plant or supply chain 802 can comprise one or more industrial automation systems 804. The industrial automation systems 804 can represent the production lines or productions areas within a given plant facility or across multiple facilities of a supply chain. Each industrial automation system 804 can comprise a number of assets 806 that can represent the machines and equipment that make up the industrial automation system (e.g., the various stages of a production line). In general, each asset 806 can comprise one or more industrial devices 808, which can include, for example, the programmable controllers, motor drives, HMIs, sensors, meters, etc. comprising the asset 806. The various data classes depicted in FIGS. 7 and 8 are only intended to be exemplary, and it is to be appreciated that any organization of industrial data classes maintained by the industrial controller 702 and analytics system 704 is within the scope of one or more embodiments of the disclosed subject matter.

Returning again to FIG. 7 (along with FIG. 8), the industrial controller 702 and analytics system 704 can collect and maintain data from the various devices and assets that make up the industrial automation systems (e.g., 706$_1$, 706$_2$, 706$_N$) and can classify the data according to the aforementioned classes for the purposes of facilitating control (e.g., cloud-based or remote control) of the industrial automation systems (e.g., 706$_1$, 706$_2$, 706$_1$0, analysis of the data, and/or performing other operations by the industrial controller 702 and analytics system 704. Device data 710 can comprise device-level information relating to the identity, configuration, and status of the respective devices comprising the industrial automation systems (e.g., 706$_1$, 706$_2$, 706$_1$0, including but not limited to device identifiers, device statuses, current firmware versions, health and diagnostic data, device documentation, identification and relationship of neighboring devices that interact with the device, etc.

The process data 712 can comprise information relating to one or more processes or other automation operations carried out by the devices; e.g., device-level and process-level faults and alarms, process variable values (speeds, temperatures, pressures, etc.), and the like.

The asset data 714 can comprise information generated, collected, determined, or inferred based on data that can be aggregated from various (e.g., multiple) industrial devices over time, which can yield higher asset-level views of the industrial automation systems (e.g., 706$_1$, 706$_2$, 706$_N$). Example asset data 714 can include performance indicators (e.g., key performance indicators (KPIs)) for the respective assets, asset-level process variables, faults, alarms, etc. Since the asset data 714 can yield a relatively longer term view of asset characteristics relative to the device and process data, the industrial controller 702 and analytics system 704 can leverage the asset data 714 to facilitate controlling operations of the industrial automation systems (e.g., 706$_1$, 706$_2$, 706$_N$), identifying operational patterns and correlations unique to each asset, among other types of analysis, and this can facilitate generating performance analytics, determining correlations between respective aspects (e.g., internal or intrinsic aspects, external or extrinsic aspects) associated with an industrial automation system(s), generating notifications, recommendations, or instructions relating to the determined correlations, generating respective modeling assets or virtualization assets that can correspond to the respective assets, and generating, updating, using, customizing, etc., of model or a virtualized industrial automation system of the industrial control system based at least in part on the respective models or virtualizations of the respective assets associated with the industrial control system.

The system data 716 can comprise collected, determined, or inferred information that can be generated based on data that can be aggregated from various (e.g., multiple) assets over time. The system data 716 can characterize system behavior within a large system of assets, yielding a system-level view of each of the industrial automation systems (e.g., 706$_1$, 706$_2$, 706$_N$). The system data 716 also can document the particular system configurations in use and industrial operations performed at each of the industrial automation systems (e.g., 706$_1$, 706$_2$, 706$_N$). For example, the system data 716 can document the arrangement of assets, interconnections between devices, the product being manufactured at a given facility, an industrial process performed by the assets, a category of industry of each industrial system (e.g., automotive, oil and gas, food and drug, marine, textiles, etc.), or other relevant information. Among other functions, this data can be accessed by technical support personnel during a support session so that particulars of the customer's unique system and device configurations can be obtained without reliance on the customer to possess complete knowledge of their assets.

As an example, a given industrial facility can include a packaging line (e.g., the system), which in turn can comprise a number of individual assets (e.g., a filler, a labeler, a capper, a palletizer, etc.). Each asset can comprise a number of devices (e.g., controllers, variable frequency drives, HMIs, etc.). Using an architecture similar to that depicted in FIG. 5, the industrial controller 702 and analytics system 704 can collect industrial data from the individual devices during operation and can classify the data in the customer data store 708 according to the aforementioned classifications. Note that some data may be duplicated across more than one class. For example, a process variable classified under process data 712 also can be relevant to the asset-level view of the system represented by the asset data 714. Accordingly, such process variables can be classified under both classes. Moreover, subsets of data in one classification can be derived, determined, or inferred based on data under another classification. For example, subsets of system data 716 that can characterize certain system behaviors can be derived, determined, or inferred based on a long-term analysis of data in the lower-level classifications.

In addition to maintaining the data classes (e.g., 710, 712, 714, 716), each customer data store also can maintain a customer model 718 that can contain data specific to a given industrial entity or customer. The customer model 718 can contain customer-specific information and preferences, which can be leveraged by (e.g., used by) the industrial controller 702 and analytics system 704 to facilitate controlling the industrial automation systems, generating performance analytics, determining correlations between respective aspects (e.g., internal or intrinsic aspects, external or extrinsic aspects) associated with an industrial automation system(s), generating notifications, recommendations, or instructions relating to the determined correlations, remotely interacting with (e.g., monitoring, tracking, controlling, etc.) an industrial automation system using a virtualized industrial controller and/or an associated virtualized industrial automation system, generating or updating a model of an industrial automation system, generating or updating a virtualized industrial automation system that can represent an industrial automation system, customizing a view of and/or a data overlay associated with a virtualized industrial automation system for a user, sharing a customized view of and/or a customized data overlay associated with a virtualized industrial automation system for a user, processing virtual notes, generating a simulation model of an industrial automation system, performing simulation operations using simulation models, and/or performing other operations in connection with the industrial automation system, etc. Example information that can be maintained in the customer model 718 can include a client identifier, client preferences or requirements with regard to production or work orders associated with an industrial automation system, control-related information and/or preferences of the client with regard to controlling the industrial automation system, analytics results relating to analysis of data associated with a client, determined correlations relating to an industrial automation system(s), determined notifications, recommendations, and/or instructions relating to the determined correlations, client contact information specifying which plant personnel are to be notified in response to results of a response of the industrial automation system to a user interaction with an associated model or virtualized industrial automation system, notification preferences that can specify how plant personnel are to be notified (e.g., email, mobile phone, text message, etc.), service contracts that are active between the customer and the technical support entity, and other such information. The industrial controller 702 and analytics system 704 can marry (e.g., associate, link, unite, map, etc.) data collected for each customer with the corresponding customer model 718 for identification and event handling purposes.

As noted above, industrial data can be migrated (e.g., communicated) from industrial devices to the cloud platform (e.g., comprising the industrial controller 702 and analytics system 704) using cloud gateway components. To this end, some devices can include integrated cloud gateways that can directly interface each device to the cloud platform. Additionally or alternatively, some configurations can utilize a cloud proxy device that can collect industrial data from multiple devices associated with the industrial automation systems (e.g., $706_1$, $706_2$, $706_N$) and can send (e.g., transmit) the data to the cloud platform. Such a cloud proxy can comprise a dedicated data collection device, such as a proxy server that can share a network (e.g., communication network) with the industrial devices. Additionally or alternatively, the cloud proxy can be a peer industrial device that can collect data from other industrial devices.

Figure 9:
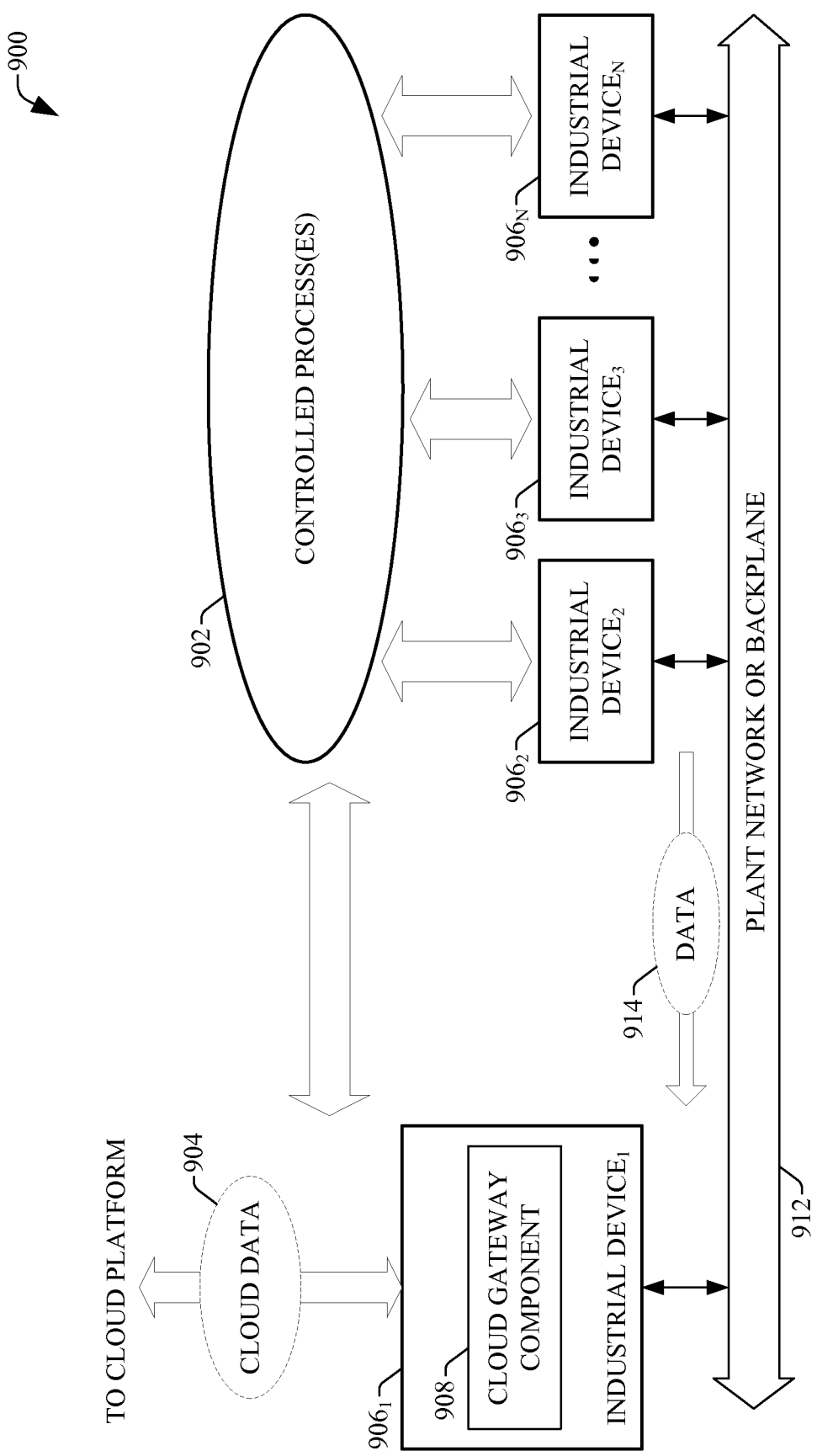
FIG. 9 depicts a block diagram of an example system that can be configured to comprise an industrial device that can act or operate as a cloud proxy for other industrial devices of an industrial automation system to facilitate migrating industrial data to the cloud platform for classification and analysis by a cloud-based industrial controller and an analytics system, in accordance with various aspects and implementations of the disclosed subject matter.
Figure 10:
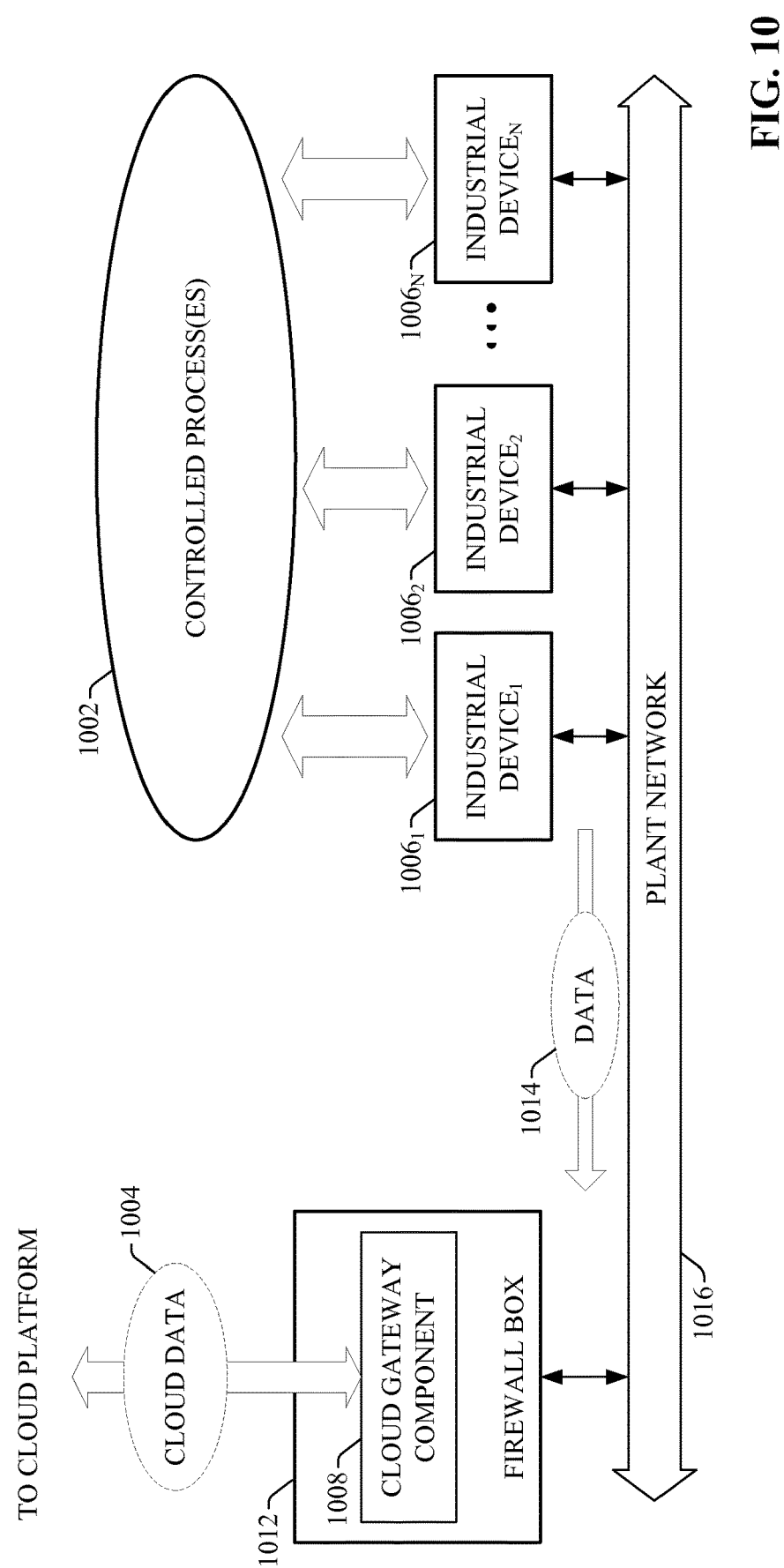
FIG. 10 illustrates a block diagram of an example system that can employ a firewall box that can serve as a cloud proxy for a set of industrial devices to facilitate migrating industrial data to the cloud platform for classification and analysis by a cloud-based industrial controller and an analytics system, in accordance with various aspects and implementations of the disclosed subject matter.

FIGS. 9 and 10 depict block diagrams of example systems 900 and 1000, respectively, illustrating respective techniques that can facilitate migrating industrial data to the cloud platform via proxy devices for classification and analysis by a cloud-based industrial controller and an analytics system (e.g., comprising an analytics component), in accordance with various aspects and implementations of the disclosed subject matter. FIG. 9 depicts system 900 that can be configured to comprise an industrial device that can act or operate as a cloud proxy for other industrial devices of an industrial automation system. The industrial automation system can comprise a plurality of industrial devices, including industrial device$_1$ 906$_1$, industrial device$_2$ 906$_2$, industrial device$_3$ 906$_3$, and/or (up through) industrial device$_N$ 906$_N$, that collectively can monitor and/or control one or more controlled processes 902. The industrial devices 906$_1$, 906$_2$, 906$_3$, and/or (up through) 906$_N$ respectively can generate and/or collect process data relating to control of the controlled process(es) 902. For industrial controllers such as cloud-based industrial controllers, PLCs, or other automation controllers, this can include collecting data from telemetry devices connected to an industrial controller's I/O, generating data internally based on measured process values, etc.

In the configuration depicted in FIG. 9, industrial device$_1$ 906$_1$ can act, operate, or function as a proxy for industrial devices 906$_2$, 906$_3$, and/or (up through) 906$_N$, whereby the data 914 from devices 906$_2$, 906$_3$, and/or (up through) 906$_N$ can be sent (e.g., transmitted) to the cloud via proxy industrial device$_1$ 906$_1$. Industrial devices 906$_2$, 906$_3$, and/or (up through) 906$_N$ can deliver their respective data 914 to the proxy industrial device$_1$ 906$_1$ over the plant network or backplane 912 (e.g., a Common Industrial Protocol (CIP) network or other suitable network protocol). Using such a configuration, as desired, one industrial device can be interfaced to the cloud platform (via cloud gateway component 908). In some embodiments, the cloud gateway component 908 can perform preprocessing on the gathered data prior to migrating the data to the cloud platform (e.g., time stamping, filtering, formatting, normalizing, summarizing, compressing, etc.). The collected and processed data can be pushed (e.g., transmitted) to the cloud platform as cloud data 904 via cloud gateway component 908. Once migrated to the cloud platform, the cloud-based industrial controller and/or cloud-based analytics system can classify the data according to the example classifications described herein and/or can utilize the data to facilitate performing various operations relating to cloud-based or remote control of industrial automation systems by a cloud-based or remote industrial controller, determining whether control instructions for an industrial automation system are to be modified to modify operations of the industrial automation system, generating supplemental control instructions for an industrial automation system, translating control instructions for an industrial automation system, determining respective correlations relating to respective items of interest associated with an industrial automation system(s), generating notifications, recommendations, and/or instructions relating to correlations between respective items of interest associated with the industrial automation system(s) to facilitate improving operations associated with the industrial automation system(s) and/or achieving defined goals associated with the industrial automation system(s), generating or updating models of industrial automation systems, generating or updating virtualized industrial controllers or virtualized industrial automation systems and using virtualized industrial controllers and virtualized industrial automation systems (e.g., to facilitate remotely interacting with and/or controlling operation of associated industrial automation systems).

While the proxy device illustrated in FIG. 9 is depicted as an industrial device that itself can perform monitoring, tracking, and/or controlling of a portion of controlled process(es) 902, other types of devices also can be configured to serve as cloud proxies for multiple industrial devices according to one or more implementations of the disclosed subject matter. For example, FIG. 10 illustrates an example system 1000 that can comprise a firewall box 1012 that can serve as a cloud proxy for a set of industrial devices $1006_1$, $1006_2$, and/or (up through) $1006_N$. The firewall box 1012 can act as a network infrastructure device that can allow the plant network 1016 to access an outside network such as the Internet, while also providing firewall protection that can prevent unauthorized access to the plant network 1016 from the Internet. In addition to these firewall functions, the firewall box 1012 can include a cloud gateway component 1008 that can interface the firewall box 1012 with one or more cloud-based services (e.g., cloud-based or remote industrial-control services, analytics services, model-related services, virtualization-related services, data collection services, data storage services, etc.). In a similar manner to the proxy industrial device $906_1$ of FIG. 9, the firewall box 1012 of FIG. 10 can collect industrial data 1014 from including industrial device$_1$ $1006_1$, industrial device$_2$ $1006_2$, and/or (up through) industrial device$_N$ $1006_N$, which can monitor and control respective portions of controlled process(es) 1002. Firewall box 1012 can include a cloud gateway component 1008 that can apply appropriate pre-processing to the gathered industrial data 1014 prior to pushing (e.g., communicating) the data to the cloud-based industrial controller or analytics system as cloud data 1004. Firewall box 1012 can allow industrial devices $1006_1$, $1006_2$, and/or (up through) $1006_N$ to interact with the cloud platform without directly exposing the industrial devices to the Internet.

In some embodiments, the cloud gateway component 908 of FIG. 9 or cloud gateway component 1008 of FIG. 10 can tag the collected industrial data (e.g., 914 or 1014) with contextual metadata prior to pushing the data as cloud data (e.g., 904 or 1004) to the cloud platform. Such contextual metadata can include, for example, a time stamp, a location of the device at the time the data was generated, or other contextual information. In another example, some cloud-aware devices can comprise smart devices capable of determining their own context within the plant or enterprise environment. Such devices can determine their location within a hierarchical plant context or device topology. Data generated by such devices can adhere to a hierarchical plant model that can define multiple hierarchical levels of an industrial enterprise (e.g., a workcell level, a line level, an area level, a site level, an enterprise level, etc.), such that the data can be identified (e.g., by the cloud-based industrial controller or analytics system) in terms of these hierarchical levels. This can allow a common terminology to be used across an entire industrial enterprise to identify devices and their associated data. Cloud-based applications and services that model an enterprise according to such an organizational hierarchy can represent industrial controllers, devices, machines, or processes as data structures (e.g., type instances) within this organizational hierarchy to provide context for data generated by respective devices within the enterprise relative to the enterprise as a whole. Such a convention can replace the flat name structure that is employed by some industrial applications.

In some embodiments, the cloud gateway component 908 of FIG. 9 or cloud gateway component 1008 of FIG. 10 can comprise uni-directional "data only" gateways that can be configured only to move data from the premises (e.g., industrial facility) to the cloud platform. Alternatively, the cloud gateway components 908 and 1008 can comprise bi-directional "data and configuration" gateways that additionally can be configured to receive configuration or instruction data from services running on the cloud platform. Some cloud gateways can utilize store-and-forward technology that can allow the gathered industrial data (e.g., 914 or 1014) to be temporarily stored locally on storage associated with the cloud gateway component (e.g., 908 or 1008) in the event that communication between a gateway and the cloud platform is disrupted. In such events, the cloud gateway component (e.g., 908 or 1008) can forward (e.g., communicate) the stored data to the cloud platform when the communication link is re-established.

To ensure a rich and descriptive set of data for analysis purposes, the cloud-based industrial controller or analytics system can collect device data in accordance with one or more standardized device models. To this end, a standardized device model can be developed for each industrial device. Device models can profile the device data that is available to be collected and maintained by the cloud-based industrial controller or analytics system.

Figure 11:
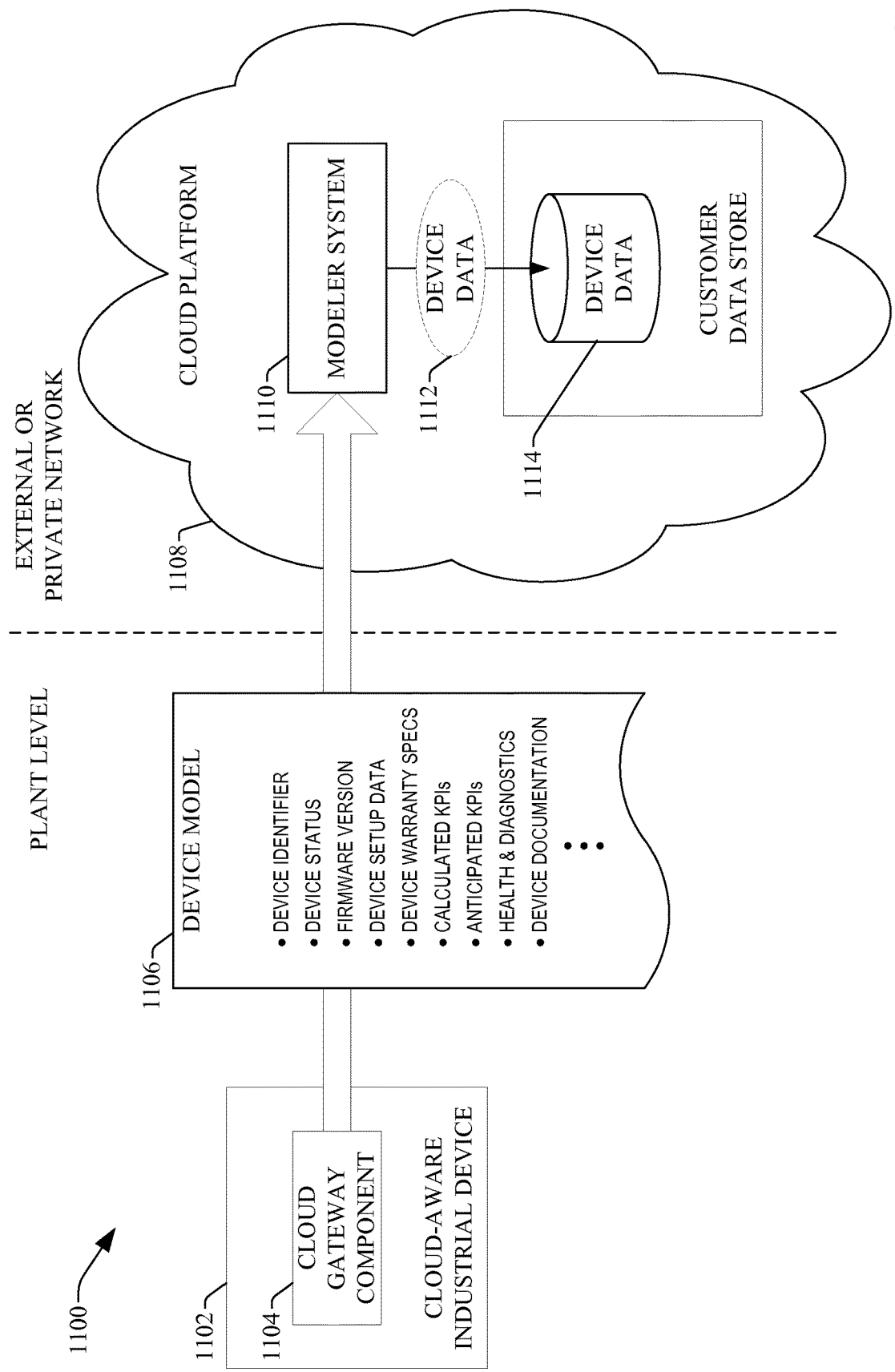
FIG. 11 illustrates a block diagram of an example device model according to various aspects and implementations of the disclosed subject matter.

FIG. 11 illustrates a block diagram of an example device model 1100 according to various aspects and implementations of the disclosed subject matter. In the illustrated example model 1100, the device model 1106 can be associated with a cloud-aware industrial device 1102 (e.g., a programmable logic controller, a variable frequency drive, an HMI, a vision camera, a barcode marking system, etc.). As a cloud-aware device, the industrial device 1102 can be configured to automatically detect and communicate with the cloud platform 1108 upon installation at a plant facility, simplifying integration with existing cloud-based data storage, analysis, and applications (e.g., as performed by the cloud-based industrial controller, analytics systems, modeler systems, and/or virtualization systems described herein). When added to an existing industrial automation system, the industrial device 1102 can communicate with the cloud platform and can send identification and configuration information in the form of the device model 1106 to the cloud platform 1108. The device model 1106 can be received by the modeler system 1110 (or cloud-based industrial controller (not shown in FIG. 11)), which can update the customer's device data 1114 based on the device model 1106. In this way, the modeler system 1110 (or cloud-based industrial controller or analytics system) can leverage the device model 1106 to facilitate integrating the new industrial device 1102 into the greater system as a whole. This integration can include the modeler system 1110 (or cloud-based industrial controller or analytics system) updating cloud-based applications or services to recognize the new industrial device 1102, controlling operations of the industrial automation system(s) via the cloud-based industrial controller, modifying control instructions in response to integrating the new industrial device 1102, translating control instructions in connection with the new industrial device 1102, performing analytics in connection with the new industrial device 1102, determining one or more correlations between the new industrial device 1102 and other aspects (e.g., industrial assets, extrinsic events or conditions) associated with the industrial automation system, adding the new industrial device 1102 to a dynamically updated data model of the customer's industrial enterprise or plant, modifying a model to integrate, incorporate, or include a model of the new industrial device 1102 based at least in part on the identification and configuration information (or other data), or modifying a virtualization industrial automation system associated with the industrial automation system to integrate, incorporate, or include a virtualized version of the new industrial device 1102 based at least in part on the identification and configuration information (or other data), determining or predicting a response of the modified industrial automation system based at least in part on a modified model or modified simulation model that integrates the new industrial device 1102, making other devices on the plant floor aware of the new industrial device 1102, or other desired integration functions. Once deployed, some data items comprising the device model 1106 can be collected and monitored by the modeler system 1110 (or cloud-based industrial controller) on a real-time or near real-time basis.

The device model 1106 can comprise such information as a device identifier (e.g., model and serial number) associated with the industrial device 1102, status information for the industrial device 1102, a currently installed firmware version associated with the industrial device 1102, device setup data associated with the industrial device 1102, warranty specifications associated with the industrial device 1102, calculated and/or anticipated KPIs associated with the industrial device 1102 (e.g., mean time between failures), health and diagnostic information associated with the industrial device 1102, device documentation, or other such parameters.

Figure 12:
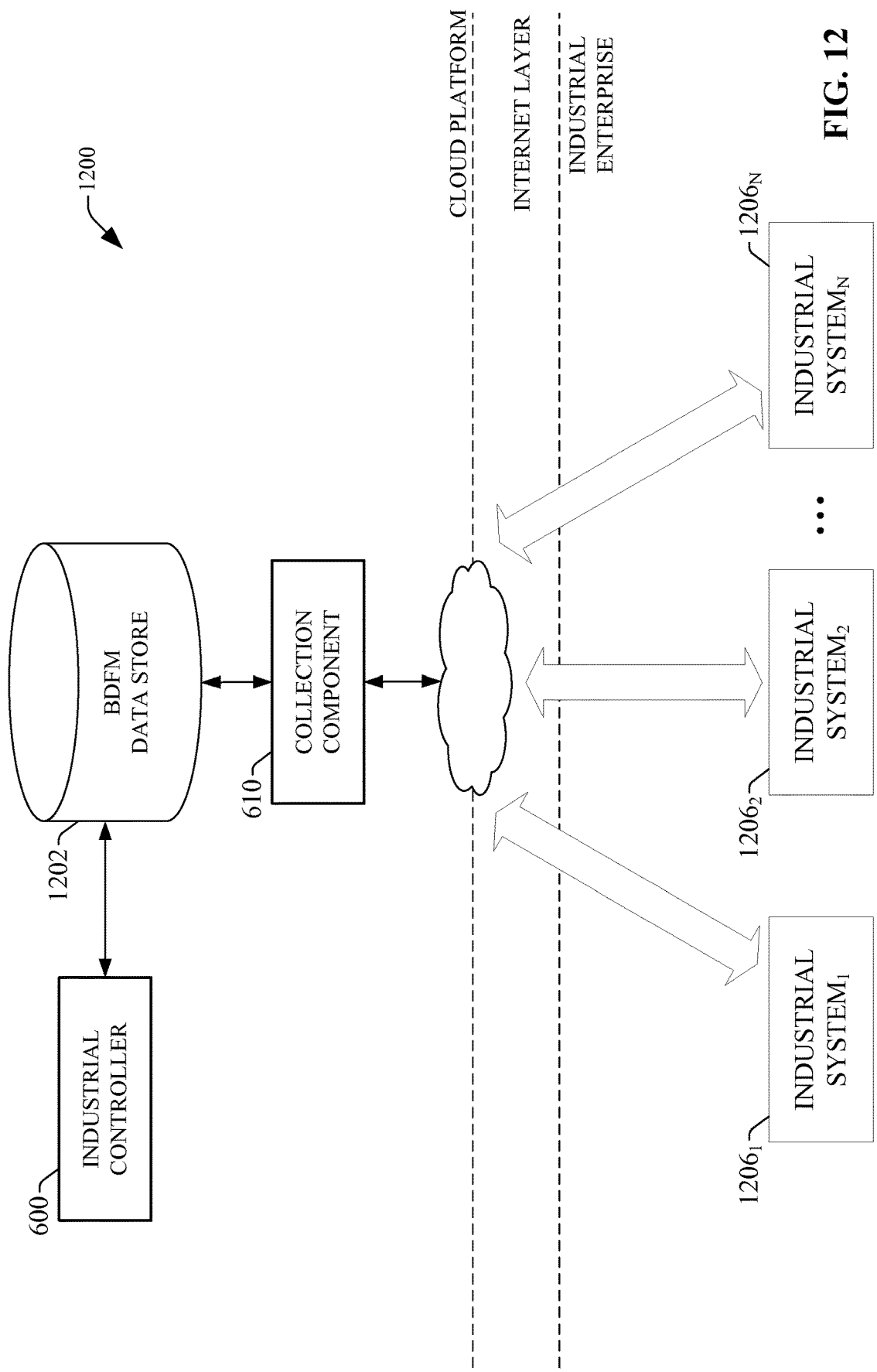
FIG. 12 presents a block diagram of an example system that can facilitate collection of data from devices and assets associated with respective industrial automation systems for storage in cloud-based data storage, in accordance with various aspects and implementations of the disclosed subject matter.

In addition to maintaining individual customer-specific data stores for each industrial enterprise, the modeler system (e.g., cloud-based modeler system), or industrial controller (e.g., cloud-based industrial controller), also can feed (e.g., transmit) sets of customer data to a global data storage (referred to herein as cloud-based data store or Big Data for Manufacturing (BDFM) data store) for collective big data analysis in the cloud platform (e.g., by the cloud-based industrial controller, analytics system, or modeler system). FIG. 12 presents a block diagram of an example system 1200 that can facilitate collection of data from devices and assets associated with respective industrial automation systems for storage in cloud-based data storage, in accordance with various aspects and implementations of the disclosed subject matter. As illustrated in FIG. 12, the collection component 610 of the cloud-based industrial controller 600 (e.g., as facilitated by the interface component 612) can collect data from devices and assets comprising respective different industrial automation systems, such as industrial automation system$_1$ 1206$_1$, industrial automation system$_2$ 1206$_2$, and/or (up through) industrial automation system$_N$ 1206$_N$, for storage in a cloud-based BDFM data store 1202. In some embodiments, data maintained in the BDFM data store 1202 can be collected anonymously with the consent of the respective customers. For example, customers can enter into a service agreement with a technical support entity whereby the customer can agree to have their device and asset data collected by the cloud-based industrial controller, analytics system, modeler system, and/or virtualization system in exchange for industrial-control-related services (e.g., cloud-based or remote industrial-control-related services), analytics-related services, modeling-related services, and/or virtualization-related services or a credit towards industrial-control-related services, analytics-related services, modeling-related services, and/or virtualization-related services. The data maintained in the BDFM data store 1202 can include all or portions of the classified customer-specific data described in connection with FIG. 7, as well as additional data (e.g., derived, determined, or inferred data). The cloud-based industrial controller 600 or the analytics system (not shown in FIG. 12) can organize the collected data stored in the BDFM data store 1202 according to device type, system type, application type, applicable industry, or other relevant categories. The cloud-based industrial controller 600 (or the analytics system) can analyze data stored in the resulting multi-industry, multi-customer data store (e.g., BDFM data store 1202) to facilitate learning, determining, or identifying industry-specific, device-specific, and/or application-specific trends, patterns, thresholds (e.g., device-related thresholds, network-related thresholds, etc.), industrial-automation-system interrelationships between devices or assets, etc., associated with the industrial automation systems associated with the cloud platform. In general, the cloud-based industrial controller 600 (or analytics system) can perform a data analysis (e.g., big data analysis) on data (e.g., the multi-industrial enterprise data) maintained in (e.g., stored in) the BDFM data store 1202 to facilitate learning, determining, identifying, characterizing, virtualizing, simulating, and/or emulating operational industrial-automation-system interrelationships, correlations, thresholds, trends, or patterns associated with industrial automation systems as a function of industry type, application type, equipment in use, asset configurations, device configuration settings, or other types of variables.

For example, it can be known that a given industrial asset (e.g., a device, a configuration of device, a machine, etc.) can be used across different industries for different types of industrial applications. Accordingly, the cloud-based industrial controller 600 (or analytics system) can identify a subset of the global data stored in BDFM data store 1202 relating to the asset or asset type, and perform analysis on this subset of data to determine how the asset or asset type performs over time and under various types of operating conditions for each of multiple different industries or types of industrial applications. The cloud-based industrial controller 600 (or analytics system) also can determine the operational behavior of the asset or asset type over time and under various types of operating conditions for each of different sets of operating constraints or parameters (e.g. different ranges of operating temperatures or pressures, different recipe ingredients or ingredient types, etc.). The cloud-based industrial controller 600 (or analytics system) can leverage (e.g., use) a large amount of historical data relating to the asset or asset type that has been gathered (e.g., collected and/or aggregated) from many different industrial automation systems to facilitate learning or determining common operating characteristics of many diverse configurations of industrial assets or asset types at a relatively high degree of granularity and under many different operating contexts. The cloud-based industrial controller 600 (or analytics system) can use the learned or determined operating characteristics relating to the industrial assets or asset types to facilitate determining control instructions to be used to control the industrial automation system(s) (e.g., 1206$_1$, 1206$_2$, 1206$_N$), controlling the industrial automation system(s) (e.g., 1206$_1$, 1206$_2$, 1206$_N$) (e.g., via the cloud-based industrial controller 600 and/or an industrial-plant-based industrial controller), translating control instructions for use with an industrial automation system(s) (e.g., 1206$_1$, 1206$_2$, 1206$_N$), determining correlations between respective items of interest associated with an industrial automation system(s), determining changes to operations or industrial assets associated with the industrial automation system(s) that can facilitate improving operations associated with the industrial automation system(s) and/or achieving desired goals with respect to the industrial automation system(s), and/or determining and providing notifications, recommendations, or instructions relating to the correlations between the respective items of interest or the determined changes to operations or industrial assets associated with the industrial automation system. The modeler component and/or virtualization component can use the learned or determined operating characteristics relating to the industrial assets or asset types to facilitate generating, updating, and/or using modeled versions or virtualized versions of the industrial assets or asset types when employed in an industrial automation system to facilitate generating, updating, and/or using a model of an industrial automation component or a virtualized industrial automation system that can be based at least in part on the modeled or virtualized versions of the industrial assets or asset types.

Figure 13:
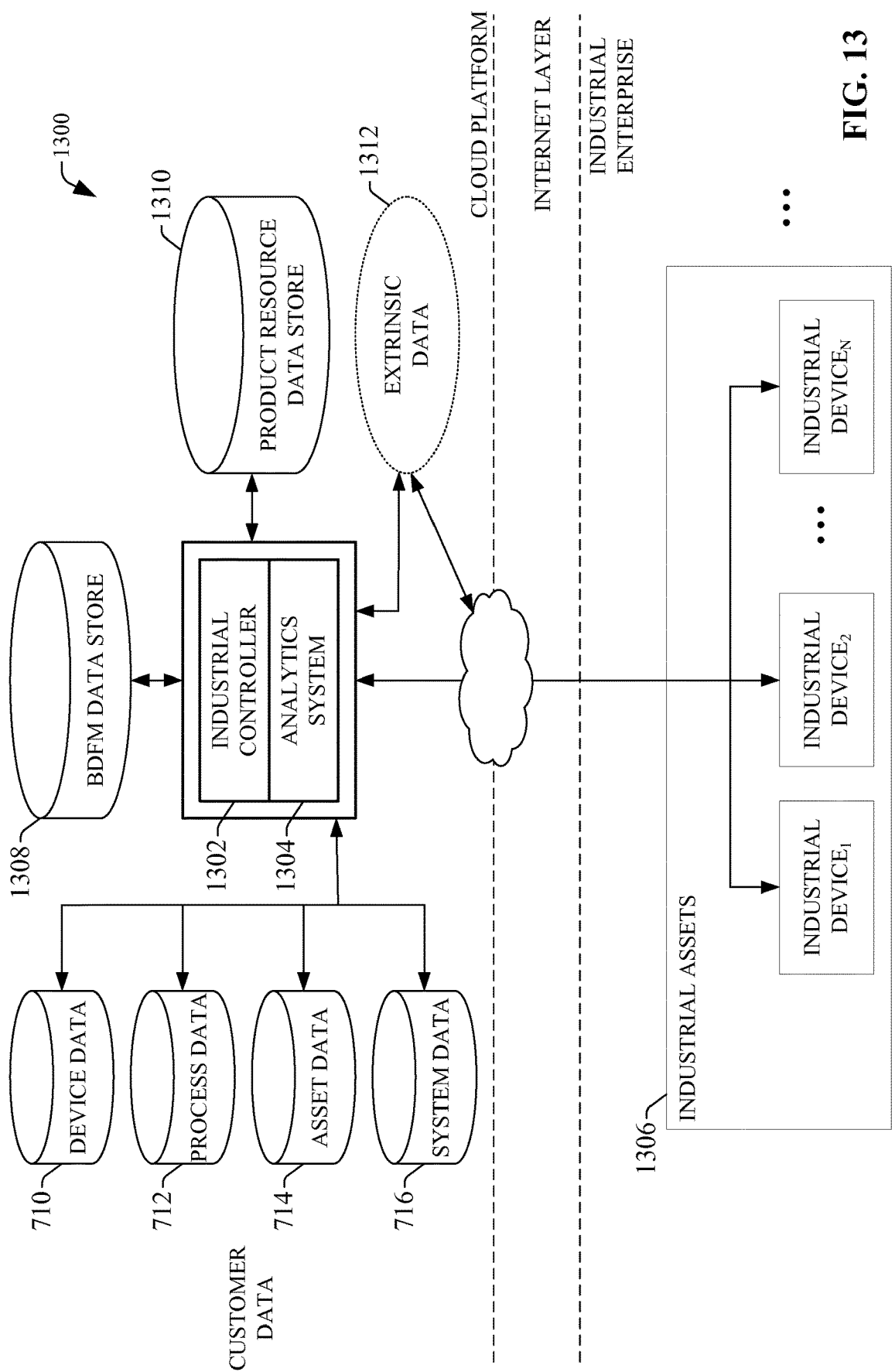
FIG. 13 illustrates a block diagram of a cloud-based system that can employ a cloud-based industrial controller and an analytics system to facilitate performing or providing cloud-based industrial-controller-related services, analytics-related services and other services associated with industrial automation systems, in accordance with various aspects and embodiments of the disclosed subject matter.

FIG. 13 illustrates a block diagram of a cloud-based system 1300 that can employ a cloud-based industrial controller and an analytics system to facilitate performing or providing cloud-based industrial-controller-related services, analytics-related services and other services (e.g., modeler-related services, virtualization-related services) associated with industrial automation systems, in accordance with various aspects and embodiments of the disclosed subject matter. As disclosed herein, the cloud-based industrial controller 1302 and/or analytics system 1304 can collect, maintain, and monitor customer-specific data (e.g. device data 710, process data 712, asset data 714, and system data 716) relating to one or more industrial assets 1306 of an industrial enterprise. In addition, the cloud-based industrial controller 1302 and/or analytics system 1304 can collect and organize industrial data anonymously (with customer consent) from multiple industrial enterprises, and can store such industrial data in a BDFM data store 1308 for collective analysis by the cloud-based industrial controller 1302 and/or analytics system 1304, for example, as described herein.

The cloud-based industrial controller 1302 and/or analytics system 1304 also can collect product resource information and maintain (e.g., store) the product resource information in the cloud-based product resource data store 1310. In general, the product resource data store 1310 can maintain up-to-date information relating to specific industrial devices or other vendor products in connection with industrial automation systems. Product data stored in the product resource data store 1310 can be administered by the cloud-based industrial controller 1302 and/or the analytics system 1304 and/or one or more product vendors or OEMs. Exemplary device-specific data maintained by the product resource data store 1310 can include product serial numbers, most recent firmware revisions, preferred device configuration settings and/or software for a given type of industrial application, or other such vendor-provided information.

The system depicted in FIG. 13 can provide cloud-based industrial-controller-related services, analytics-related services and other cloud-based services (e.g., model-related services, virtualization-related services) to subscribing customers (e.g., owners of industrial assets 1306). For example, customers can enter an agreement with a product vendor or technical support entity to allow their system data to be gathered anonymously and fed into (e.g., communicated to and stored in) the BDFM data store 1308, and this thereby can expand the store of global data available for collective analysis by the cloud-based industrial controller 1302 and/or analytics system 1304. In exchange, the vendor or technical support entity can agree to provide cloud-based industrial-controller-related services, analytics-related services, and/or other cloud-based services (e.g., model-related services (e.g., customized model-related services)) to the customer (e.g., real-time or near real-time system monitoring; real-time or near real-time cloud-based control of an industrial automation system via the cloud-based industrial controller 1302; real-time or near real-time performance of analytics on data and determination of correlations relating to an industrial automation system; real-time or near real-time generation, updating, and/or use of a model or a virtualized industrial automation system associated with an industrial automation system, etc.). Alternatively, the customer can subscribe to one or more available cloud-based industrial-controller-related services, analytics-related services, or other services (e.g., model-related services, virtualization-related services) that can be provided by the cloud-based industrial controller 1302 and/or analytics system 1304, and optionally can allow their system data to be maintained in the BDFM data store 1308. In some embodiments, a customer can be given an option to subscribe to cloud-based industrial-controller-related services, analytics-related services, or other services without permitting their data to be stored in the BDFM data store 1308 for collective analysis with data from other systems (e.g., industrial automation systems). In such cases, the customer's data will only be maintained as customer data (e.g., in customer data store 708) for the purposes of real-time or near-real time cloud-based control of an industrial automation system via the cloud-based industrial controller 1302, performance of analytics on data, determination of recommendations or instructions to facilitate improving operations associated with the industrial automation system, relating to that particular customer, and/or real-time or near real-time generation, updating, and/or use of a model or a virtualized industrial automation system associated with an industrial automation system relating to that particular customer, and the collected customer data will be analyzed in connection with data stored in the BDFM data store 1308 and the product resource data store 1310 without that customer data being migrated for storage in the BDFM data store 1308 for long-term storage and analysis. In another exemplary agreement, customers can be offered a discount on cloud-based industrial-controller-related services, analytics-related services or other services (e.g., model-related or virtualization-related services) in exchange for allowing their system data to be anonymously migrated to the BDFM data store 1308 for collective analysis by the cloud-based industrial controller 1302 and/or analytics system 1304.

In accordance with various aspects, the customer-specific data can include device and/or asset level faults and alarms, process variable values (e.g., temperatures, pressures, product counts, cycle times, etc.), calculated or anticipated key performance indicators for the customer's various assets, indicators of system behavior over time, and other such information. The customer-specific data also can include documentation of firmware versions, configuration settings, and software in use on respective devices of the customer's industrial assets. Moreover, the cloud-based industrial controller 1302 or analytics system 1304 can take into consideration customer information encoded in customer model 718, which can have a bearing on inferences made by the cloud-based industrial controller 1302 or analytics system 1304 based at least in part on the analysis (e.g., big data analysis) stored in the BDFM data store 1308. For example, customer model 718 may indicate a type of industry that is the focus of the customer's business (e.g., automotive, food and drug, oil and gas, fibers and textiles, power generation, marine, etc.). Knowledge of the customer's industry can facilitate enabling the cloud-based industrial controller 1302 or analytics system 1304 to correlate the customer-specific data with data relating to similar systems and applications in the same industry, as documented by the data stored in the BDFM data store 1308.

Taken together, customer-specific data and a customer model (e.g., 718) can facilitate accurately modeling the customer's industrial enterprise at a highly granular level, from high-level system behavior over time down to the device and software level. The analyzing (e.g., by the cloud-based industrial controller 1302, analytics system 1304, or modeler system) of this customer-specific data in view of global industry-specific and application-specific trends learned via analysis of data stored in the BDFM data store 1308, as well as vendor-provided device information maintained in the product resource data store 1310, can facilitate real-time or near-real time cloud-based control of an industrial automation system via the cloud-based industrial controller 1302, performance of analytics on data by the analytics system 1304, visualization of information relating to an industrial automation system (e.g., customized visualization of information based on correlations between respective items of interest associated with the industrial automation system), and/or determination of recommendations or instructions to facilitate improving operations associated with the industrial automation system, and can facilitate real-time or near real-time generation, updating, and/or use of a model or a virtualized industrial automation system associated with an industrial automation system to facilitate real-time or near real-time remote interaction with (e.g., monitoring, tracking, controlling, etc., of) the industrial automation system using the model or the virtualized industrial automation system (e.g., based at least in part on user interactions with the virtualized industrial automation system by a user via a communication device).

In some implementations, the system 1300 (e.g., via the collection component, industrial controller 1302, analytics system 1304) also can receive, collect, or capture extrinsic data 1312 from one or more sources (e.g., external data sources). The cloud-based industrial controller 1302, analytics system 1304, or other cloud-based component or system (e.g., modeler system) can use or leverage the extrinsic data 1312 received, collected, or captured from sources external to a customer's industrial enterprise, wherein the extrinsic data 1312 can have relevance to operation of the customer's industrial automation system(s). Example extrinsic data 1312 can include, for example, energy cost data, material cost and availability data, transportation schedule information from companies that provide product transportation services for the customer, market indicator data, web site traffic statistics, information relating to known information security breaches or threats, or other information relevant to the operation of the customer's industrial automation system(s). The cloud-based industrial controller 1302, analytics system 1304, or other cloud-based component or system (e.g., modeler system) can retrieve extrinsic data 1312 from substantially any data source, such as, e.g., servers or other data storage devices linked to the Internet, cloud-based storage that maintains extrinsic data of interest, or other sources. The cloud-based industrial controller 1302, analytics system 1304, or other cloud-based component or system (e.g., modeler system) can analyze the extrinsic data 1312 and/or other data (e.g., user-related data associated with users (e.g., operators, managers, technicians, other workers) associated with the industrial automation system(s), device data 710, process data 712, asset data 714, system data 716, etc.) to facilitate performing industrial-control-related services, analytics-related services, visualization-related services, modeling-related services, virtualization-related services, or other services in connection with the industrial automation system(s).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 14-17 illustrate various methods in accordance with one or more embodiments of the subject application. While, for purposes of simplicity of explanation, the one or more methods shown herein are shown and described as a series of acts or operations, it is to be understood and appreciated that the disclosed subject matter is not limited by the order of acts or operations, as some acts or operations may, in accordance therewith, occur in a different order and/or concurrently with other acts or operations from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Furthermore, interaction diagram(s) may represent methods, in accordance with the subject disclosure when disparate entities enact disparate portions of the methods. Further yet, two or more of the disclosed example methods can be implemented in combination with each other, to accomplish one or more features or advantages described herein.

Figure 14:
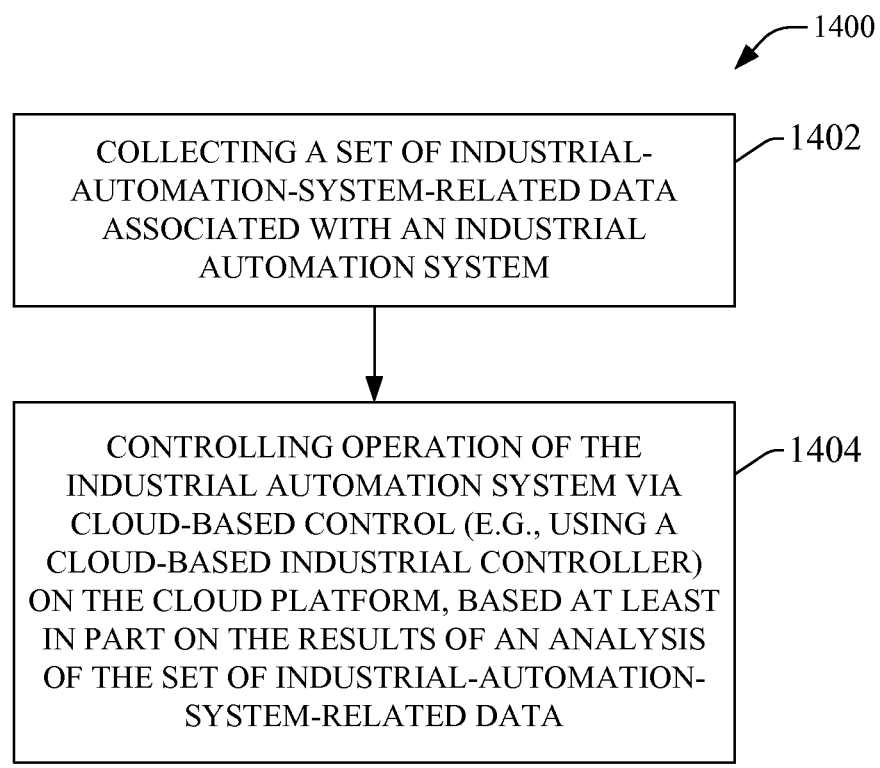
FIG. 14 illustrates a flow diagram of an example method that can perform cloud-based control of an industrial automation system associated with an industrial enterprise, in accordance with various implementations and embodiments of the disclosed subject matter.

FIG. 14 illustrates a flow diagram of an example method 1400 that can perform cloud-based control of an industrial automation system associated with an industrial enterprise, in accordance with various implementations and embodiments of the disclosed subject matter. The method 1400 can be implemented by a cloud-based industrial controller that can comprise or be associated with a collection component, a data store, and/or an analytics component. All or a desired portion of the cloud-based industrial controller can reside on a cloud platform.

At 1402, a set of industrial-automation-system-related data associated with an industrial automation system can be collected. The collection component can obtain, collect, or otherwise receive industrial-automation-system-related data and can store such data in a cloud-based data store. The collection component also can receive other data, including other industrial-automation-system-related data from another (e.g., a related) industrial automation system or one or more extrinsic data sources.

The set of industrial-automation-system-related data can comprise, for example, device-related data (e.g., industrial device-related data, network device-related data), asset-related data, process-related data (e.g., industrial-automation-process-related data), data relating to users associated with the industrial automation system (e.g., role information, user preferences, etc.), and/or other industrial-automation-system-related data associated with an industrial enterprise. The industrial-automation-system-related data can be migrated (e.g., communicated) to the cloud platform using one or more cloud gateways (e.g., cloud gateway components) that can serve as bi-directional communication interfaces between industrial devices or assets of the industrial automation system and the cloud platform, including the cloud-based industrial controller. The device-related data, asset-related data, process-related data, and/or other industrial-automation-system-related data can be stored in the cloud-based data store in association with identification information, such as, for example, a customer identifier and other customer-specific information.

For example, the collection component can receive industrial-automation-system-related data such as operational data from the industrial devices or other industrial assets of the industrial automation system via the respective I/O devices of the industrial devices or other industrial assets and via one or more cloud gateway components associated with (e.g., integrated with, connected to) the industrial devices or other industrial assets. The operational data can, for example, indicate a current state of the industrial devices or assets and/or their associated industrial processes (e.g., temperature, position, part presence or absence, fluid level, etc.). The industrial controller can execute a user-defined control program that can perform automated decision-making for the controlled industrial processes based at least in part on the received signals comprising the operational data. The industrial controller (e.g., cloud-based industrial controller) can output appropriate digital and/or analog control signaling to the industrial devices or assets in accordance with the decisions made by the industrial controller executing the control program. These outputs can comprise, for example, device actuation signals, temperature or position control signals, operational commands to a machining or material handling robot, mixer control signals, motion control signals, and the like.

At 1404, operation of the industrial automation system can be controlled via cloud-based control (e.g., using a cloud-based industrial controller) on the cloud platform, based at least in part on the results of an analysis of the set of industrial-automation-system-related data. The cloud-based industrial controller can access the cloud-based data store and can receive (e.g., collect, obtain, etc.) the set of industrial-automation-system-related data from the cloud-based data store. The cloud-based industrial controller can analyze the set of industrial-automation-system-related data to generate analysis results. The cloud-based industrial controller can determine respective control instructions for respective industrial devices or assets of the industrial automation system based at least in part on the analysis results, in accordance with a defined control algorithm. The cloud-based industrial controller can communicate the respective control instructions to the respective industrial devices or other assets via one or more cloud gateway components. The respective industrial devices or other assets of the industrial automation system can perform operations in accordance with the respective control instructions.

Figure 15:
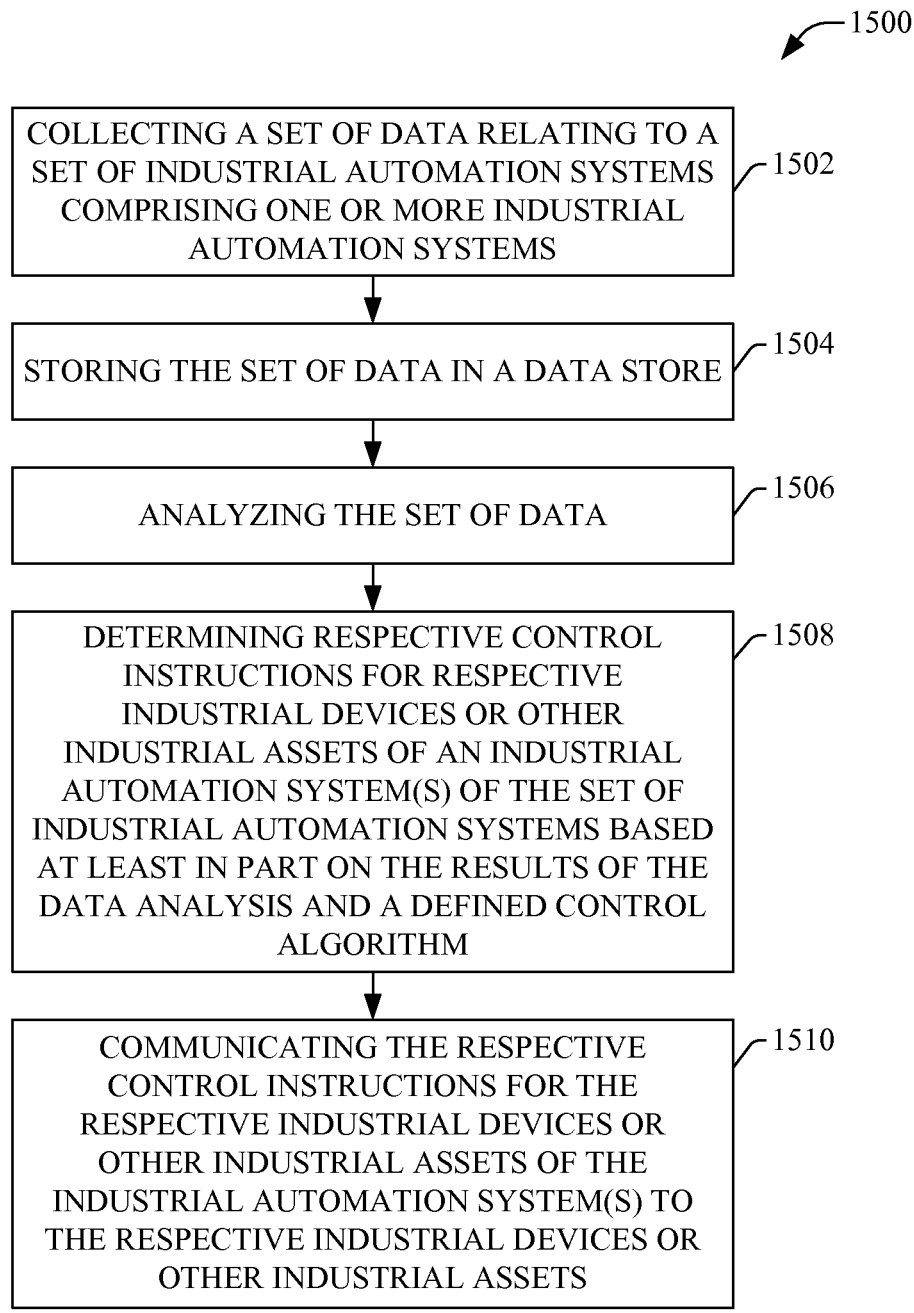
FIG. 15 depicts a flow diagram of another example method that can perform cloud-based control of an industrial automation system associated with an industrial enterprise, in accordance with various implementations and embodiments of the disclosed subject matter.

FIG. 15 depicts a flow diagram of another example method 1500 that can perform cloud-based control of an industrial automation system associated with an industrial enterprise, in accordance with various implementations and embodiments of the disclosed subject matter. The method 1500 can be implemented by a cloud-based industrial controller that can comprise or be associated with a collection component, a data store, and/or an analytics component. All or a desired portion of the cloud-based industrial controller or associated components can reside on a cloud platform.

At 1502, a set of data (e.g., industrial-automation-system-related data) relating to a set of industrial automation systems comprising one or more industrial automation systems can be collected. The cloud-based industrial controller can monitor and track operations of one or more industrial automation systems of the set of industrial automation systems, employee interactions with the industrial automation systems, and/or extrinsic factors (e.g., weather conditions, supplying of materials for products, product demand, transportation costs associated with products, energy costs) with respect to the set of industrial automation systems, etc. Based at least in part on the monitoring and tracking, data (e.g., industrial-automation-system-related data) can be obtained by, migrated to, or otherwise received by the cloud platform from the set of industrial automation systems and/or extrinsic data sources. The collection component can collect the set of data relating to the set of industrial automation systems. The set of data can comprise data relating to industrial devices, industrial processes, other industrial assets, and/or network-related devices, etc., associated with the one or more industrial automation systems of the set of industrial automation systems, and/or data from one or more extrinsic data sources. The set of industrial automation systems can be associated with one or more industrial enterprises.

Respective subsets of the data can be obtained from respective industrial devices, industrial processes, other industrial assets, and/or network-related devices via one or more cloud gateway devices (e.g., respective cloud gateways integrated with the respective devices, processes, assets, etc.). For instance, the cloud-based industrial controller or analytics component can discover the respective industrial devices, industrial processes, other industrial assets, and/or network-related devices in the industrial automation system, and the respective industrial devices, industrial processes, other industrial assets, and/or network-related devices can provide their respective subsets of data to the cloud-based industrial controller or analytics component via the one or more cloud gateway devices, in response to being polled (e.g., queried) by the cloud-based industrial controller or analytics component.

At 1504, the set of data can be stored in a data store. The collection component can facilitate storing the set of data in the data store, wherein the data store can be a cloud-based data store located in the cloud platform.

At 1506, the set of data can be analyzed. The cloud-based industrial controller (or analytics component) can access the cloud-based data store and can retrieve, obtain, read the set of data from the cloud-based data store. The cloud-based industrial controller (or analytics component) can analyze the set of data (e.g., perform big data analysis on the set of data) to facilitate determining respective control instructions that can be implemented or executed by respective industrial devices or other industrial assets of an industrial automation system(s) of the set of industrial automation systems.

At 1508, respective control instructions for respective industrial devices or other industrial assets of an industrial automation system(s) of the set of industrial automation systems can be determined based at least in part on the results of the data analysis and a defined control algorithm. The cloud-based industrial controller (or analytics component) can determine the respective control instructions for the respective industrial devices or other industrial assets of the industrial automation system(s) of the set of industrial automation systems based at least in part on the data analysis results and the defined control algorithm. For example, based at least in part on the data analysis results, the cloud-based industrial controller (or analytics component) can determine the respective control instructions for the respective industrial devices or other industrial assets of the industrial automation system(s).

In some instances, the cloud-based industrial controller (or analytics component) can determine that the control of operations of an industrial automation system is to be modified in response to outside events (e.g., as identified by analyzing data obtained from an extrinsic data source(s)) and/or events that have occurred at the industrial automation system (e.g., as identified by analyzing data obtained from the industrial automation system), based at least in part on the data analysis results, to facilitate enhancing (e.g., optimizing, improving) operation of the industrial automation system and/or its production output (e.g., to achieve one or more defined operational goals for the industrial automation system), in accordance with the defined control criteria. Based on this, the cloud-based industrial controller (or analytics component) can modify or tailor the control instructions to modify control of operations of the industrial automation system.

At 1510, the respective control instructions for the respective industrial devices or other industrial assets of the industrial automation system(s) can be communicated to the respective industrial devices or other industrial assets. The cloud-based industrial controller can communicate (e.g., transmit) the respective control instructions for the respective industrial devices or other industrial assets to the respective industrial devices or other industrial assets via one or more associated cloud gateway components to facilitate controlling the respective industrial devices or other industrial assets of the industrial automation system(s). The respective industrial devices or other industrial assets can receive the respective control instructions. The respective industrial devices or other industrial assets can implement or execute the respective control instructions to perform operations of the industrial automation system(s), in accordance with the defined control algorithm.

Figure 16:
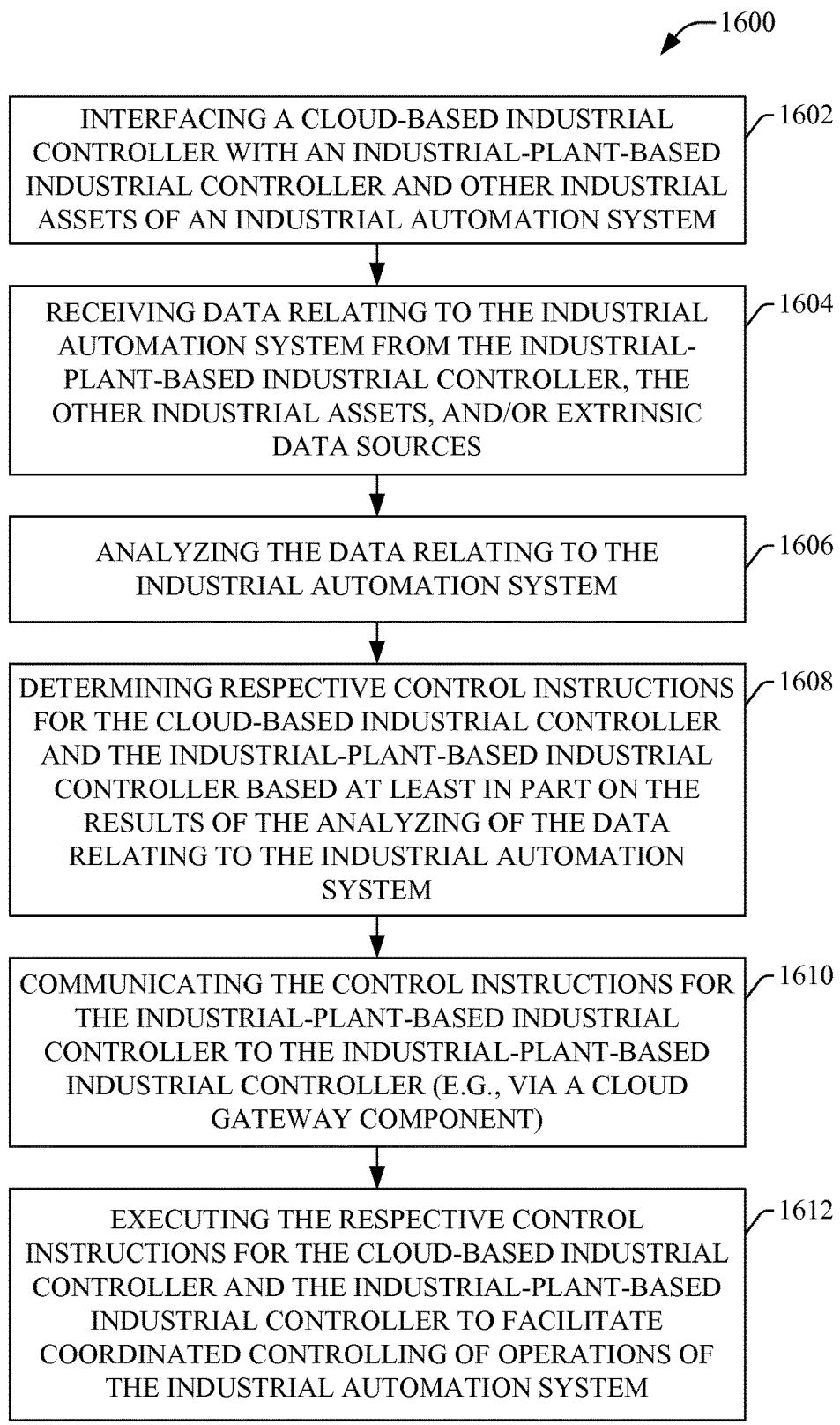
FIG. 16 presents a flow diagram of an example method that can coordinate cloud-based control and plant-based control of operations of an industrial automation system, in accordance with various implementations and embodiments of the disclosed subject matter.

FIG. 16 presents a flow diagram of an example method 1600 that can coordinate cloud-based control and plant-based control of operations of an industrial automation system, in accordance with various implementations and embodiments of the disclosed subject matter. The method 1600 can be implemented by a cloud-based industrial controller that can comprise or be associated with a collection component, a data store, and/or an analytics component. All or a desired portion of the cloud-based industrial controller or associated components can reside on a cloud platform.

At 1602, a cloud-based industrial controller can interface with an industrial-plant-based industrial controller and other industrial assets of an industrial automation system. The cloud-based industrial controller can interface with the industrial-plant-based industrial controller and other industrial assets via one or more cloud gateway components associated with (e.g., integrated with, connected to) the industrial-plant-based industrial controller and other industrial assets. This can facilitate the exchanging of data between the cloud-based industrial controller and the industrial-plant-based industrial controller and between the cloud-based industrial controller and the other industrial assets of the industrial automation system.

At 1604, data relating to the industrial automation system can be received from the industrial-plant-based industrial controller, the other industrial assets, and/or extrinsic data sources. In connection with operation of the industrial automation system, the cloud-based industrial controller and/or the associated collection component can receive the data relating to the industrial automation system can be received from the industrial-plant-based industrial controller, the other industrial assets (e.g., industrial devices (e.g., motors, sensors, mixers, drills), industrial processes), and/or extrinsic data sources.

At 1606, the data relating to the industrial automation system can be analyzed. The cloud-based industrial controller (or associated analytics component) can analyze the data (e.g., perform big data analysis on the data) to facilitate determining respective control instructions that can be implemented or executed by the cloud-based industrial controller, the industrial-plant-based industrial controller, and/or respective other industrial assets of the industrial automation system, and/or to facilitate determining whether to modify control instructions to be used to control operation of the industrial automation system, based at least in part on the analysis results, in accordance with a defined control algorithm and defined control criteria.

At 1608, respective control instructions for the cloud-based industrial controller and the industrial-plant-based industrial controller can be determined based at least in part on the results of the analyzing of the data relating to the industrial automation system. The cloud-based industrial controller (or the analytics component) can determine the respective control instructions to be implemented or executed by the cloud-based industrial controller and the industrial-plant-based industrial controller based at least in part on the data analysis results, in accordance with the defined control algorithm and the defined control criteria. The respective control instructions can be control instructions that proceed along the same operational path that the cloud-based industrial controller and the industrial-plant-based industrial controller had been following in controlling the operation of the industrial automation system, or the respective control instruction to be implemented or executed by the cloud-based industrial controller and/or the industrial-plant-based industrial controller can be modified or supplemental control instructions, wherein such control instructions were modified based at least in part on the data analysis results, for example, based at least in part on results of the analysis of the data obtained from an extrinsic data source. The cloud-based industrial controller (or the analytics component) can determine the respective control instructions such that the cloud-based industrial controller and the industrial-plant-based industrial controller can coordinate their respective operations (e.g., via their respective execution of the respective control instructions) and can cooperate with each other to facilitate implementing or executing the respective control instructions to control operations of the industrial automation system.

At 1610, the control instructions for the industrial-plant-based industrial controller can be communicated to the industrial-plant-based industrial controller. The cloud-based industrial controller can communicate the control instruction for the industrial-plant-based industrial controller to the industrial-plant-based industrial controller via a cloud gateway component associated with the industrial-plant-based industrial controller.

At 1612, the respective control instructions for the cloud-based industrial controller and the industrial-plant-based industrial controller can be executed to facilitate coordinated controlling of operations of the industrial automation system. The cloud-based industrial controller can execute (e.g., remotely execute) its control instructions and the industrial-plant-based industrial controller can execute its control instructions in a coordinated (e.g., synchronized) and cooperative manner to desirably control (e.g., via shared control) operations of the respective industrial assets of the industrial automation system.

Figure 17:
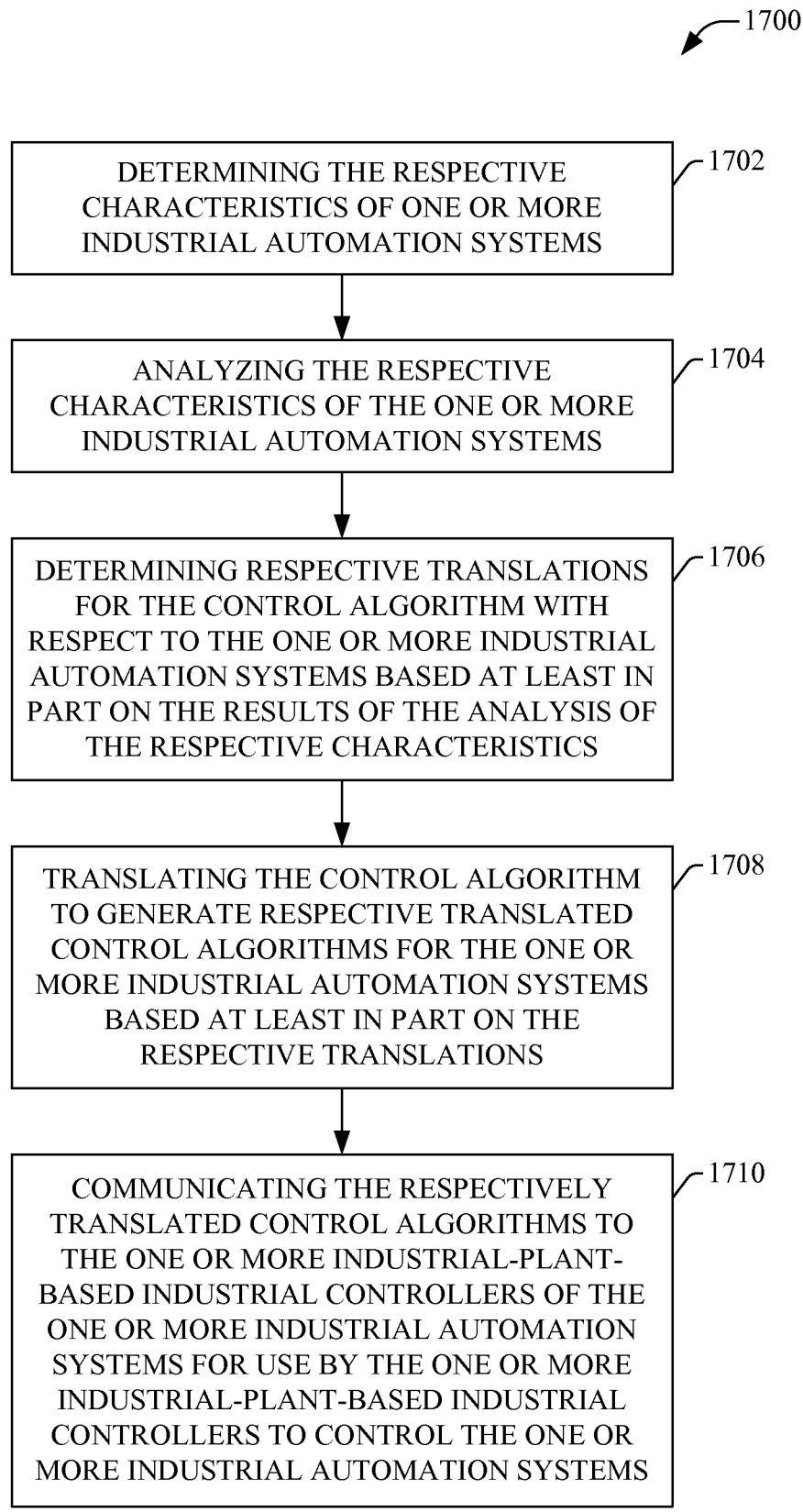
FIG. 17 illustrates a flow diagram of an example method that can translate a control algorithm for use by an industrial automation system(s), in accordance with various implementations and embodiments of the disclosed subject matter.

FIG. 17 presents a flow diagram of an example method 1700 that can translate a control algorithm for use by an industrial automation system(s), in accordance with various implementations and embodiments of the disclosed subject matter. The method 1700 can be implemented by a cloud-based industrial controller that can comprise or be associated with a collection component, a data store, and/or an analytics component. All or a desired portion of the cloud-based industrial controller or associated components can reside on a cloud platform.

At 1702, the respective characteristics of one or more industrial automation systems can be determined. The cloud-based industrial controller (or associated analytics component) can determine the respective characteristics of one or more industrial automation systems. The characteristics can be or can relate to, for example, the controller platform of an industrial-plant-based industrial controller, a control language or syntax employed by the industrial-plant-based industrial controller, or a manufacturer and/or model of the industrial-plant-based industrial controller.

At 1704, the respective characteristics of the one or more industrial automation systems can be analyzed. The cloud-based industrial controller (or analytics component) can analyze the respective characteristics of the one or more industrial automation systems to facilitate translating the control algorithm for use by the one or more industrial automation systems.

At 1706, respective translations (e.g., translation functions) for the control algorithm with respect to the one or more industrial automation systems can be determined based at least in part on the results of the analysis of the respective characteristics. The cloud-based industrial controller (or analytics component) can determine the respective translations to be employed to translate the control algorithm with respect to the one or more industrial automation systems based at least in part on the analysis results.

At 1708, the control algorithm can be translated to generate respective translated control algorithms for the one or more industrial automation systems based at least in part on the respective translations. The control algorithm can be stored in an agnostic and/or standardized format, or another desired format (e.g., a commonly used format), in the cloud-based data store. The cloud-based industrial controller (or analytics component) can retrieve the control algorithm from the data store. The cloud-based industrial controller (or analytics component) can use the respective translations to respectively translate the control algorithm to generate the respective translated control algorithms for use by the one or more industrial automation systems.

At 1710, the respectively translated control algorithm(s) can be communicated to the one or more industrial-plant-based industrial controllers of the one or more industrial automation systems for use by the one or more industrial-plant-based industrial controllers to control the one or more industrial automation systems. The cloud-based industrial controller (or analytics component) can communicate (e.g., transmit, download) the one or more respectively translated control algorithms can be communicated to the one or more industrial-plant-based industrial controllers of the one or more industrial automation systems for use (e.g., implementation, execution) by the one or more industrial-plant-based industrial controllers to control the one or more industrial automation systems.

Embodiments, systems, and components described herein, as well as industrial automation or control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 18:
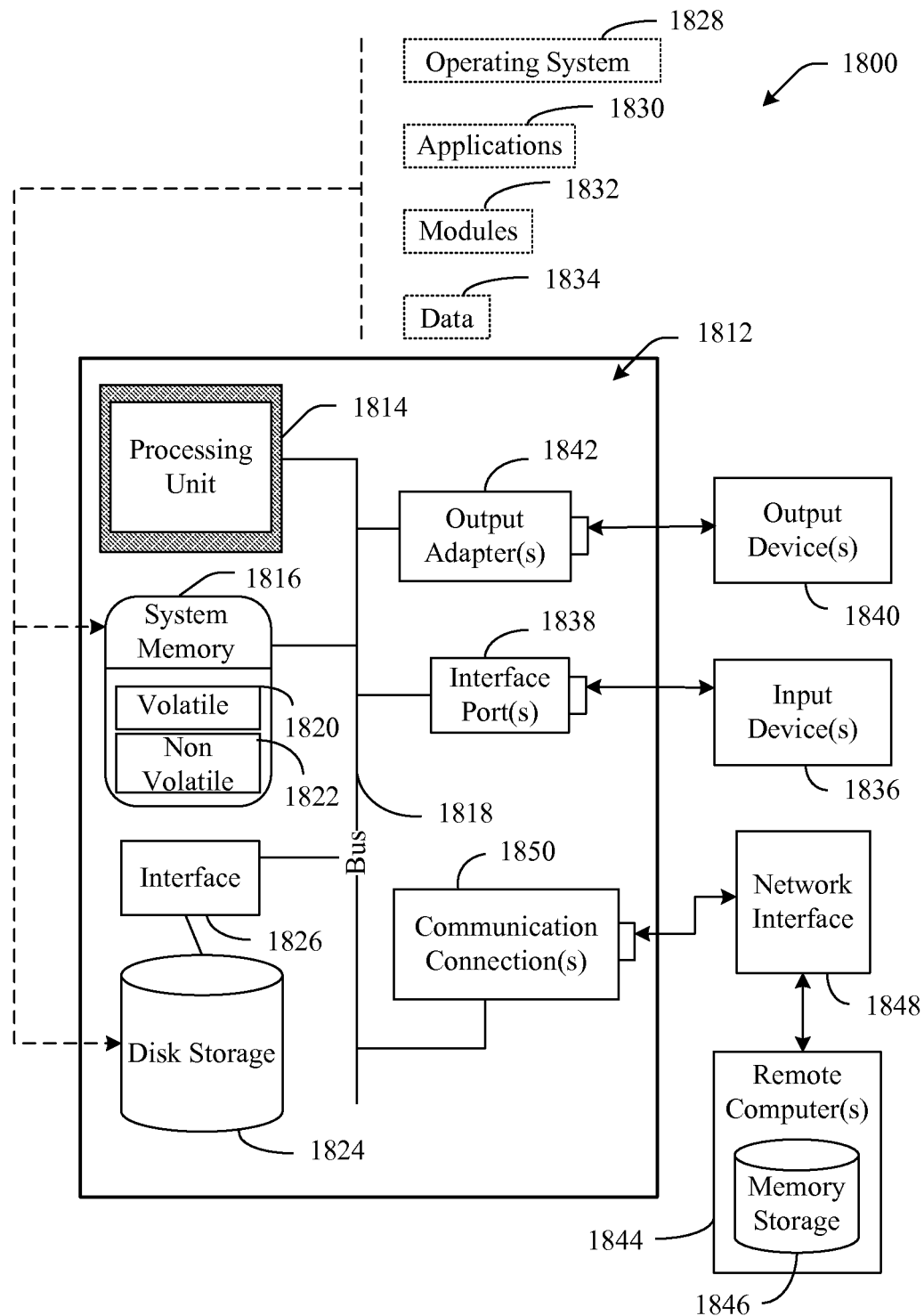
FIG. 18 is an example computing and/or operating environment.
Figure 19:
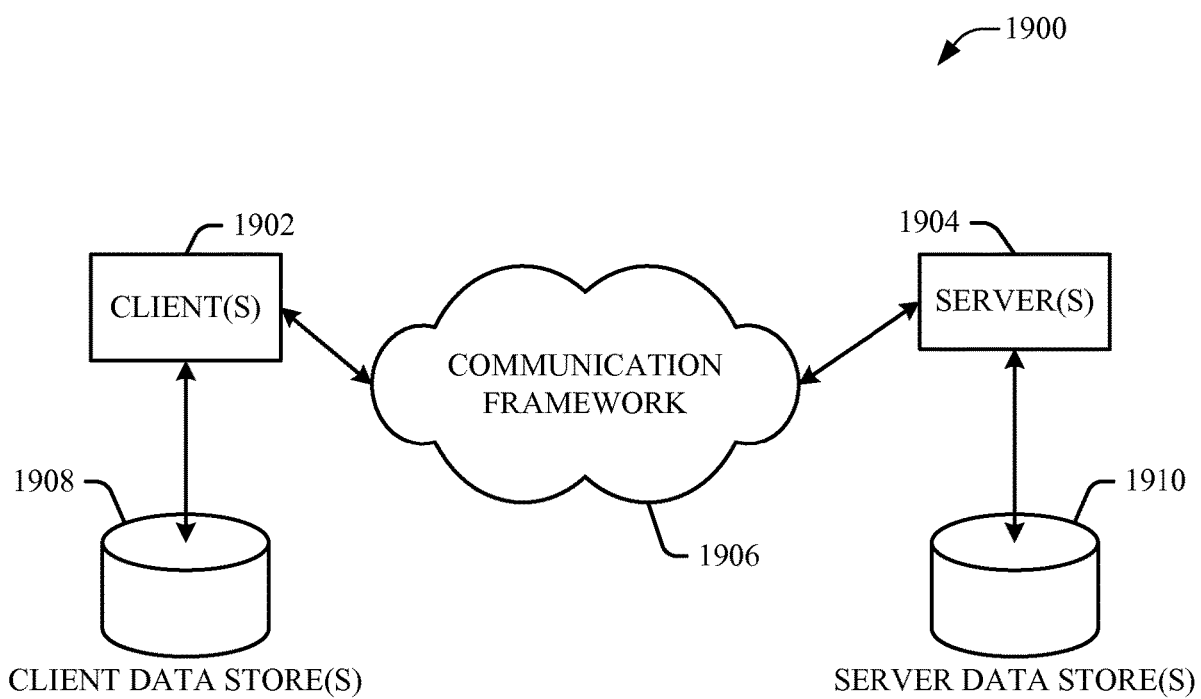
FIG. 19 is an example computing and/or networking environment.

In order to provide a context for the various aspects of the disclosed subject matter, FIGS. 18 and 19 as well as the following discussion are intended to provide a brief, general description of a suitable environment in which the various aspects of the disclosed subject matter can be implemented.

With reference to FIG. 18, an example environment 1800 for implementing various aspects of the aforementioned subject matter includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Multi-core microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable PROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/nonvolatile computer storage media. FIG. 18 illustrates, for example a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1824 to the system bus 1818, a removable or non-removable interface is typically used such as interface 1826.

It is to be appreciated that FIG. 18 describes software that acts as an intermediary between users and the basic computer resources described in suitable operating environment 1800. Such software includes an operating system 1828. Operating system 1828, which can be stored on disk storage 1824, acts to control and allocate resources of the computer 1812. System applications 1830 take advantage of the management of resources by operating system 1828 through program modules 1832 and program data 1834 stored either in system memory 1816 or on disk storage 1824. It is to be appreciated that one or more embodiments of the subject disclosure can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapters 1842 are provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the system bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

FIG. 19 is a schematic block diagram of a sample computing and/or networking environment 1900 with which the disclosed subject matter can interact. The computing and/or networking environment 1900 can include one or more clients 1902. The client(s) 1902 can be hardware and/or software (e.g., threads, processes, computing devices). The computing and/or networking environment 1900 also can include one or more servers 1904. The server(s) 1904 can also be hardware and/or software (e.g., threads, processes, computing devices). The servers 1904 can house threads to perform transformations by employing one or more embodiments as described herein, for example. One possible communication between a client 1902 and servers 1904 can be in the form of a data packet adapted to be transmitted between two or more computer processes. The computing and/or networking environment 1900 can include a communication framework 1906 that can be employed to facilitate communications between the client(s) 1902 and the server(s) 1904. The client(s) 1902 are operably connected to one or more client data stores 1908 that can be employed to store information local to the client(s) 1902. Similarly, the server(s) 1904 are operably connected to one or more server data stores 1910 that can be employed to store information local to the servers 1904.

What has been described above includes examples of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

It is to be appreciated and understood that components (e.g., modeler component, model management component, virtualization component, collection component, communication device, information provider component, processor component, data store, etc.), as described with regard to a particular system or method, can include the same or similar functionality as respective components (e.g., respectively named components or similarly named components) as described with regard to other systems or methods disclosed herein.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
   a memory that stores computer-executable components; and
   a processor, operatively coupled to the memory, that executes computer-executable components, the computer-executable components comprising:
   a collection component that executes on a cloud platform and is configured to collect, via at least one communication network, data from one or more devices of an industrial automation system within an industrial facility and from a local industrial controller that is located in the industrial facility and that controls a first portion of the industrial automation system in accordance with a control program that executes on the local industrial controller;
   an analytics component configured to
   determine, based on first analysis of the data, a first correlation between the data and a production goal to be achieved by the industrial automation system, wherein the production goal is at least one a level of product output by the industrial automation system or a reduction of maintenance downtime for the industrial automation system, and
   determine, based on second analysis of the data and attention data that tracks focuses of attention of employees in connection with operation of the industrial automation system, a second correlation between the focuses of attention and the production goal; and
   a cloud-based industrial controller that executes on the cloud platform, wherein the cloud-based industrial controller is configured to:
   control, from the cloud platform, a second portion of the industrial automation system,
   interface, from the cloud platform, with the local industrial controller, and
   generate, based on the first correlation and the second correlation, a first control instruction and a second control instruction that are configured to, in response to execution on the cloud-based industrial controller and the local industrial controller, respectively, cause the cloud-based industrial controller and the local industrial controller to perform coordinated control of the first portion and the second portion of industrial automation system to bring a performance metric of the industrial automation system within a defined baseline associated with the production goal.

2. The system of claim 1, wherein the cloud-based industrial controller interfaces with the local industrial controller over a public network of the at least one communication network.

3. The system of claim 1, wherein the cloud-based industrial controller is further configured to send the second control instruction to the local industrial controller via a cloud gateway component.

4. The system of claim 1, wherein the analytics component is further configured to generate a recommendation message defining a modification to an operation of the industrial automation system predicted to bring the performance metric within the defined baseline, and to send the recommendation message to a client device.

5. The system of claim 1, wherein the computer-executable components further comprise:
   a virtualization component configured to generate the cloud-based industrial controller as a virtualized industrial controller based at least in part on a virtualization result of an analysis of at least a portion of the data.

6. The system of claim 5, wherein the virtualization component is configured to generate a virtualized industrial automation system comprising one or more virtualized devices that correspond to the one or more devices of the industrial automation system based at least in part on the virtualization result.

7. The system of claim 1, wherein the cloud-based industrial controller operates in parallel with the local industrial controller to facilitate control of the industrial automation system.

8. The system of claim 1, wherein the cloud-based industrial controller operates in parallel with the local industrial controller to facilitate control of the industrial automation system at least until a determination that operation of the industrial automation system is in accordance with a defined control criterion.

9. The system of claim 1, wherein the cloud-based industrial controller is further configured to
determine at least one of a manufacturer or a model number of the local industrial controller based on information retrieved from the local industrial controller,
translate, based on at least one of the manufacturer or the model number, a control algorithm stored on the cloud platform in a controller-agnostic format to a controller-specific format to yield the control program, and
send the control program to the local industrial controller.

10. The system of claim 1, wherein an industrial device of the one or more devices is integrated with or associated with a cloud gateway component that sends a subset of the data from the industrial device to at least one of the cloud-based industrial controller or the collection component.

11. The system of claim 1, wherein the data comprises at least one of data relating to an industrial device of the one or more devices, data relating to an industrial process performed by the industrial automation system, data relating to an industrial asset, data relating to a network-related device of the one or more devices that facilitates data communications associated with the industrial automation system, data relating to an interrelationship between two devices of the one or more devices, data relating to an operating system associated with the industrial automation system, data relating to software associated with the industrial automation system, or data relating to firmware associated with the industrial automation system.

12. The system of claim 1, wherein the cloud-based industrial controller is further configured to:
in response to a determination that the local industrial controller has become incapable of controlling the industrial automation system, assume control of the first portion of the industrial automation system.

13. The system of claim 1, wherein the production goal is at least one of reduction of energy costs associated with the industrial automation system, increase of production output by the industrial automation system, reduction of maintenance downtime for the industrial automation system, achievement of a revenue goal associated with the industrial automation system, or achievement of an efficiency goal.

14. The system of claim 1, wherein
the analytics component is further configured to determine, based on third analysis of the data, a third correlation between presence of an employee at the plant facility and a positive operation outcome of the industrial automation system, and to send a notification identifying the third correlation to a client device.

15. The system of claim 1, wherein
the analytics component is further configured to send a notification identifying the second correlation to a client device.

16. The system of claim 1, wherein
the collection component is further configured to collect extrinsic data from one or more extrinsic sources that are external to the industrial facility, wherein the extrinsic data indicates at least one of a forecasted weather condition, a price of energy, a shipment schedule for materials used by the industrial process, or an order for product produced by the industrial automation system,
the analytics component is configured to determine, as the first correlation, a correlation between the data, the extrinsic data, and the production goal.

17. The system of claim 16, wherein the extrinsic data further comprises news determined to be relevant to operation of the industrial automation system.

18. A method, comprising:
receiving, by a virtualized industrial controller that executes on a cloud platform system comprising a processor, via at least one communication network, data from one or more devices of an industrial automation system within an industrial plant and from a local industrial controller that is located in the industrial plant and that controls a first portion of the industrial automation system based on execution of a control program executed on the local industrial controller;
controlling, by the virtualized industrial controller, a second portion of the industrial automation system;
determining, by the virtualized industrial controller based on a first analysis of the data, a first correlation between the data and a production goal to be achieved by the industrial automation system, wherein the production goal is at least one a level of product output by the industrial automation system or a reduction of maintenance downtime for the industrial automation system;
determining, based on a second analysis of the data and attention data that tracks focuses of attention of employees in connection with operation of the industrial automation system, a second correlation between the focuses of attention and the production goal;
generating, by the virtualized industrial controller based on the first correlation and the second correlation, a first control instruction and a second control instruction that are configured to, in response to execution on the virtualized industrial controller and the local industrial controller, respectively, cause the virtualized industrial controller and the local industrial controller to perform coordinated control of the first portion and the second portion of industrial automation system to move a performance metric of the industrial automation system within a defined baseline indicative of the production goal; and
sending, by the virtualized industrial controller, the second control instruction to the local industrial controller.

19. The method of claim 18, wherein the sending comprises sending, by the virtualized industrial controller, the second control instruction to the local industrial controller over a public network of the at least one communication network.

20. The method of claim 18, wherein the sending comprises sending, by the virtualized industrial controller, the second control instruction to the local industrial controller via a cloud gateway device.

21. The method of claim 18, wherein the generating the first control instruction and the second control instruction comprises:
determining, by the virtualized industrial controller, a change to an operation of the industrial automation system that will move the performance metric within the defined baseline based at least in part on the first analysis of the data, and generating the first control instruction and the second control instruction to implement the change.

22. The method of claim 18, further comprising:

generating, by the virtualized industrial controller based on the second analysis of the data, a recommendation message that recommends a modification to an operation of the industrial automation system predicted to move the performance metric within the defined baseline; and sending, by the virtualized industrial controller, the recommendation message to a client device.

23. The method of claim 18, further comprising:

generating, by the cloud platform system, the virtualized industrial controller based at least in part on a virtualization result of an analysis of at least a portion of the data.

24. The method of claim 18, further comprising:

generating, by the virtualized industrial controller, the control program to be executed on the local industrial controller, wherein the generating the control program comprises:

determining, by the virtualized industrial controller, at least one of a manufacturer or a model number of the local industrial controller based on information retrieved from the local industrial controller; and translating, by the virtualized industrial controller based on the at least one of the manufacturer or the model number, a controller-agnostic control algorithm stored on the cloud platform system from a controller-agnostic format to a controller-specific format to yield, as the control program, a translated control algorithm that is executable by the local industrial controller.

25. The method of claim 18, further comprising:

in response to determining that the local industrial controller has faulted, assuming, by the virtualized industrial controller, control of the first portion of the industrial automation system.

26. A non-transitory computer-readable medium storing computer-executable instructions that, in response to execution, cause a cloud-based industrial controller comprising a processor to perform operations, comprising:

obtaining, via at least one communication network, data from one or more devices of an industrial automation system located in an industrial facility and from a local industrial controller, located in the industrial facility, that controls a first portion of the industrial automation system in accordance with a control program executed on the local industrial controller;

controlling a second portion of the industrial automation system;

determining, based on a first analysis of the data, a first correlation between the data and a defined production goal of the industrial automation system, wherein the production goal is at least one a level of product output by the industrial automation system or a reduction of maintenance downtime for the industrial automation system;

determining, based on a second analysis of the data and attention data that tracks focuses of attention of employees in connection with operation of the industrial automation system, a second correlation between the focuses of attention and the production goal;

generating, based on the first correlation and the second correlation, a first control instruction configured for execution on the cloud-based industrial controller and a second control instruction configured for execution on the local industrial controller, wherein the first control instruction and the second control instruction are configured to, in response to execution, cause the cloud-based industrial controller and the local industrial controller to perform coordinated control of the first portion and the second portion of industrial automation system to bring a performance metric of the industrial automation system within a defined baseline associated with the production goal; and sending the second control instruction to the local industrial controller.

27. The non-transitory computer-readable medium of claim 26, wherein the operations further comprise:

in response to a determination that the local industrial controller has a faulted, assigning control of the first portion of the industrial automation system to the cloud-based industrial controller.

* * * * *